US008472887B2

(12) United States Patent
Penn et al.

(10) Patent No.: US 8,472,887 B2
(45) Date of Patent: Jun. 25, 2013

(54) RADIO FREQUENCY INTEGRATED CIRCUIT FOR ENHANCED TRANSMIT/RECEIVE PERFORMANCE IN LOW POWER APPLICATIONS AND METHOD OF MAKING THE SAME

(75) Inventors: John Edward Penn, Eldersburg, MD (US); Gregory Allen Mitchell, Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 320 days.

(21) Appl. No.: 12/878,208

(22) Filed: Sep. 9, 2010

(65) Prior Publication Data

US 2012/0062330 A1 Mar. 15, 2012

(51) Int. Cl.
*H04B 1/38* (2006.01)

(52) U.S. Cl.
USPC .................................. 455/73; 455/78; 455/83

(58) Field of Classification Search
USPC ........................................................... 455/73
See application file for complete search history.

(56) References Cited

U.S. PATENT DOCUMENTS

| | | | | |
|---|---|---|---|---|
| 6,049,702 | A * | 4/2000 | Tham et al. | 455/78 |
| 7,427,897 | B2 * | 9/2008 | Hau et al. | 330/297 |
| 7,595,766 | B2 * | 9/2009 | Rofougaran | 343/795 |
| 7,936,237 | B2 * | 5/2011 | Park et al. | 333/103 |
| 8,041,227 | B2 * | 10/2011 | Holcombe et al. | 398/138 |
| 8,244,188 | B2 * | 8/2012 | Sawada et al. | 455/73 |
| 2009/0042527 | A1 * | 2/2009 | Niknejad | 455/234.2 |
| 2010/0105340 | A1 * | 4/2010 | Weissman | 455/83 |
| 2010/0158077 | A1 * | 6/2010 | Mahany | 375/132 |

OTHER PUBLICATIONS

Texas Instruments CC2590 "2.4-GHz RF Front End, 14-dBm output power," SWRS080 data sheet, Sep. 2008.
Texas Instruments CC2591 "2.4-GHz RF Front End," SWRS070A data sheet, Jun. 2008.
Texas Instruments CC1190, 850-950-MHz RF Front End, SWRS089 data sheet, product preview, Nov. 2009.
LINX Technologies, BBA Series RF Amplifier Guide, BBA-322-A, BBA-519-A, Jan. 28, 2008.

* cited by examiner

*Primary Examiner* — Ajibola Akinyemi
(74) *Attorney, Agent, or Firm* — Lawrence E. Anderson

(57) ABSTRACT

A radio frequency integrated circuit (and method of making) for enhancing wireless communication and/or sensing systems comprising a base comprising a gallium arsenide (GaAs) substrate; a binary phase shift keying modulator fabricated on the base; a power amplifier fabricated on the base and operatively associated with the binary phase shift keying modulator; the power amplifier having a first shunt operatively associated therewith; a transmit/receive switch fabricated on the base, the transmit/receive switch being operatively associated with the power amplifier and being alternately connectable to an antenna port adapted to be connected to an antenna; a low noise amplifier fabricated on the base; the low noise amplifier being alternately connectable to the antenna port, the low noise amplifier having a second shunt operatively associated therewith; the circuit operating in a transmit stage in which the power amplifier is connected to the antenna port and in a receive stage in which the low noise amplifier is connected to the antenna port; whereby in the receive stage the power amplifier is bypassed by the first shunt to reduce current consumption and substantially isolate the receive stage from the transmit stage; and in the transmit stage the low noise amplifier is bypassed by the second shunt to reduce current consumption and to substantially isolate the transmit stage from the receive stage.

17 Claims, 75 Drawing Sheets

BPSK MODULATOR SCHEMATIC
Postive voltage controlled BPSK Modulator

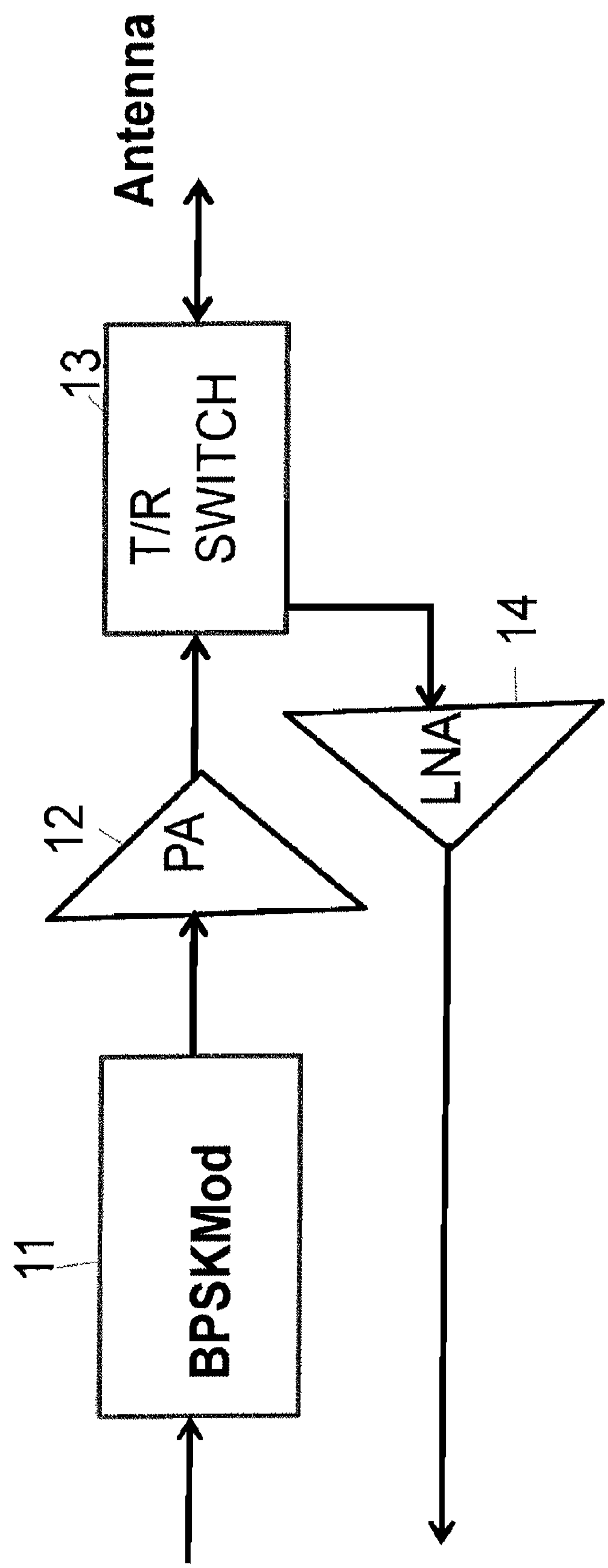
FIG. 1A Design components of the RFIC enhancement to the booster chip architecture.

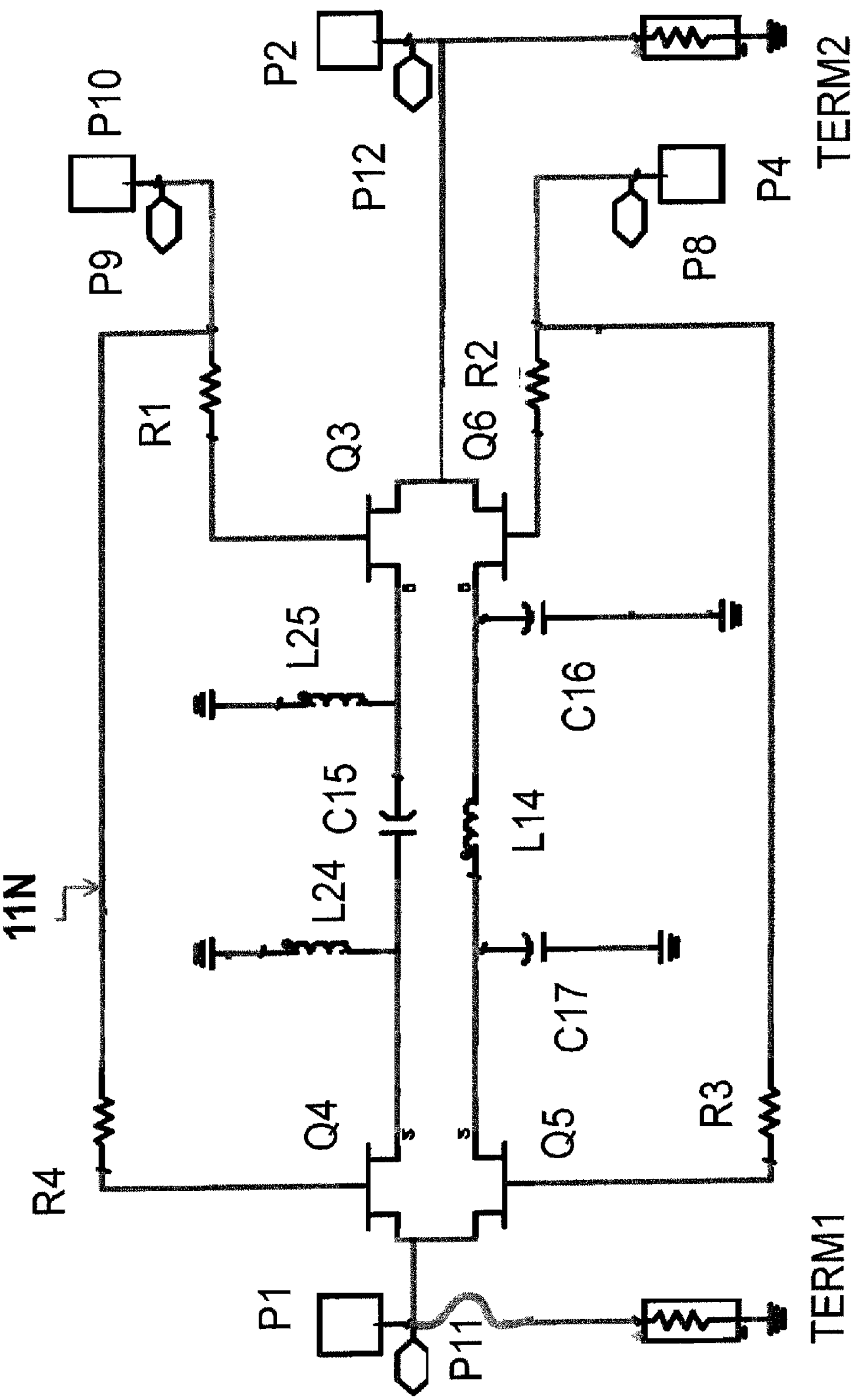
FIG. 1B BPSK MODULATOR SCHEMATIC

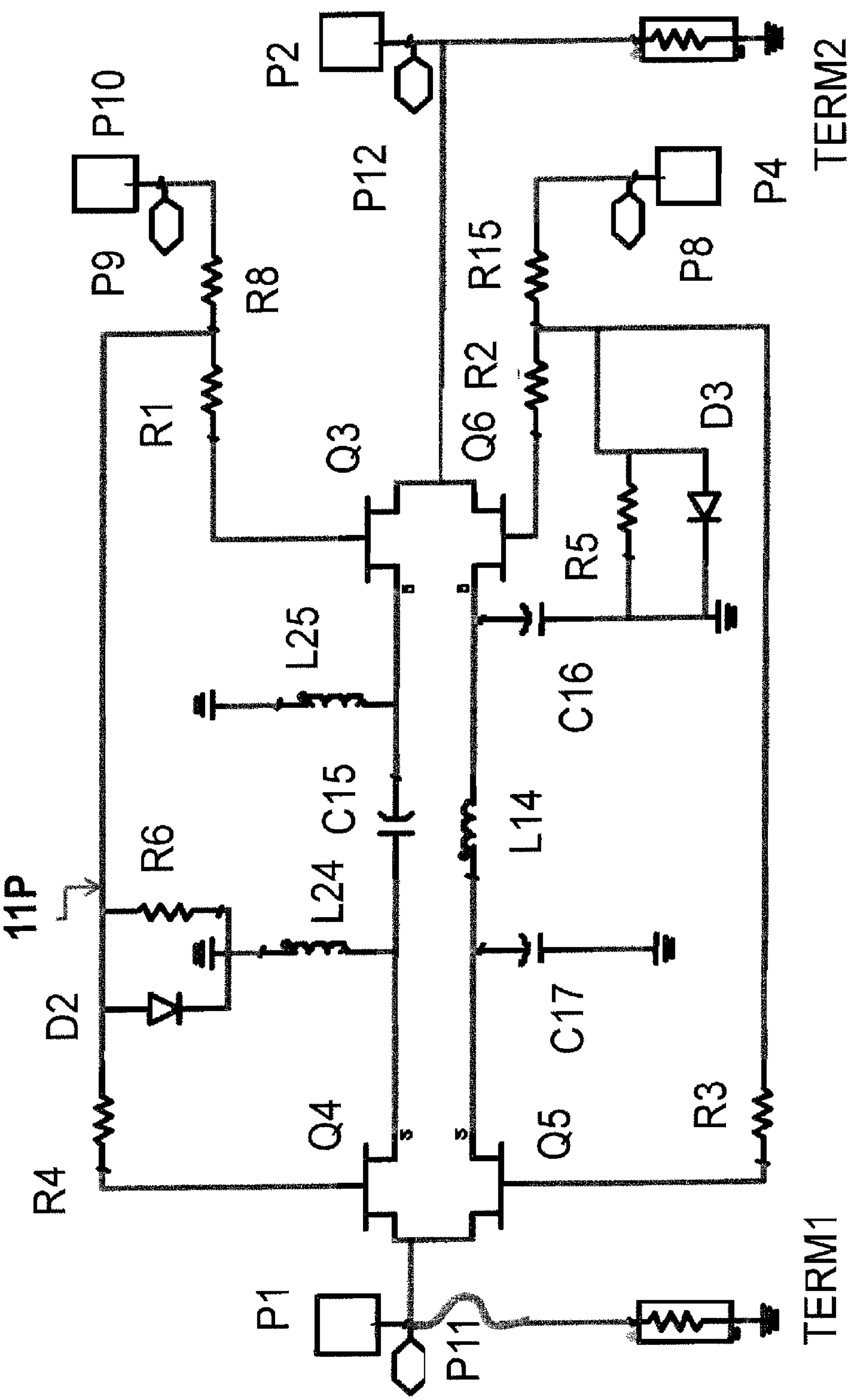
FIG. 1C BPSK MODULATOR SCHEMATIC
Postive voltage controlled BPSK Modulator

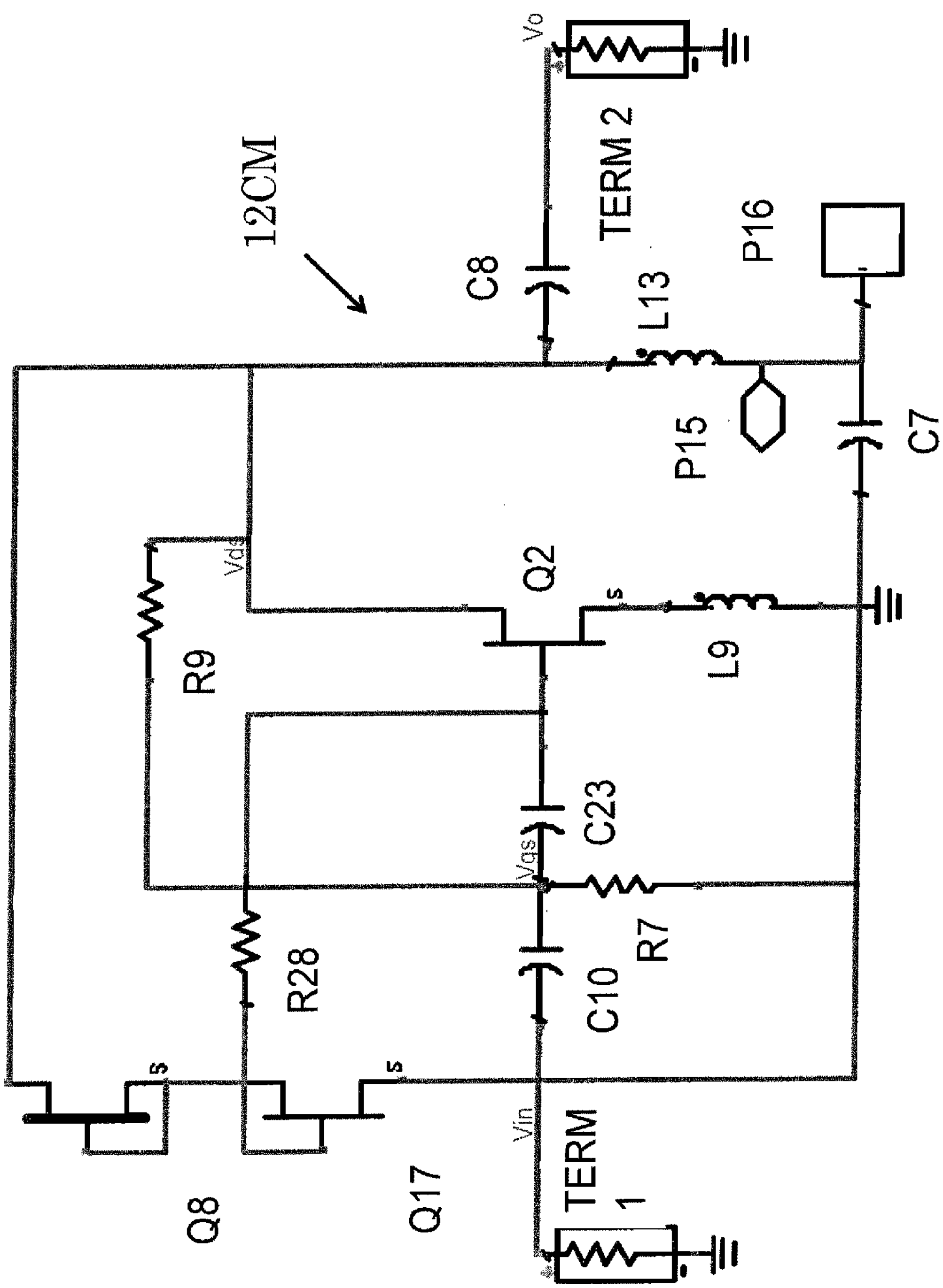
FIG. 1D Broadband PA with Current Mirror Bias Schematic

Broadband PA Schematic (with resistor divider DC bias)

Broadband LNA Schematic (with resistor divider DC bias)

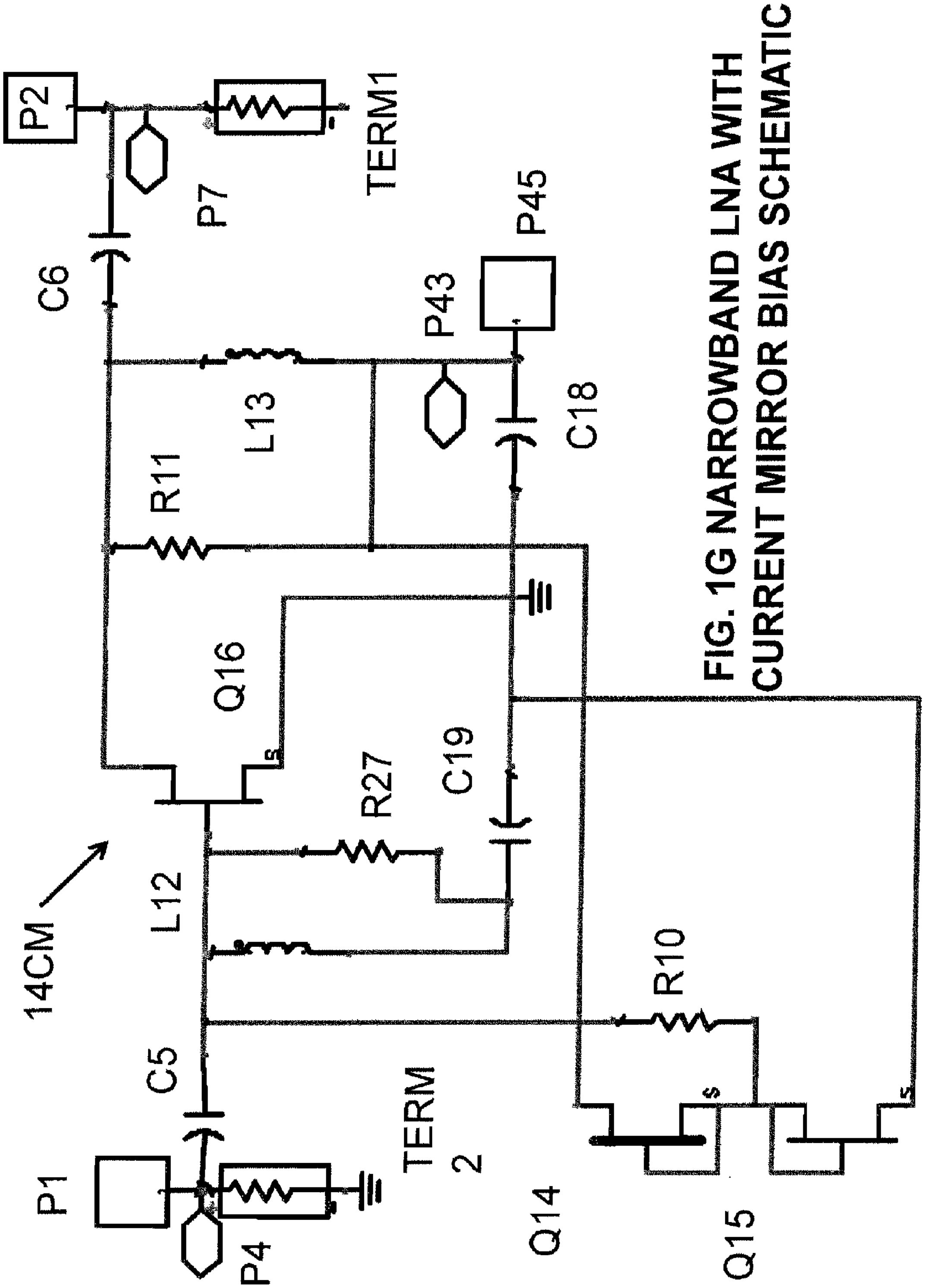
FIG. 1G NARROWBAND LNA WITH CURRENT MIRROR BIAS SCHEMATIC

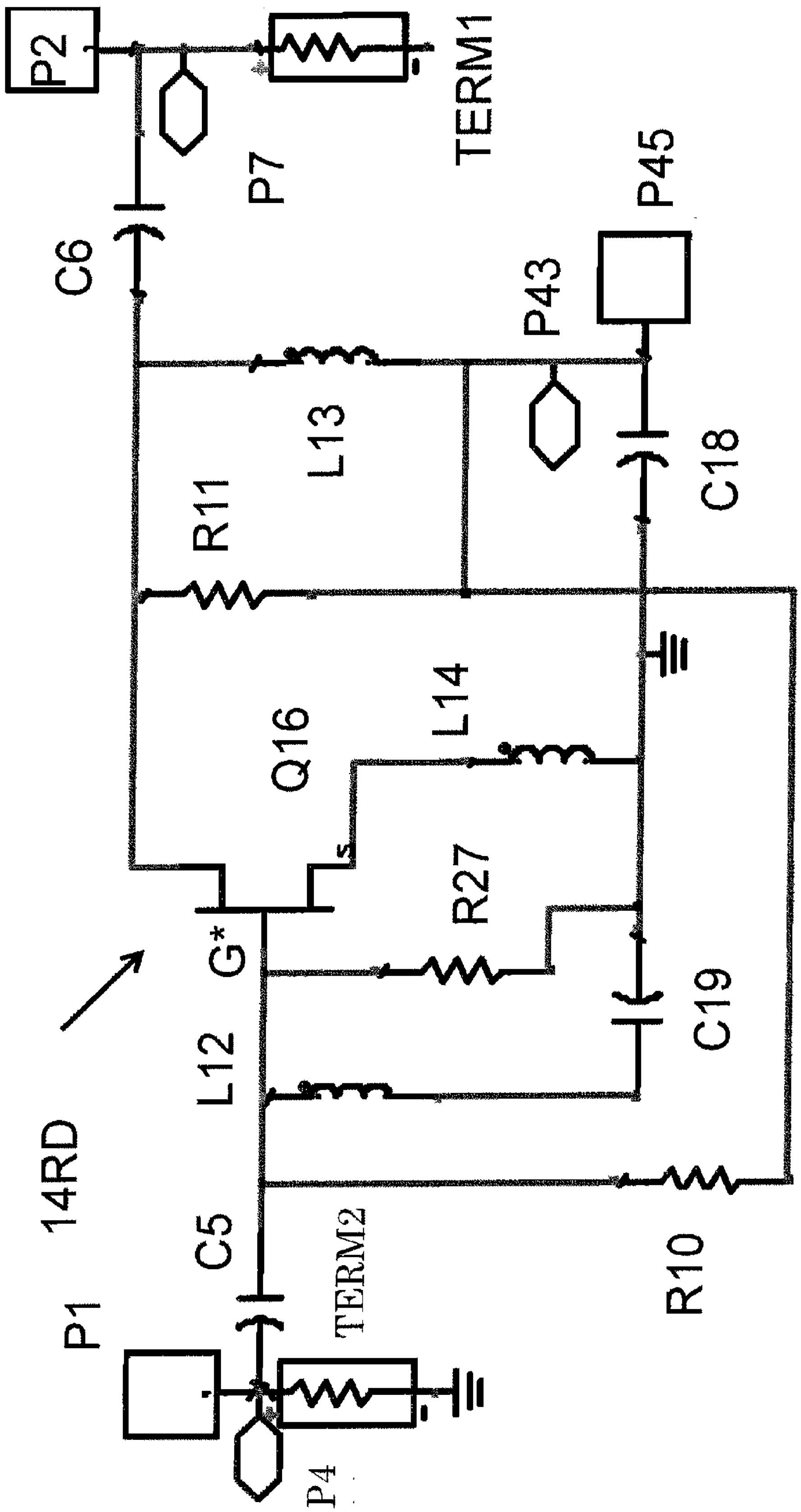
FIG. 1 H NARROWBAND LNA WITH RESISTOR DIVIDER BIAS SCHEMATIC

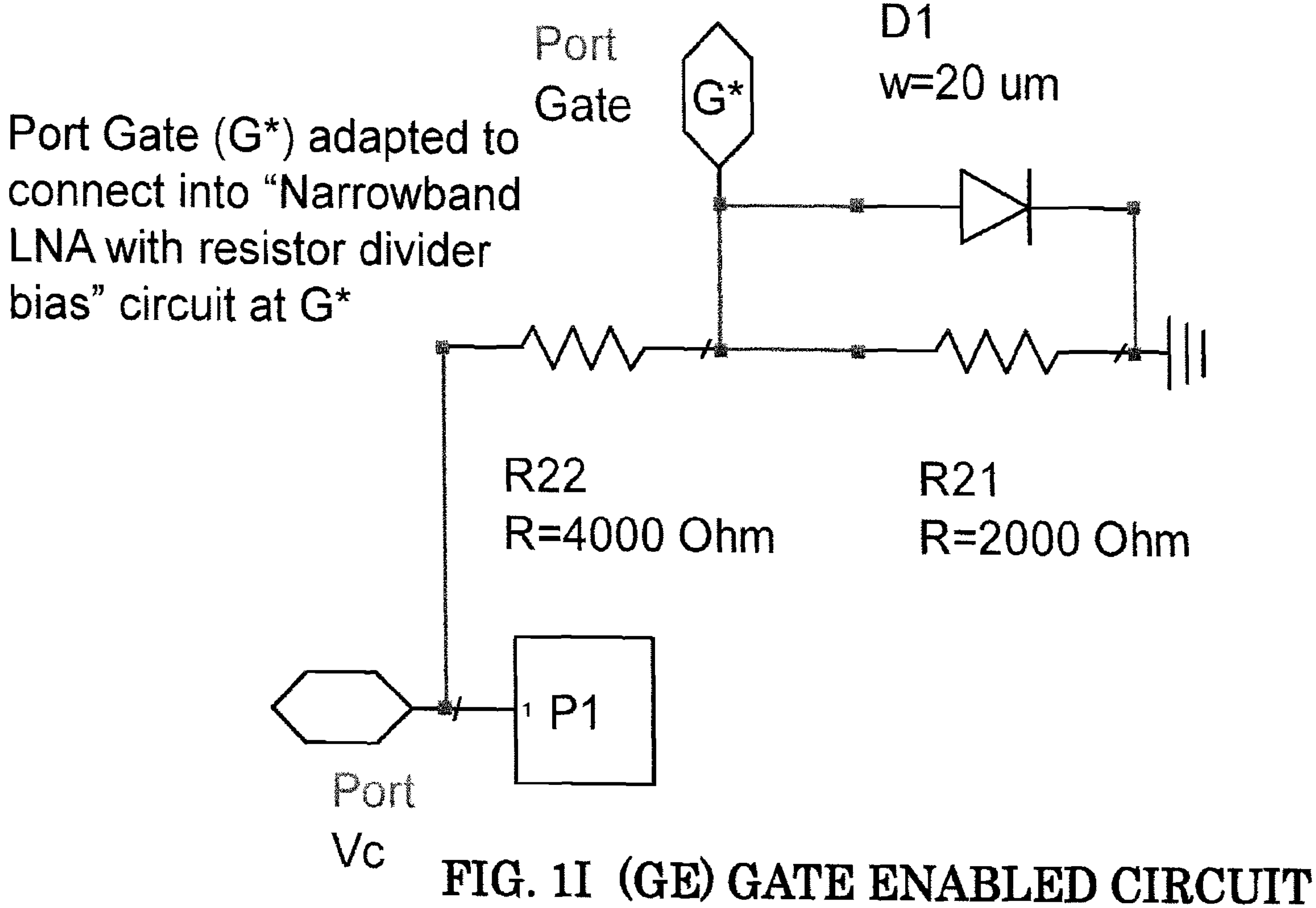
FIG. 1I (GE) GATE ENABLED CIRCUIT SCHEMATIC

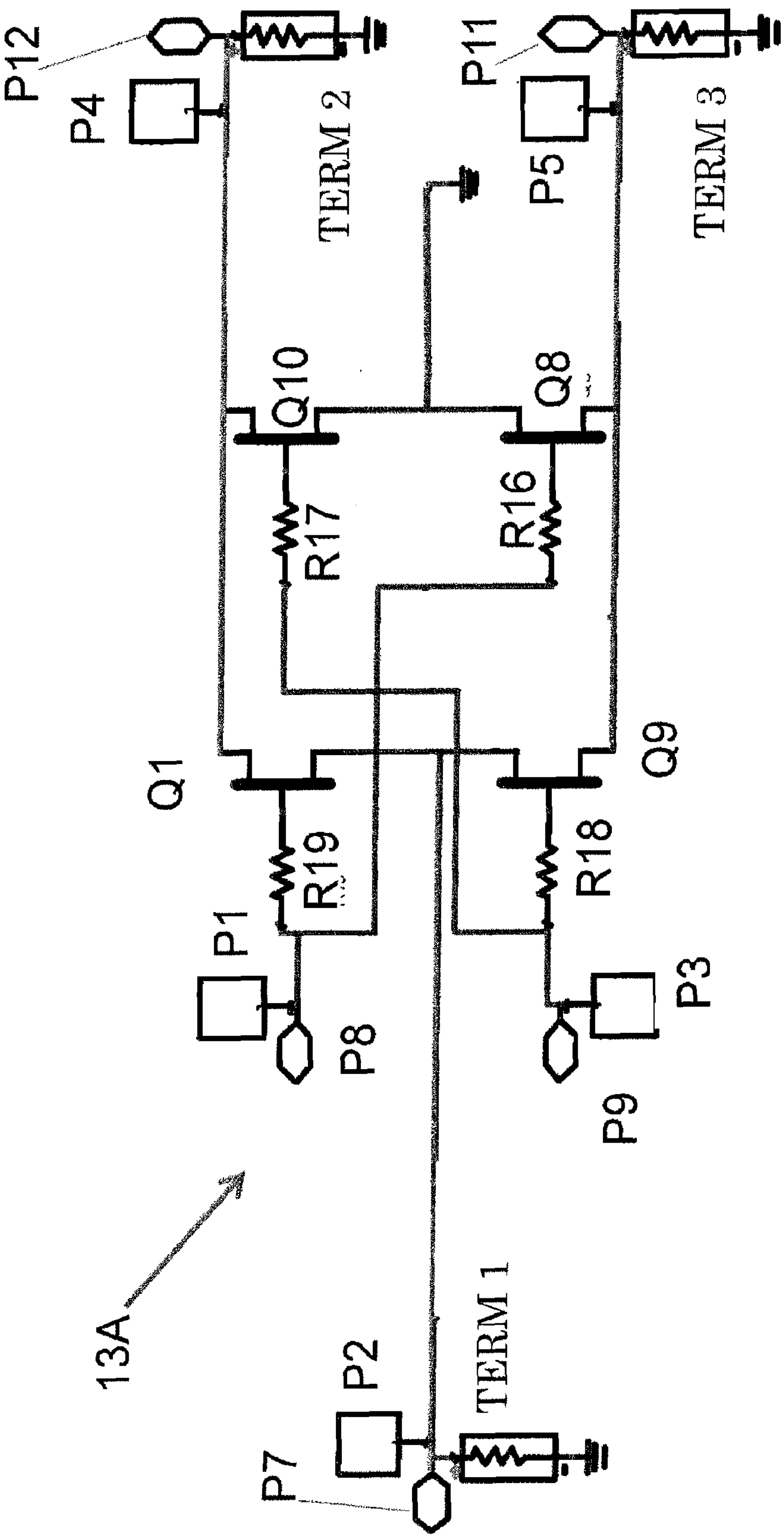
FIG. 1K-TR1
Broadband TR Switch Schematic

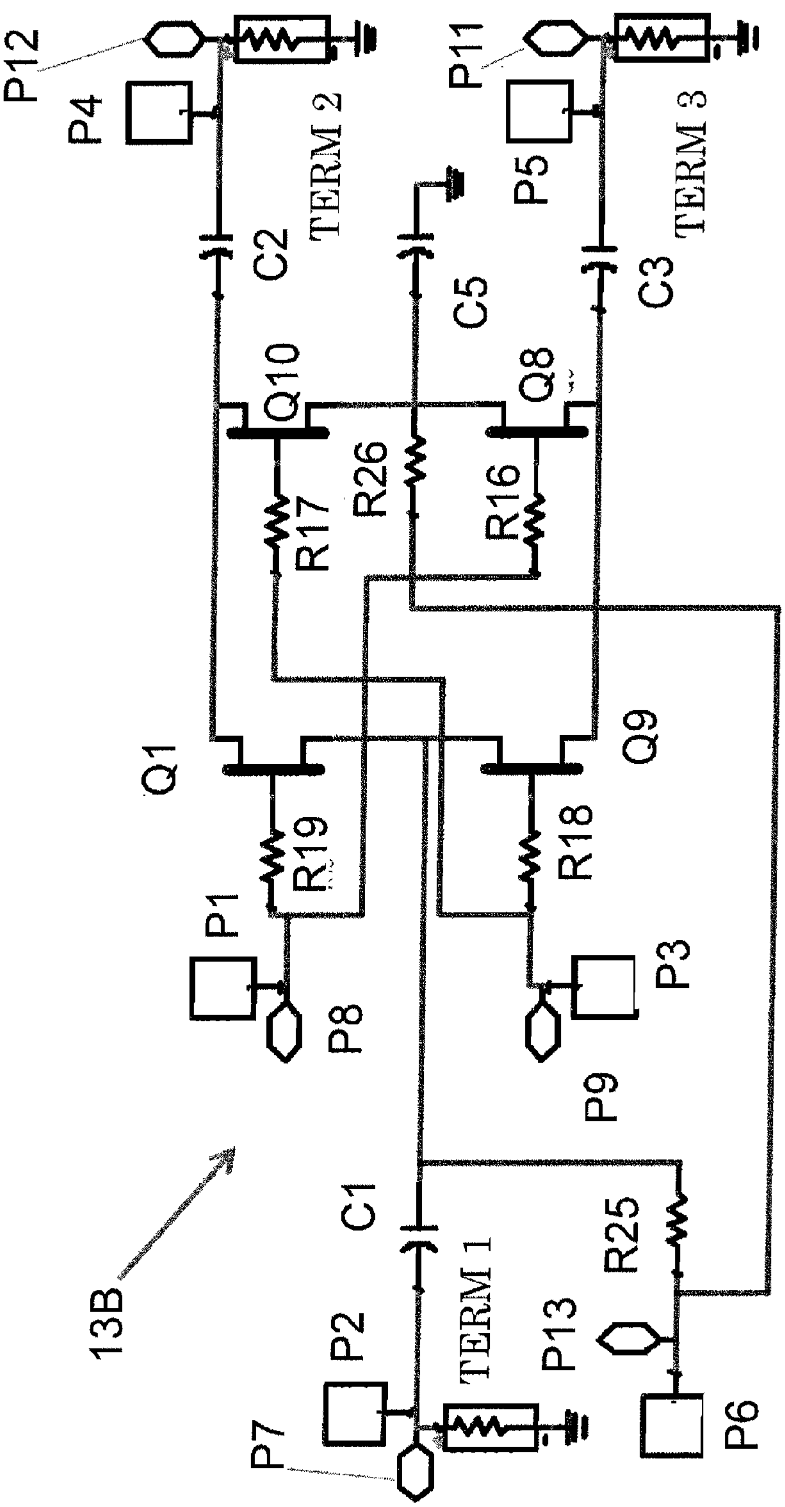
Broadband TR Switch Schematic with positive Voltage Control
FIG. 1L- TR2

FIG. 2 Initial Plot of the RF Probe Measurements Cascaded with the 450 MHz Broadband Power amp. (2.5, 2.7, and 3.0 V)
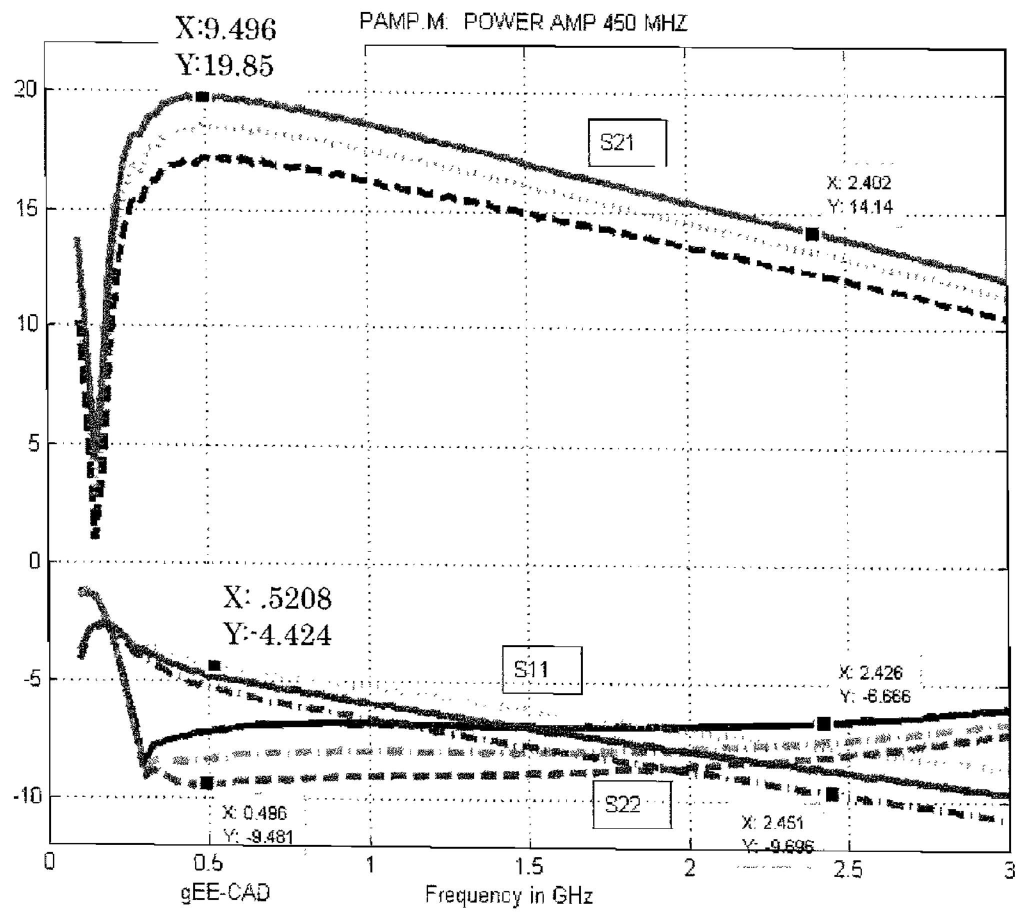

FIG. 5 RF probe measurements of 450 MHz BPSK modulator, power amp, and TRS

FIG. 6 Initial plot of RF probe measurements of 450 MHz LNA and TRS (ARL6)

FIG. 7 Layout for the full RFIC booster design at 450 MHz including novel BPSK modulator and gate enable inputs on-chip.

10A

FIG. 8 Chip 6/11 450 MHz Wire Bond Diagram and Actual Bond in 4x4mm QFN Package (10A)

FIG. 9 Gain and Return Loss of BPSK Modulator and Power Amplifier in Both States (tested in QFN Package)

FIG. 10 ARL 11 PA Phase in 4x4 mm QFN Package, bare die, & ADS Simulation

FIG. 11 ARL 11 LNA Gain and Return Loss in 4x4 QFN Package

FIG. 12 ARL 11 PA Output Power and Efficiency in 4x4 QFN Package (3.0V)

3V at 5 mA

| FREQ | Gaincorr | Nfcorr |
|---|---|---|
| 0.2 | -14.77 | 23.74 |
| 0.3 | 5.49 | 16.83 |
| 0.4 | 4.59 | 8.75 |
| 0.5 | 10.60 | 2.96 |
| 0.6 | 10.29 | 2.36 |
| 0.7 | 8.97 | 2.31 |
| 0.8 | 8.38 | 2.49 |
| 0.9 | 7.57 | 2.96 |
| 1.0 | 6.91 | 3.42 |
| 1.1 | 6.46 | 3.71 |
| 1.2 | 5.55 | 3.76 |

FIG. 13 ARL 11 LNA Gain and Noise Figure in 4x4 QFN Package (3.0V)

FIG. 14 Layout for the 4x4 mm narrowband design at 900 MHz.

FIG. 15 Results of experimental S-parameters for the transmit stage in state A at 900 MHz.

FIG. 16 Measured and simulated S-parameters of the transmit stage in state B at 900 MHz.

FIG. 18 S-parameters for the LNA at 900 MHz
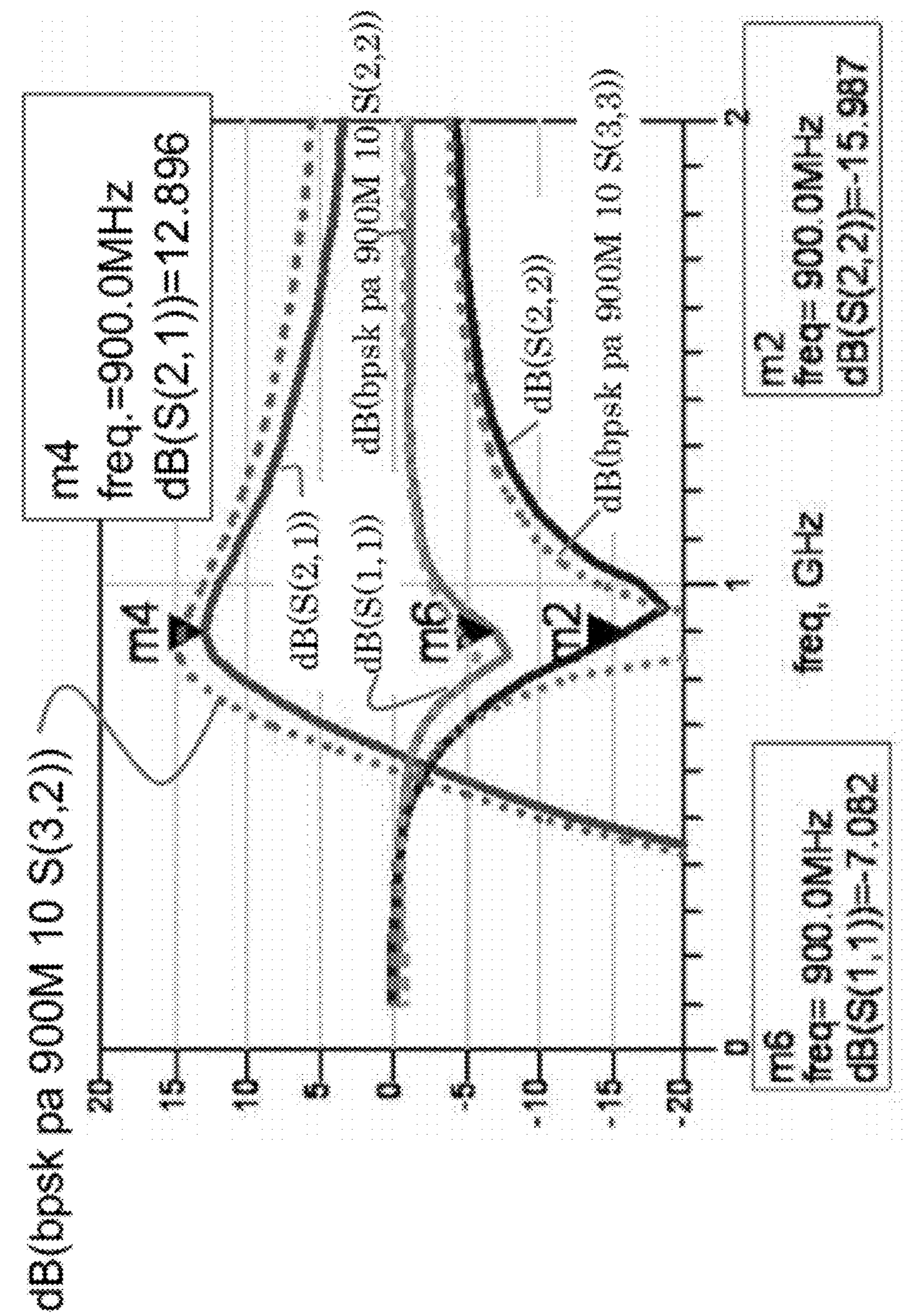

FIG. 19 Comparisons between measured and simulated data for the LNA gain and NF.
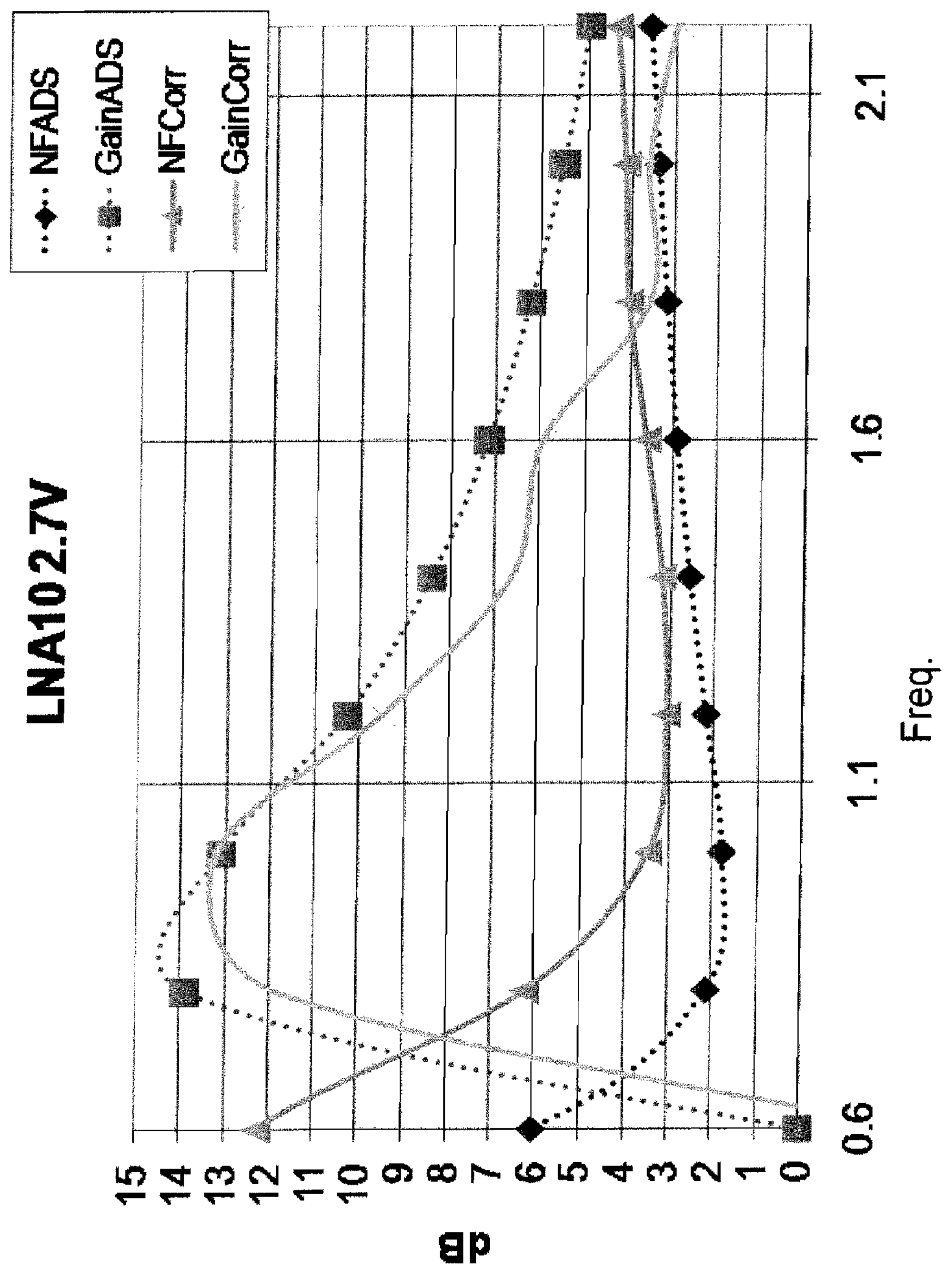

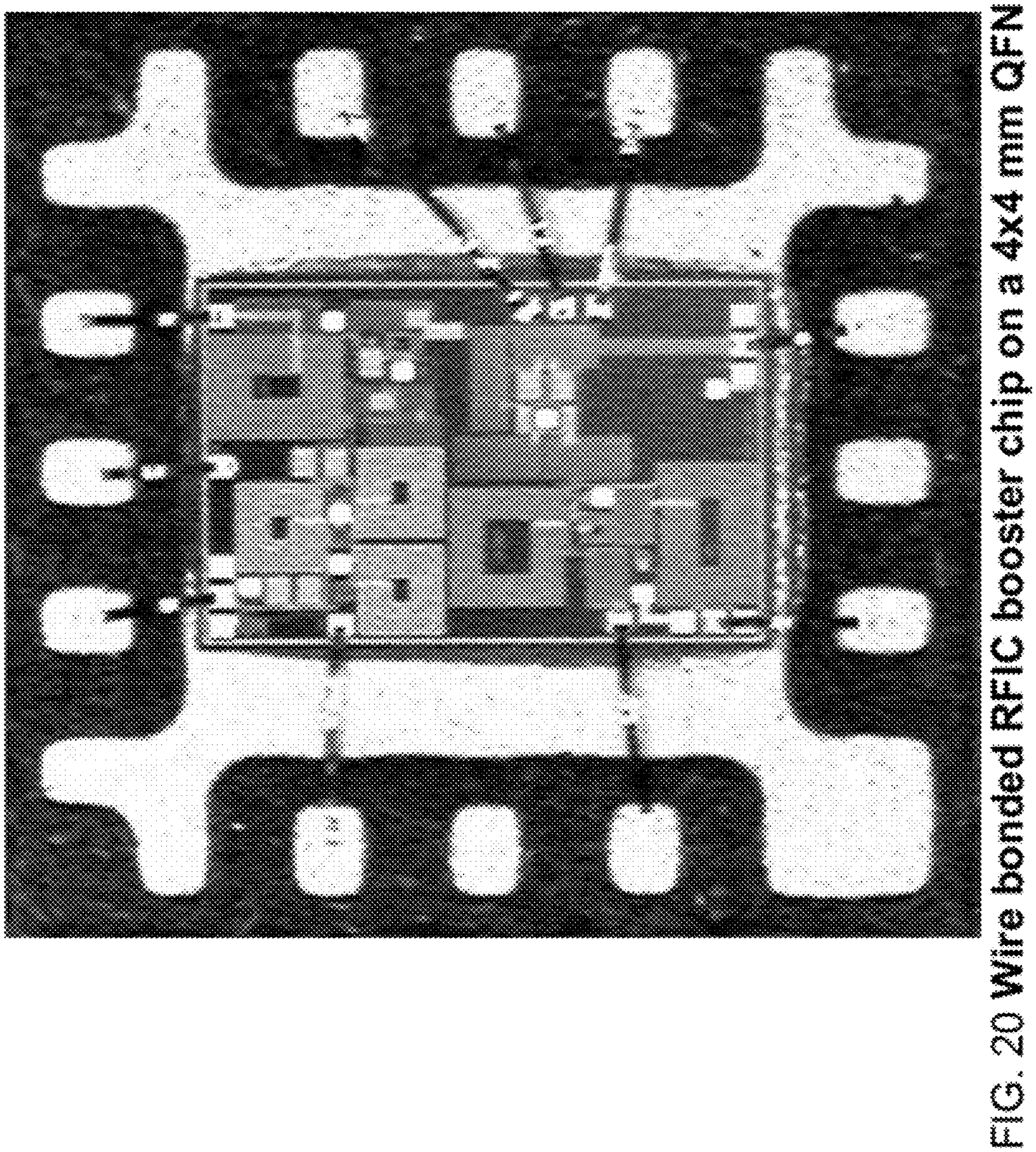
FIG. 20 Wire bonded RFIC booster chip on a 4x4 mm QFN

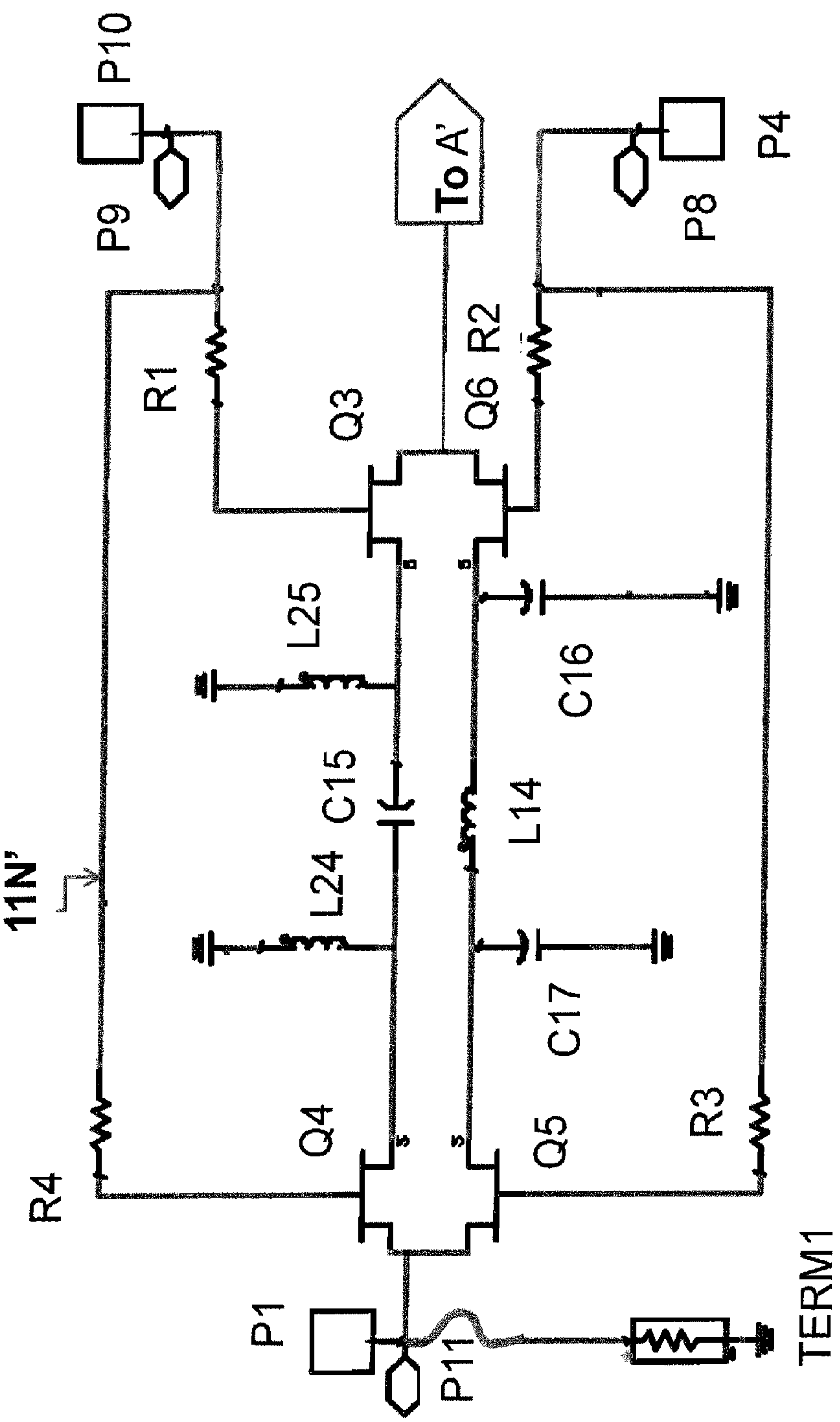
Negative voltage controlled BPSK Modulator
FIG. 21A SCHEMATIC Narrowband cascaded BPSK modulator & PA at 900 MHz PART A

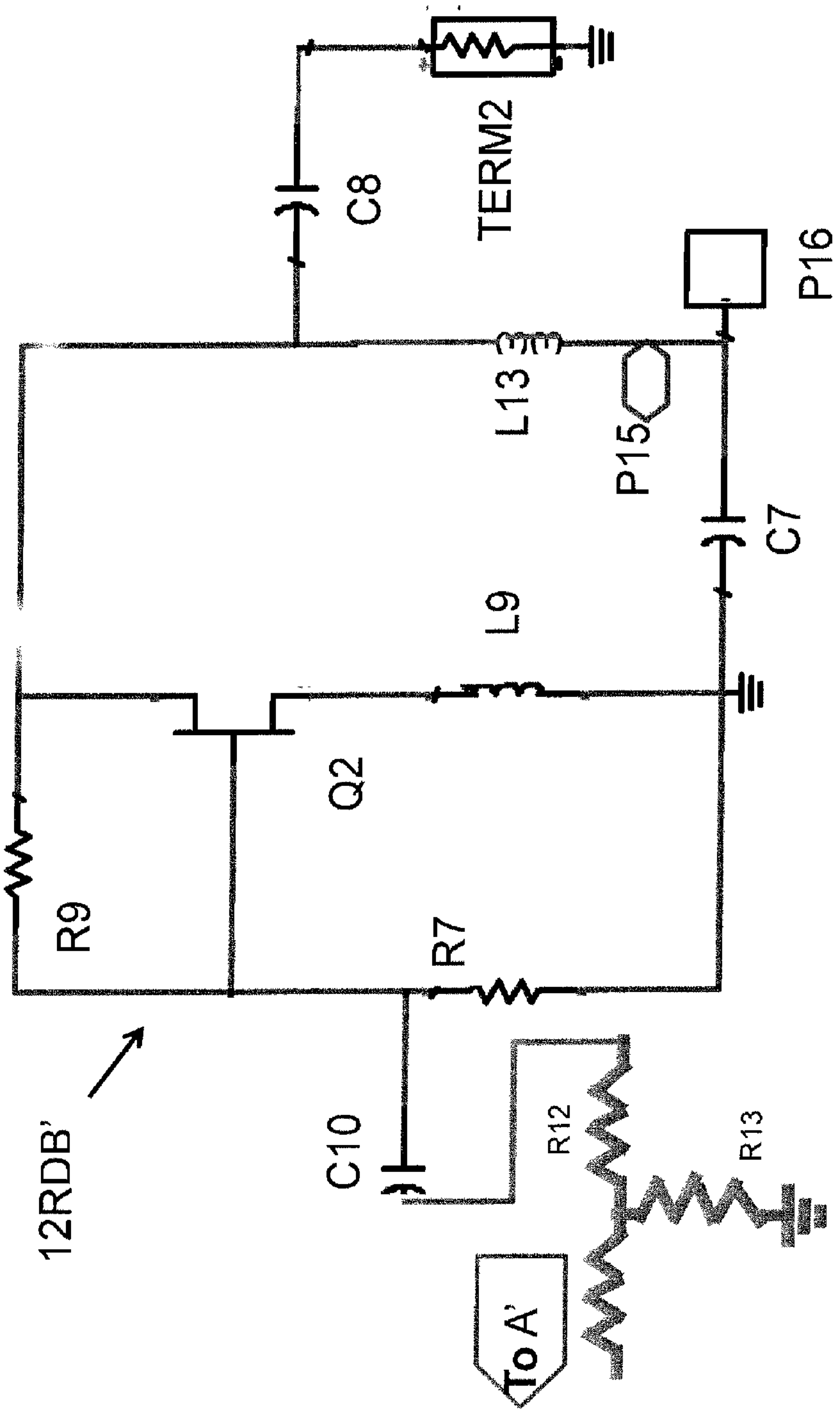
Broadband PA Schematic (with resistor divider DC bias)
FIG. 21B SCHEMATIC Narrowband cascaded BPSK modulator & PA at 900 MHz PART B

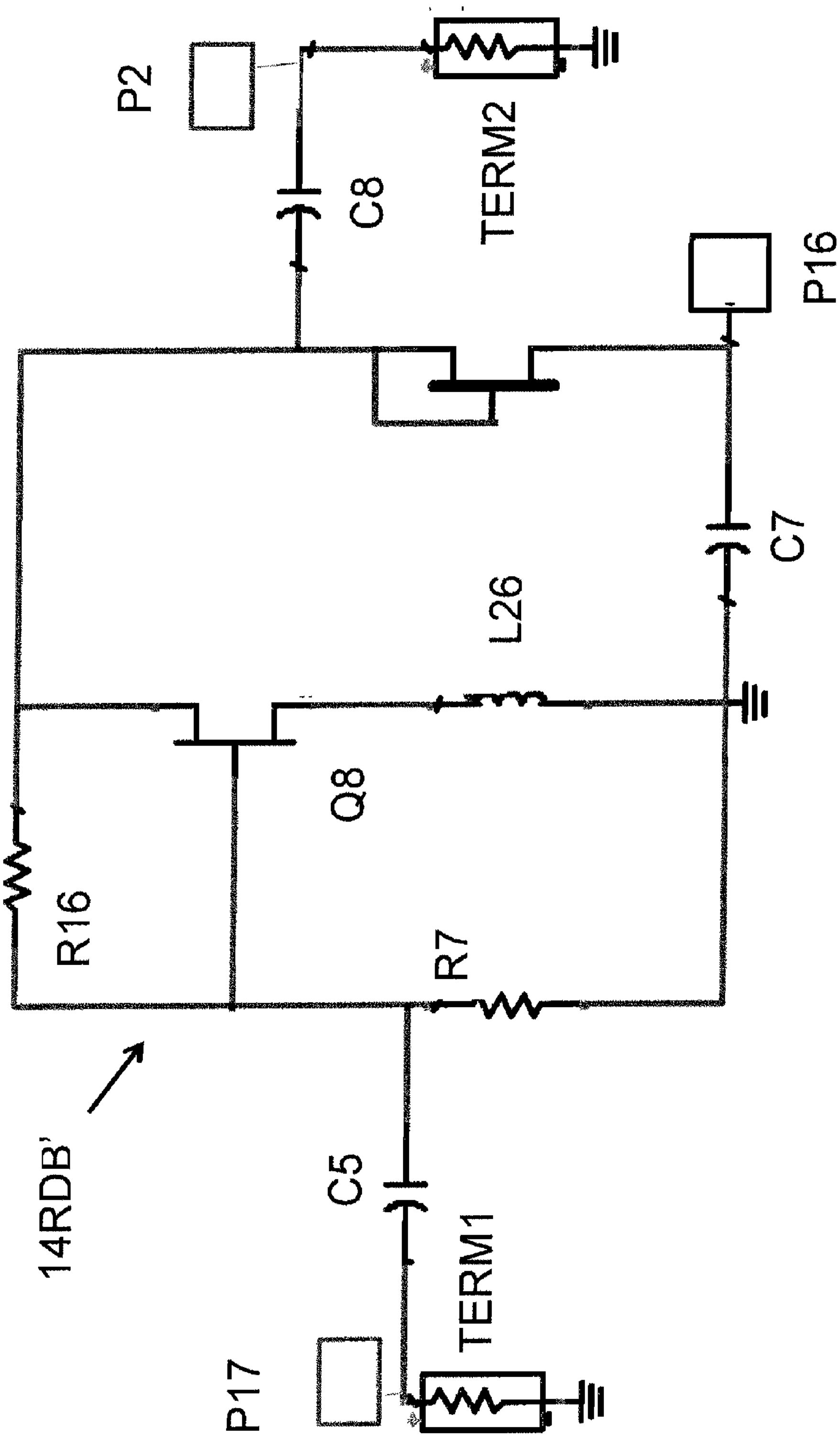
Low noise amplifier Schematic (with resistor divider DC bias)
FIG. 21C SCHEMATIC Narrowband cascaded BPSK modulator & PA at 900 MHz PART C

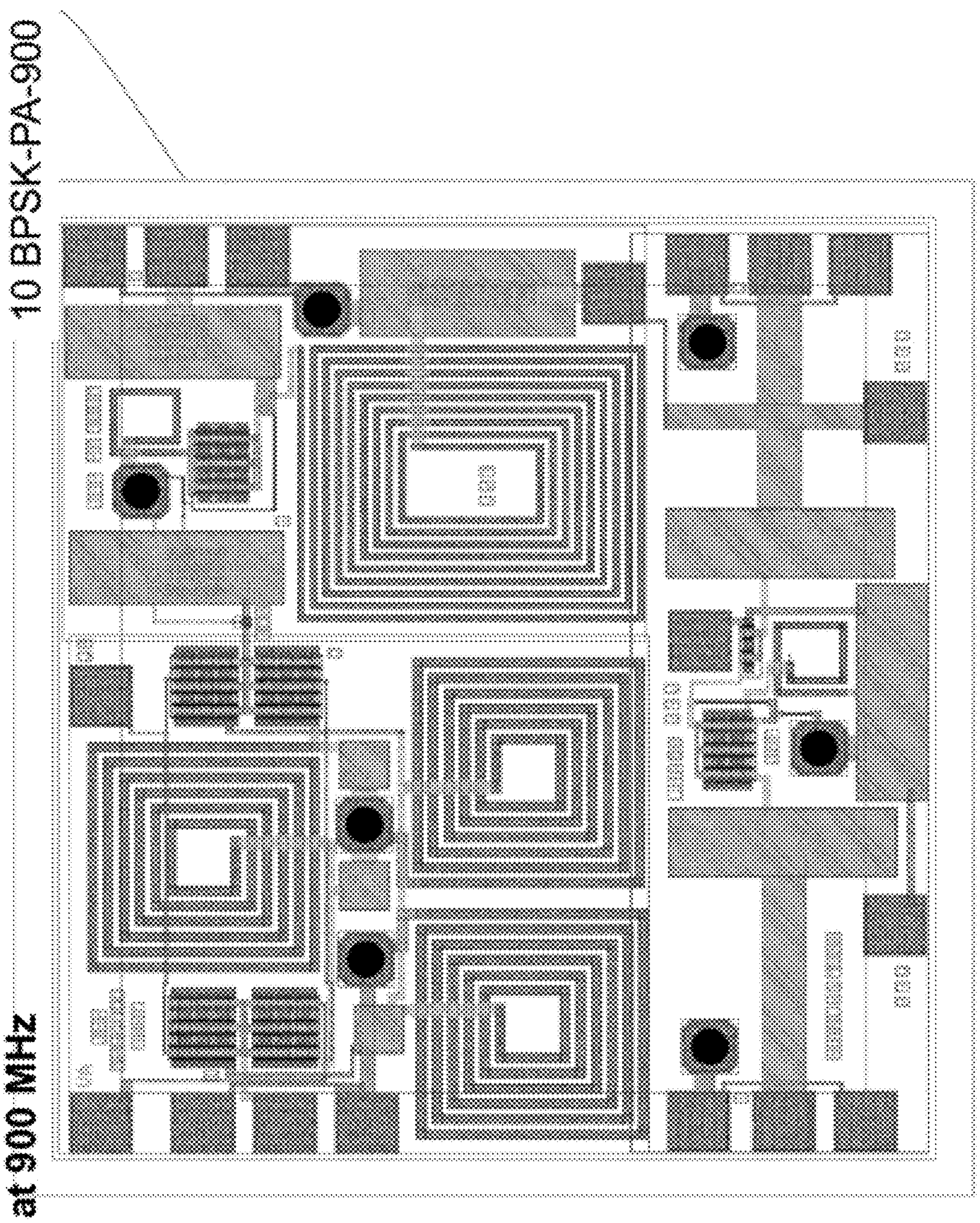
FIG. 22 Layout for the narrowband cascaded BPSK modulator & PA at 900 MHz

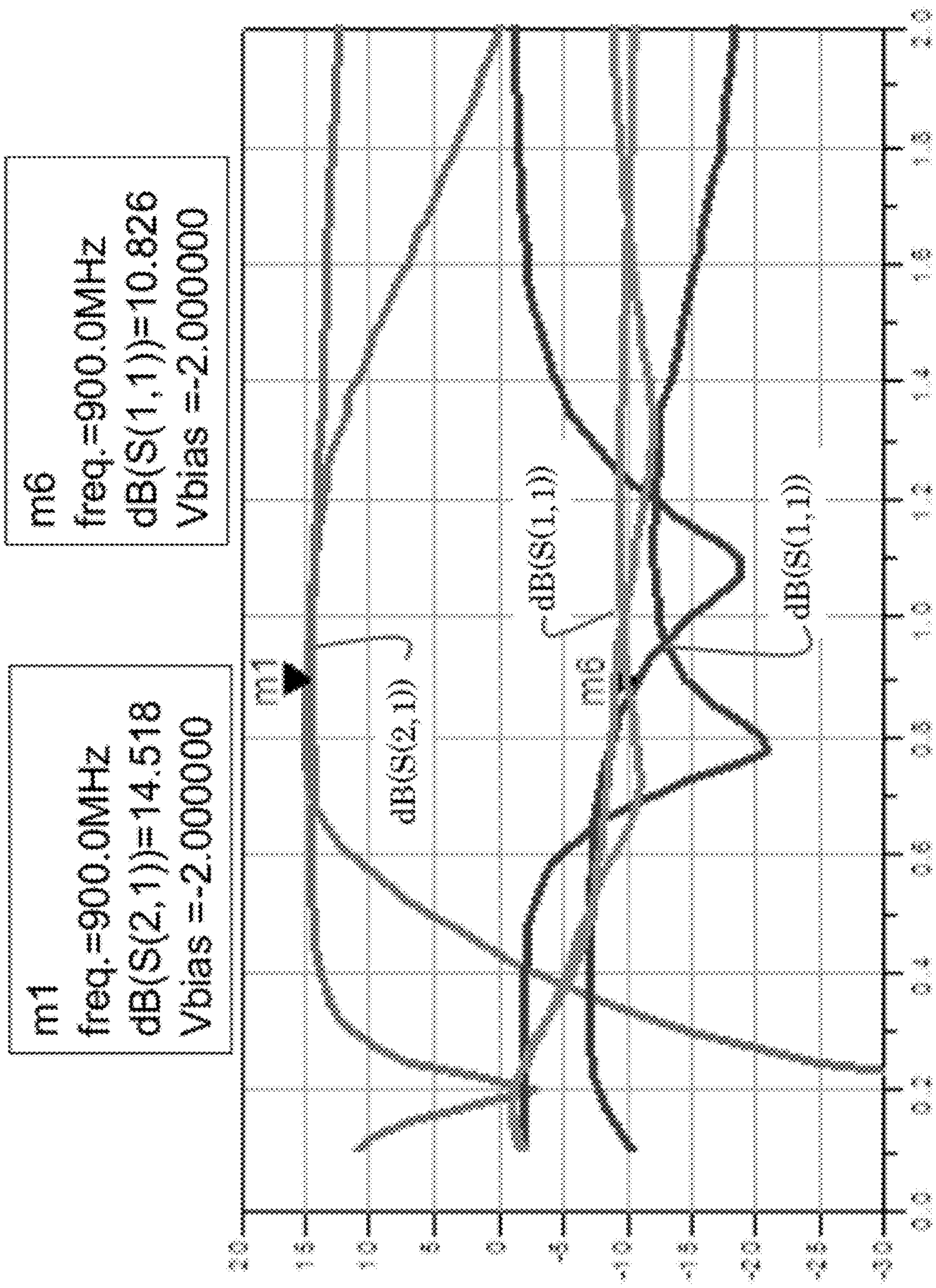
FIG. 23 S-parameters for the narrowband cascaded BPSK modulator and PA simulators at 900 MHz.

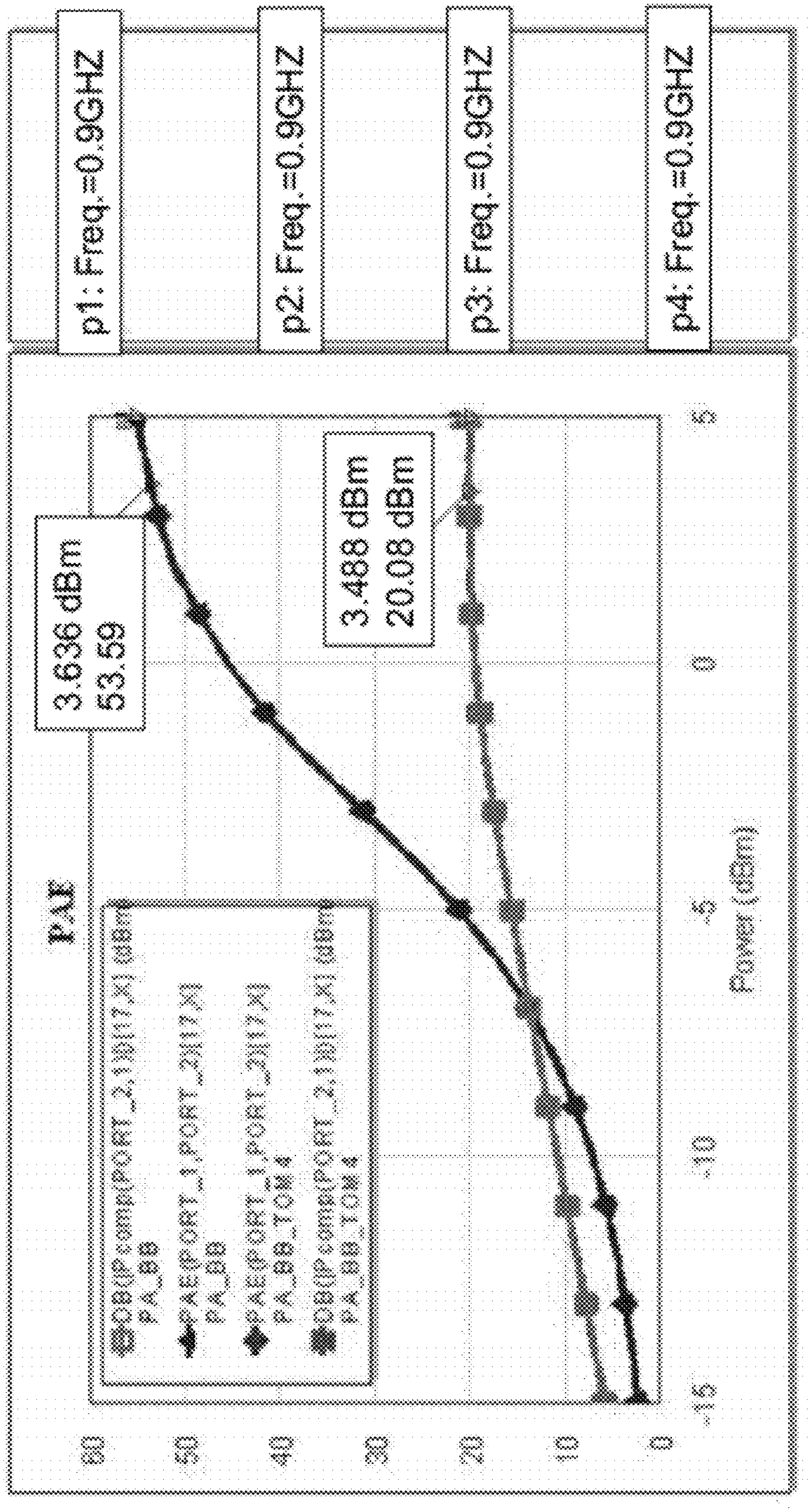
FIG. 24 OUTPUT POWER AND PAE OF THE PA AT 900 Mhz & 3.6 V DC BIAS

FIG. 25 Simulations of the S-parameters for the broadband LNA.
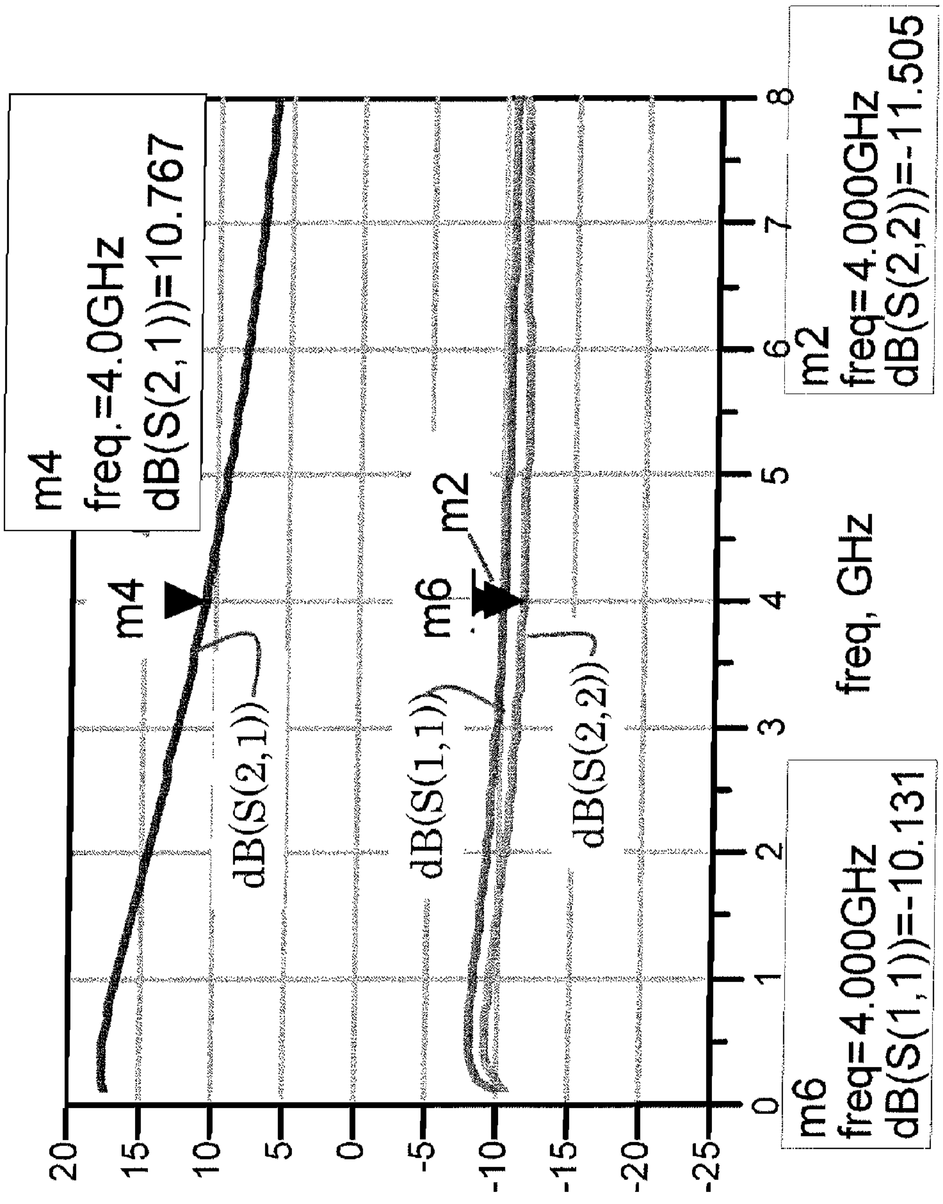

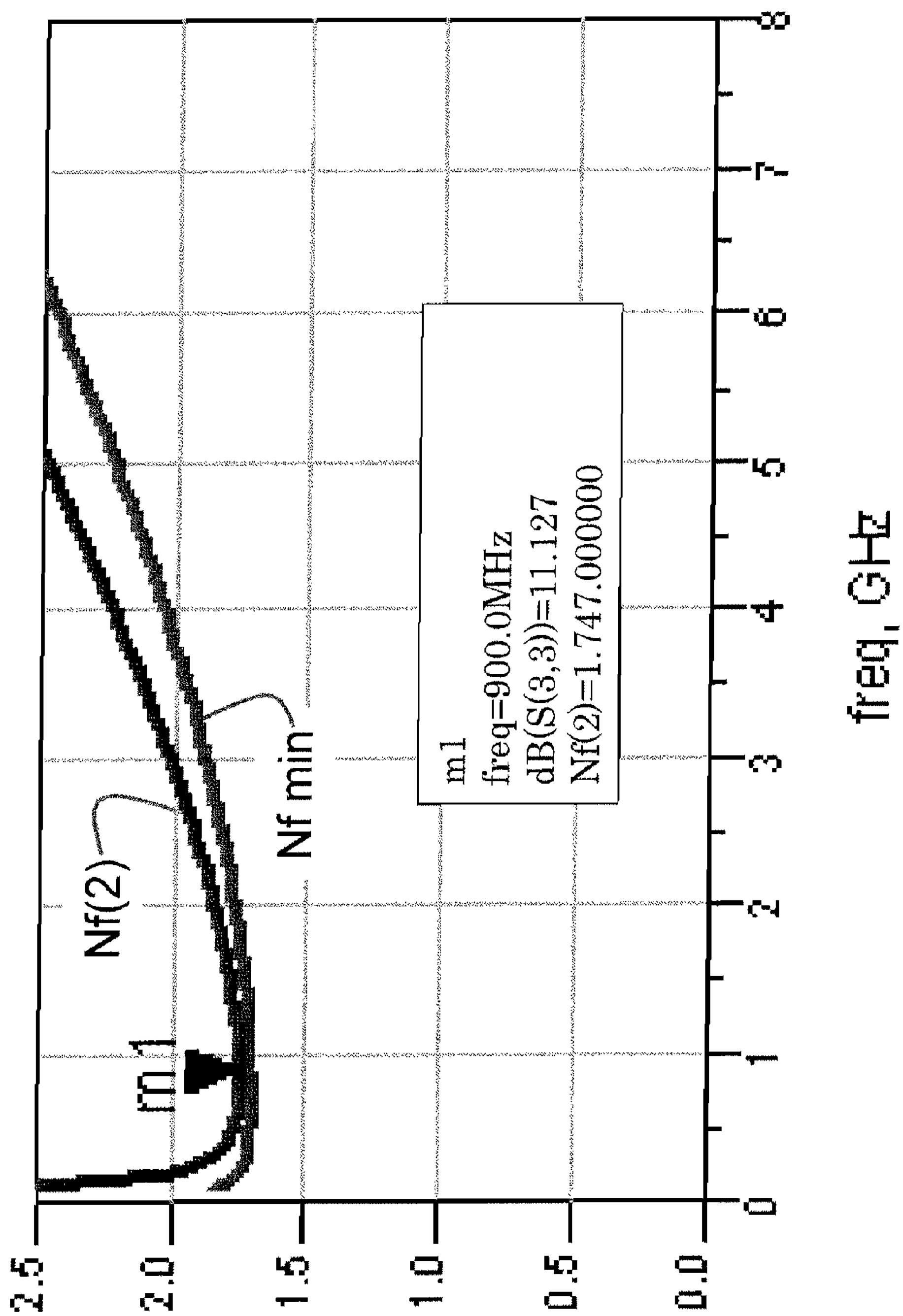
FIG. 26 NF for the broadband LNA.

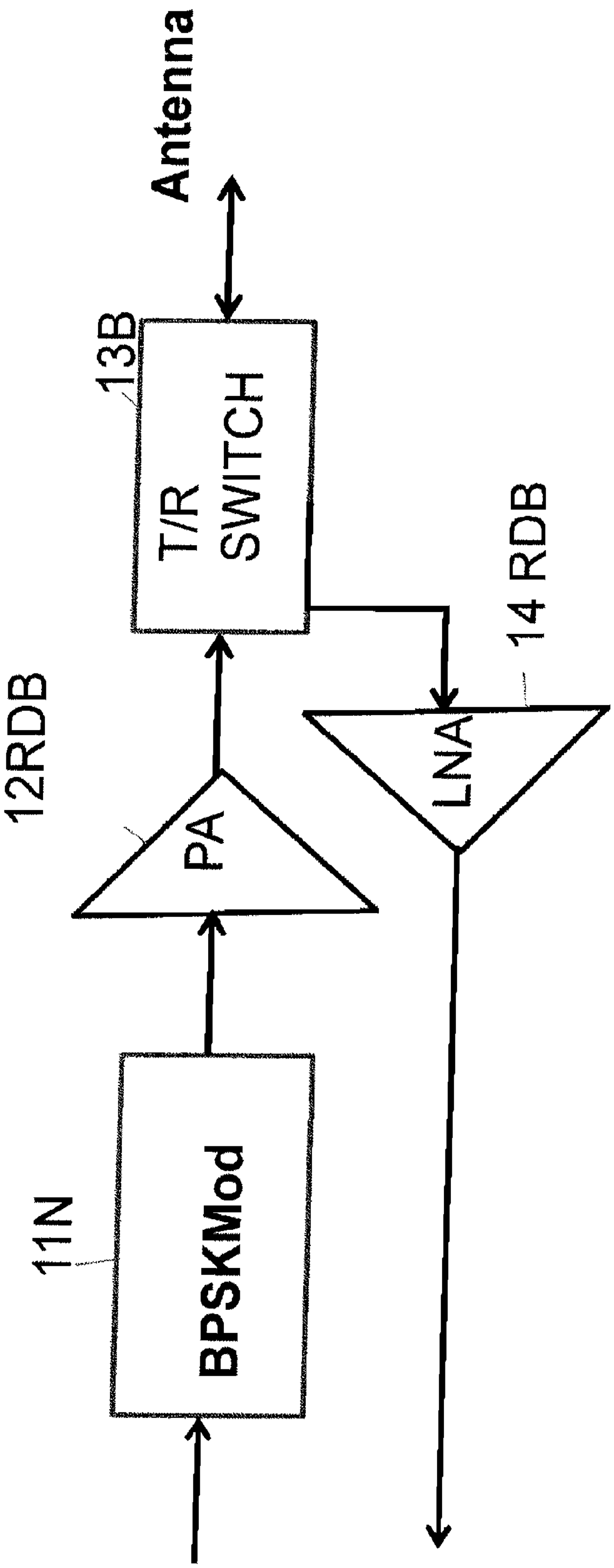
FIG. 27 Design components of the RFIC enhancement to the booster chip architecture.

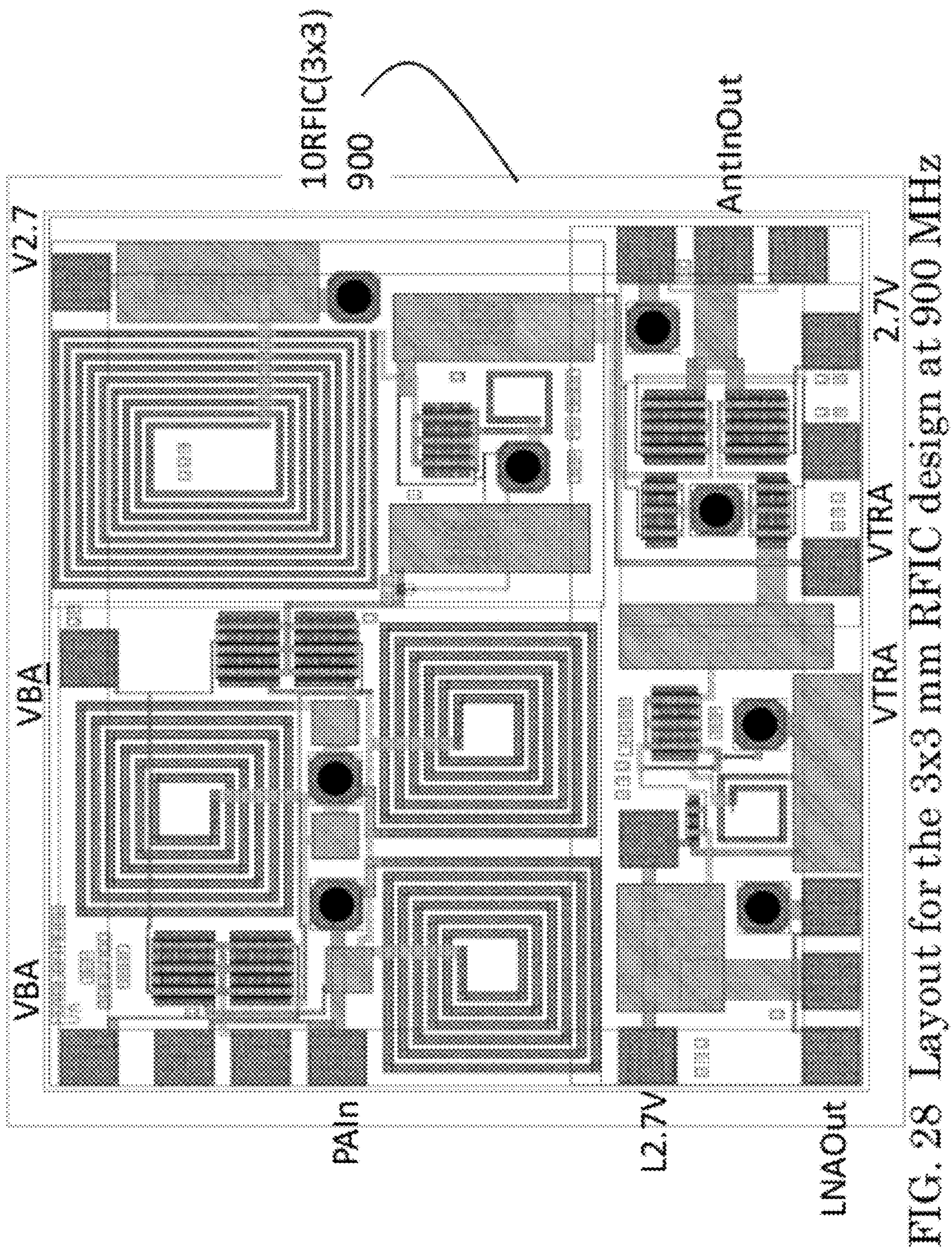
FIG. 28 Layout for the 3x3 mm RFIC design at 900 MHz

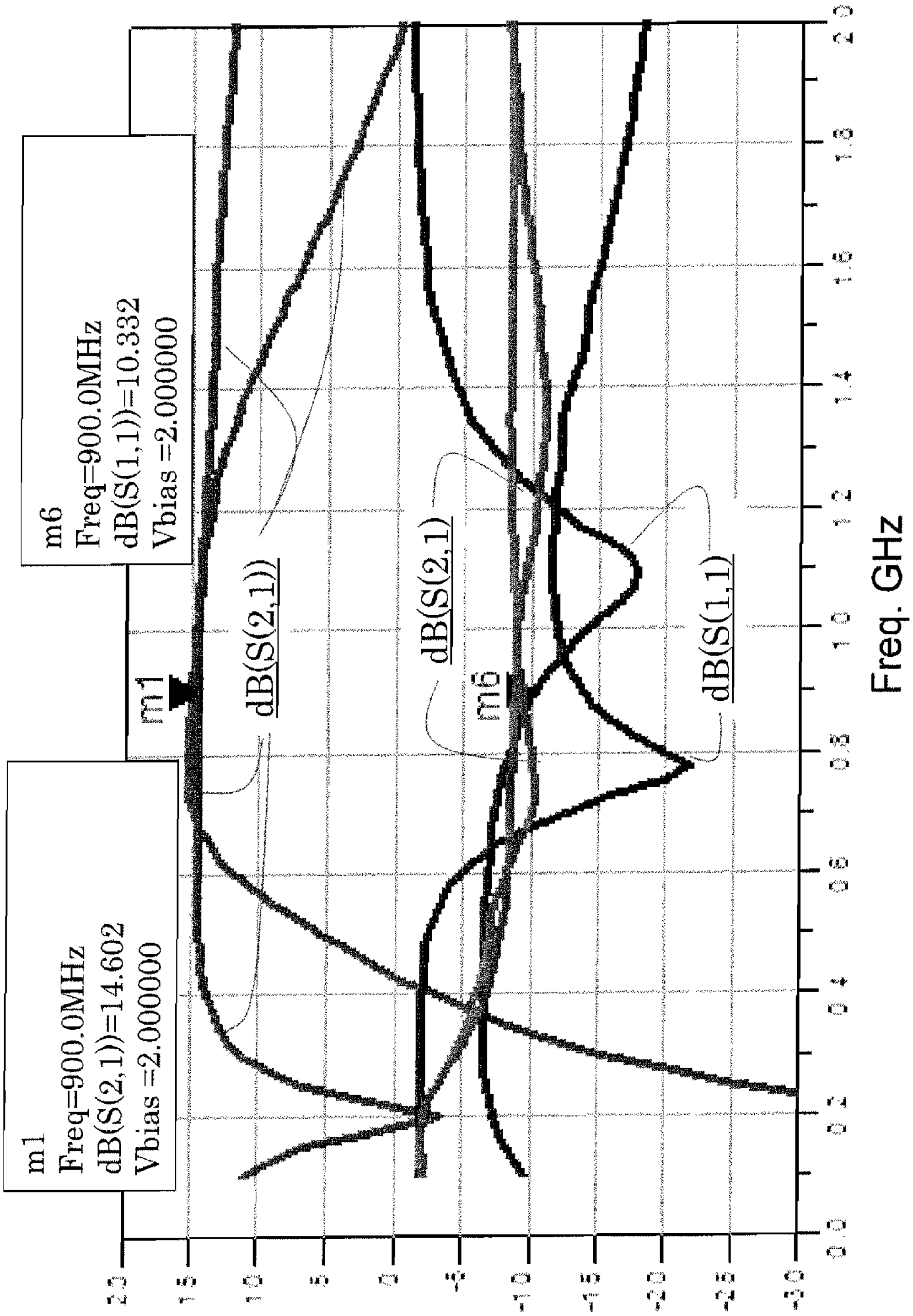
FIG. 29 S-parameters for the PA in both states of the BPSK modulator at 900 MHz.

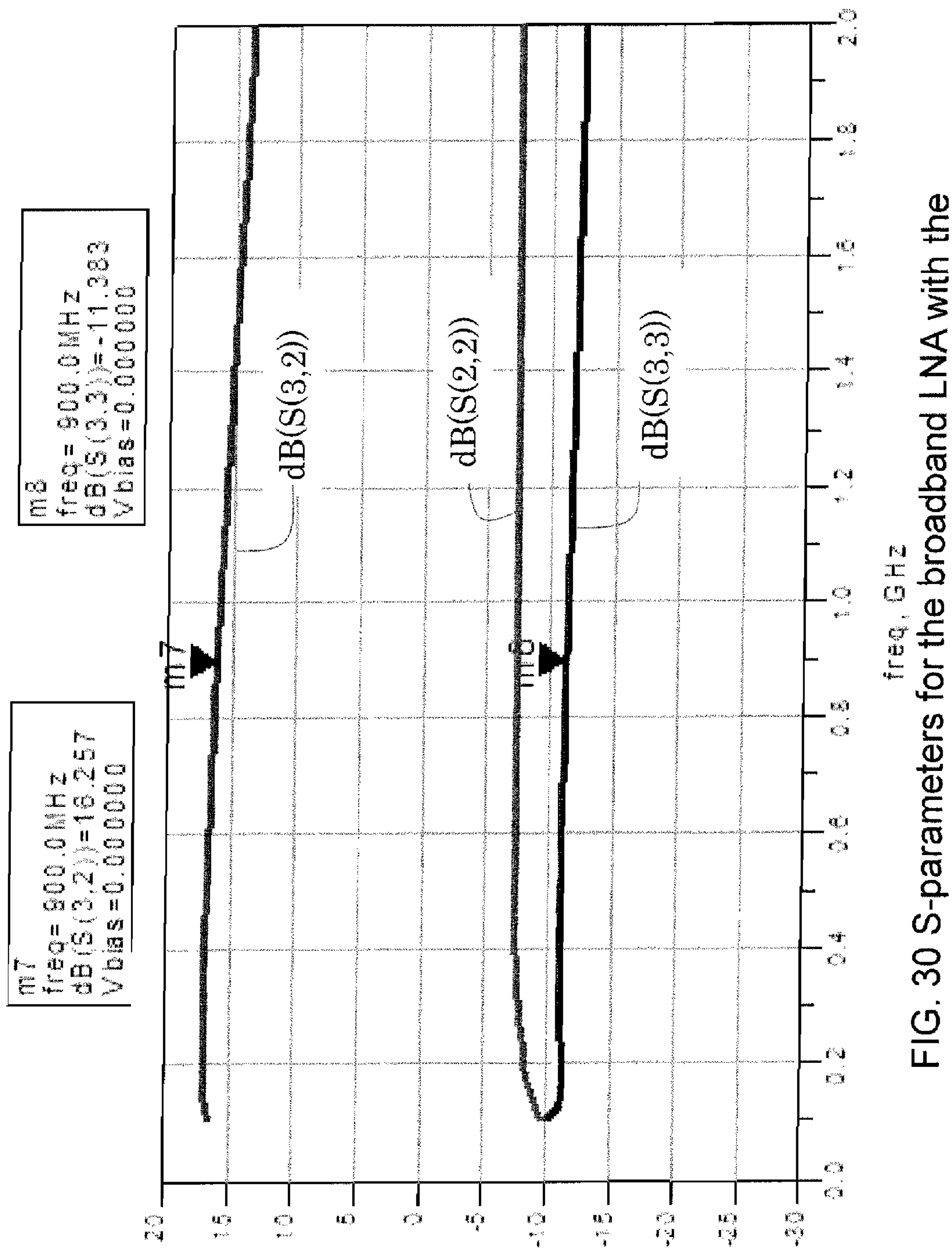
FIG. 30 S-parameters for the broadband LNA with the TR switch set to receive mode at 900 MHz.

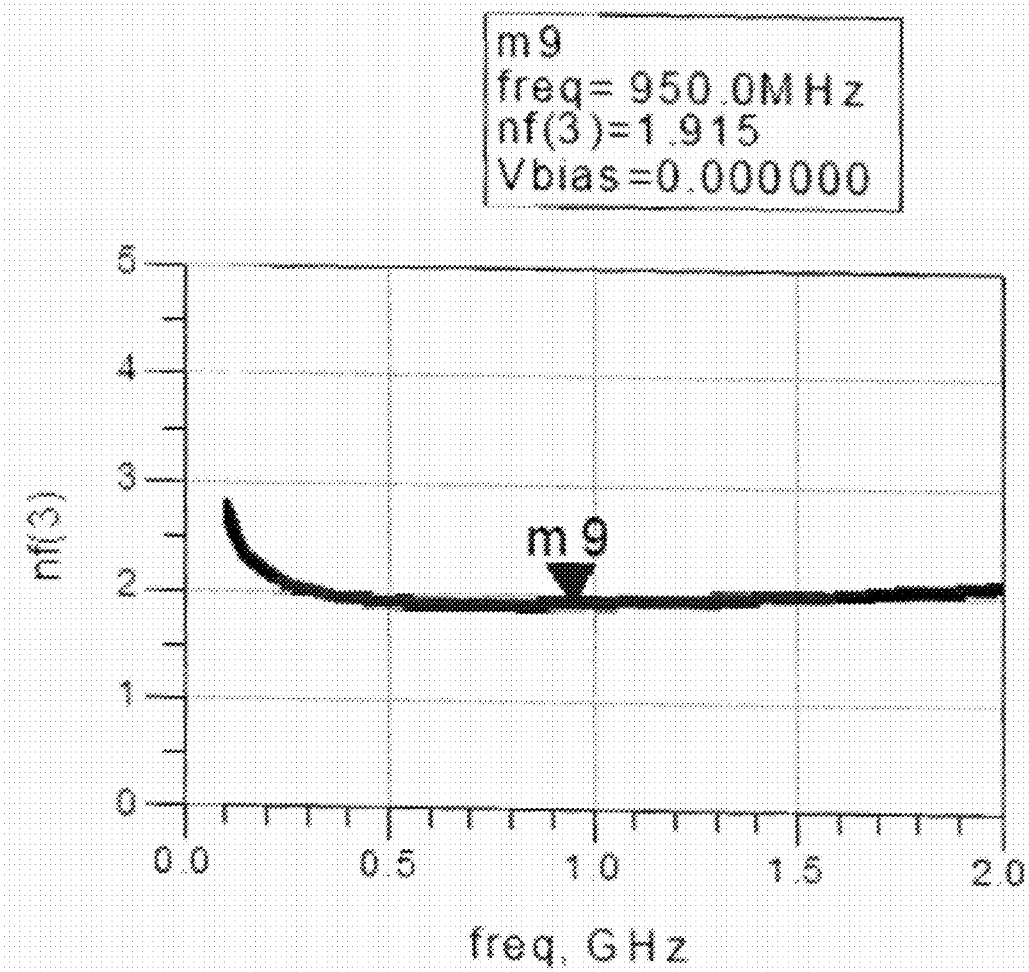
FIG. 31 NF for the broadband LNA with the TR switch set to receive mode at 900 MHz

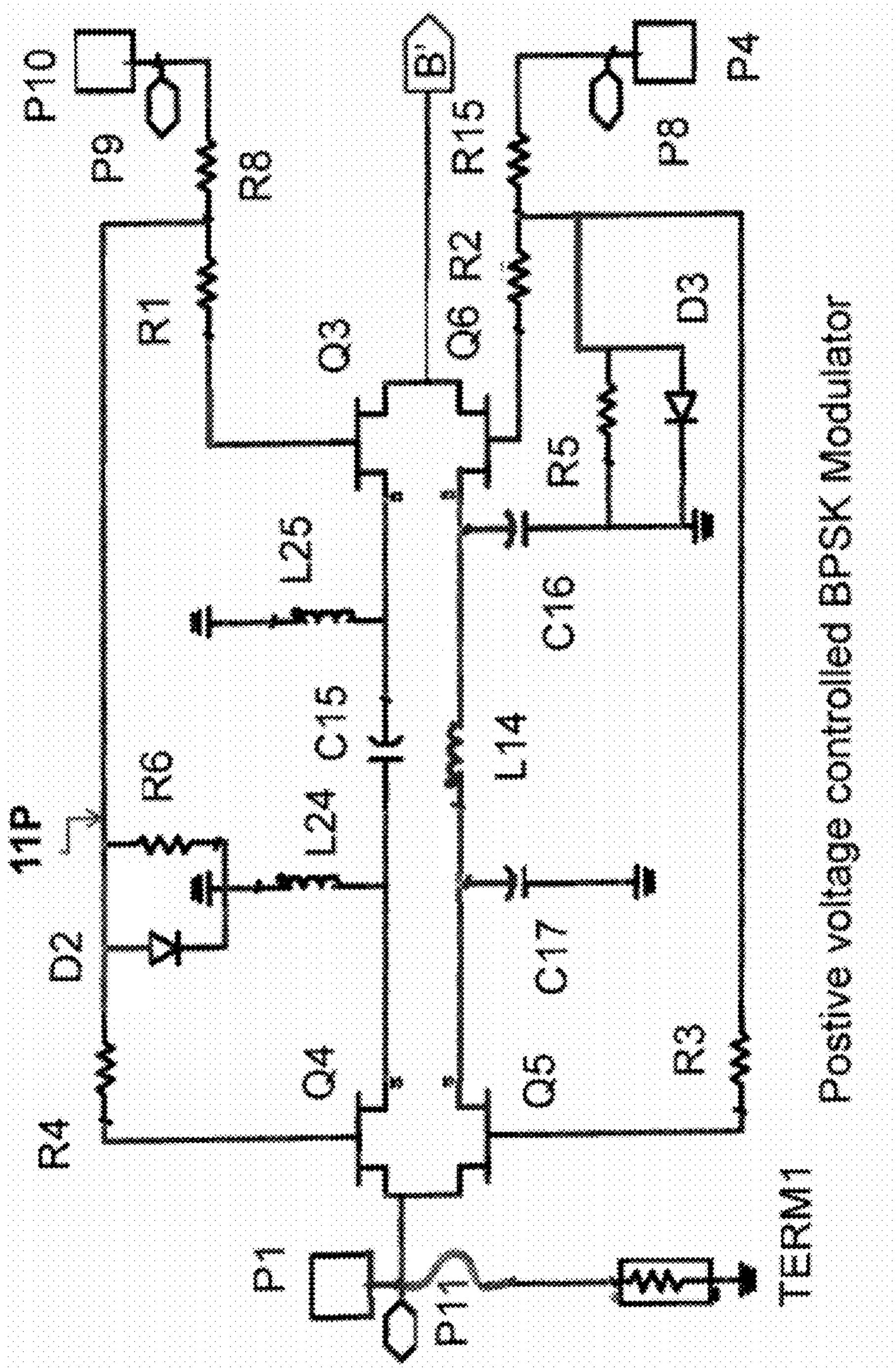
FIG. 32A - PART A of Schematic for the narrowband cascaded BPSK modulator &PA redesign with a robust current mirror at 450 MHz.

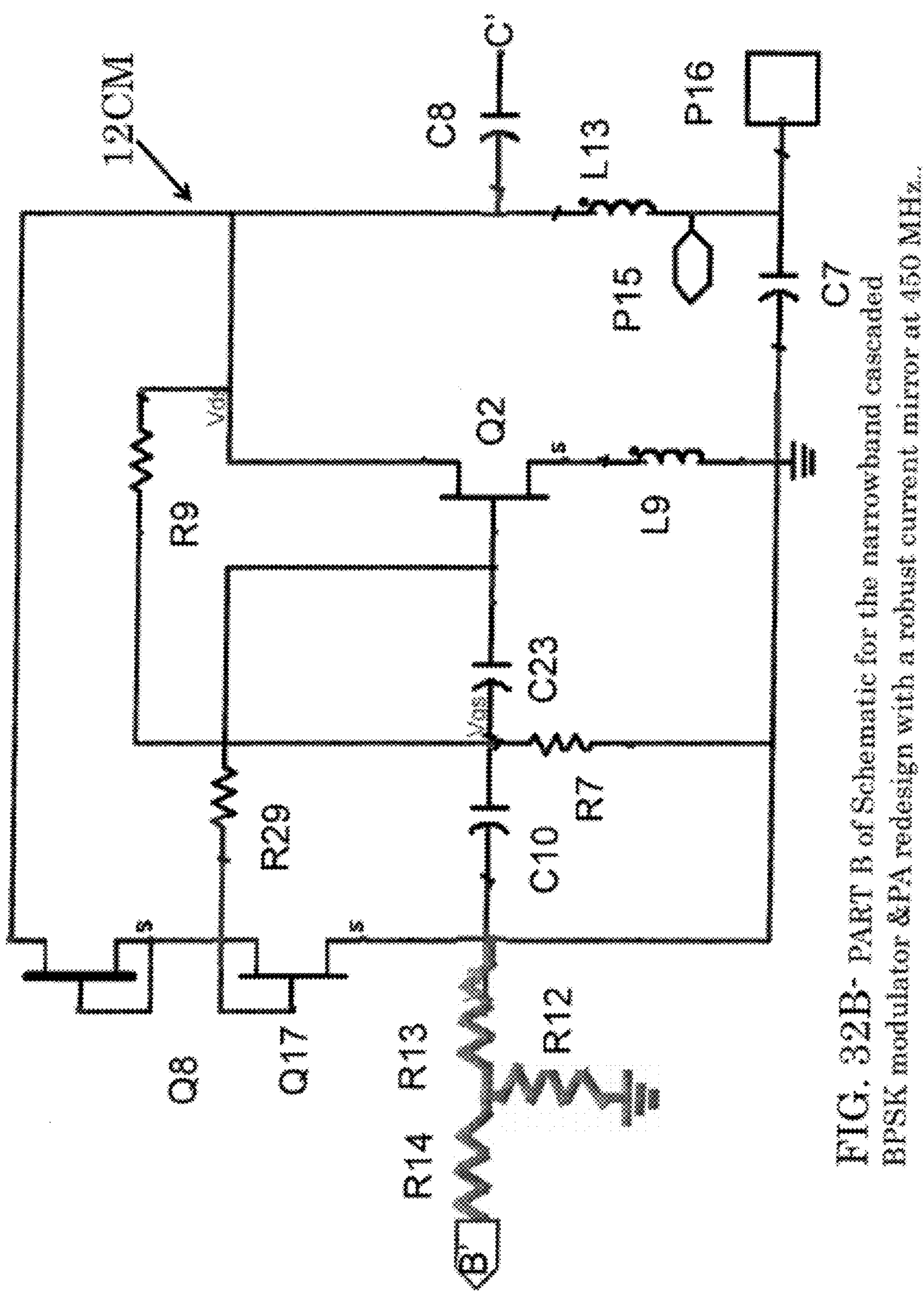
FIG. 32B- PART B of Schematic for the narrowband cascaded BPSK modulator &PA redesign with a robust current mirror at 450 MHz..

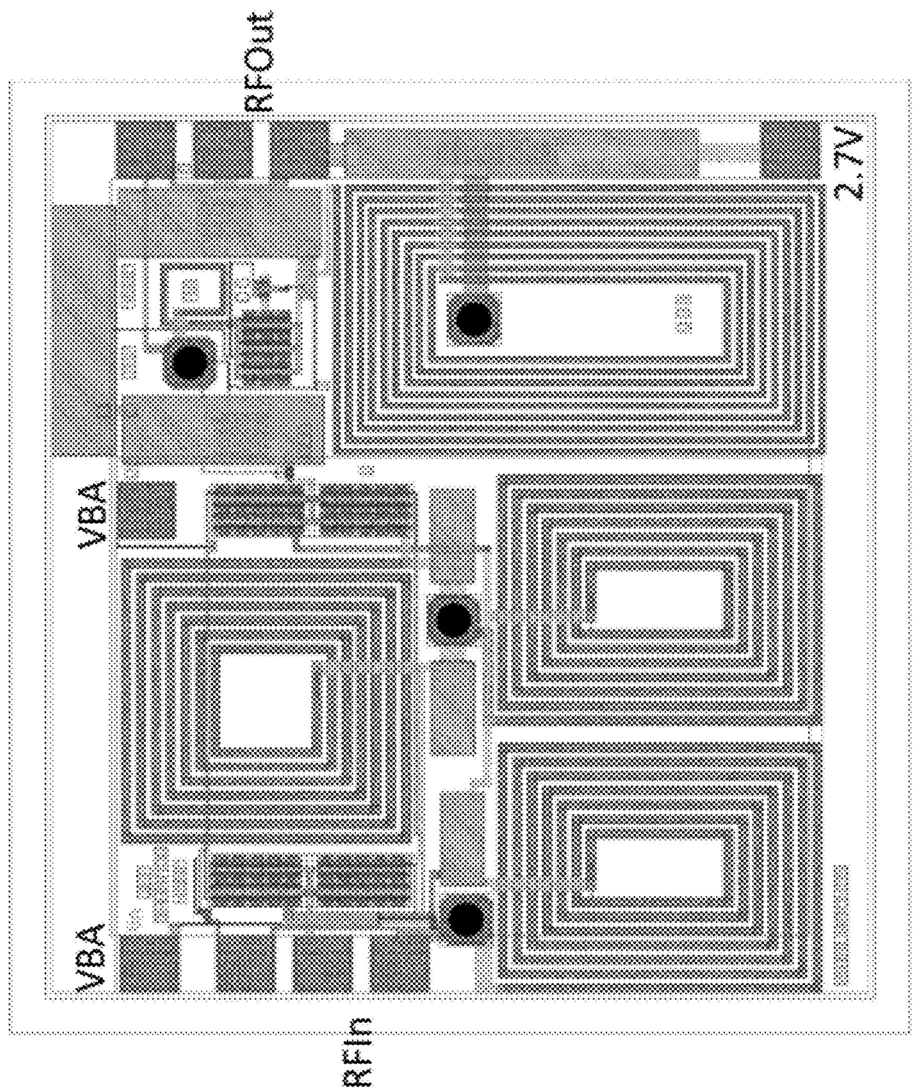
FIG. 33 Layout for the narrowband cascaded BPSK modulator and PA redesign with a robust current mirror at 450 MHz

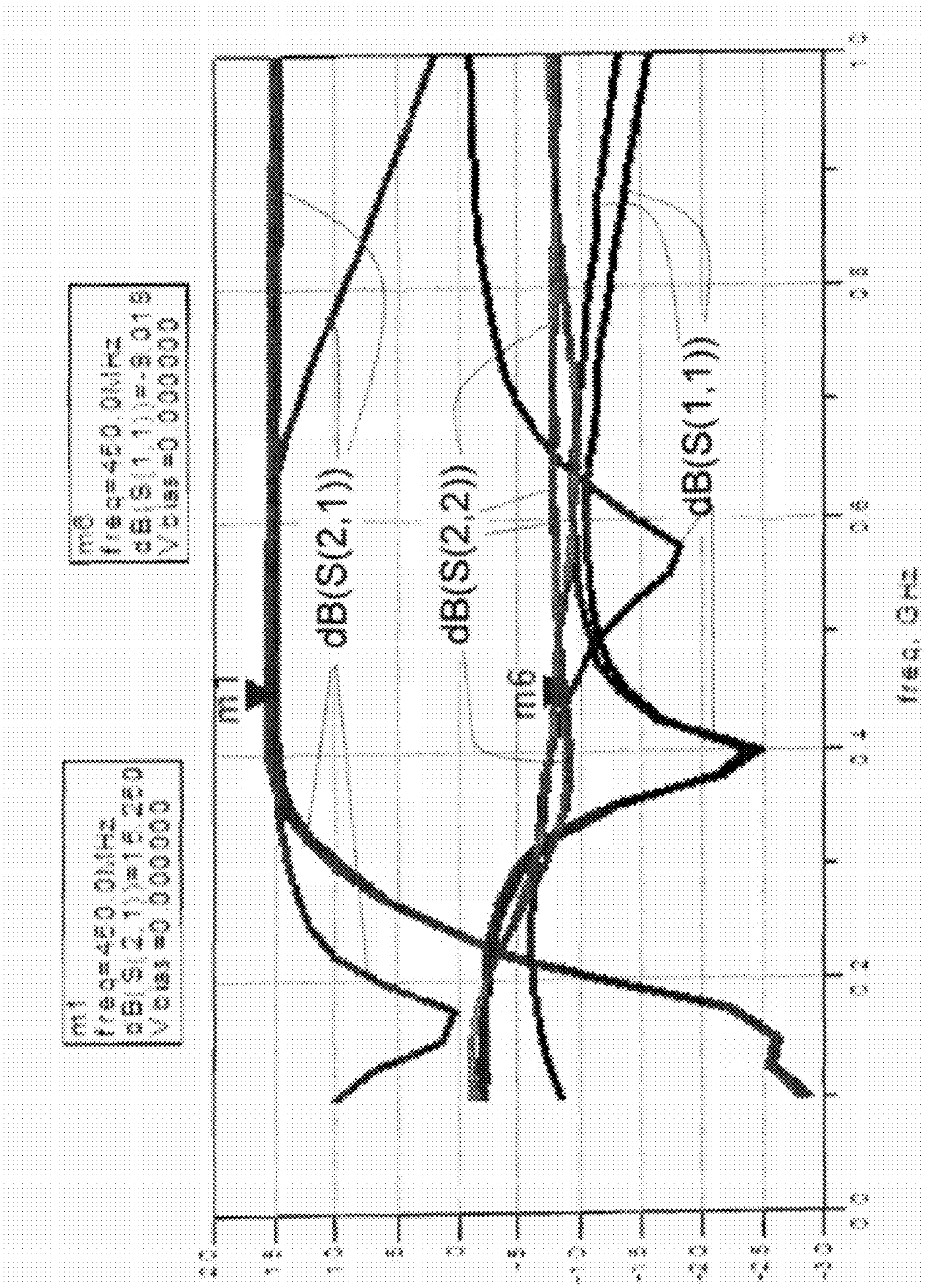
FIG. 34 S-parameters for the cascaded PA in both states of the Narrowband BPSK modulator wih a robust current mirror at 450 MHz.

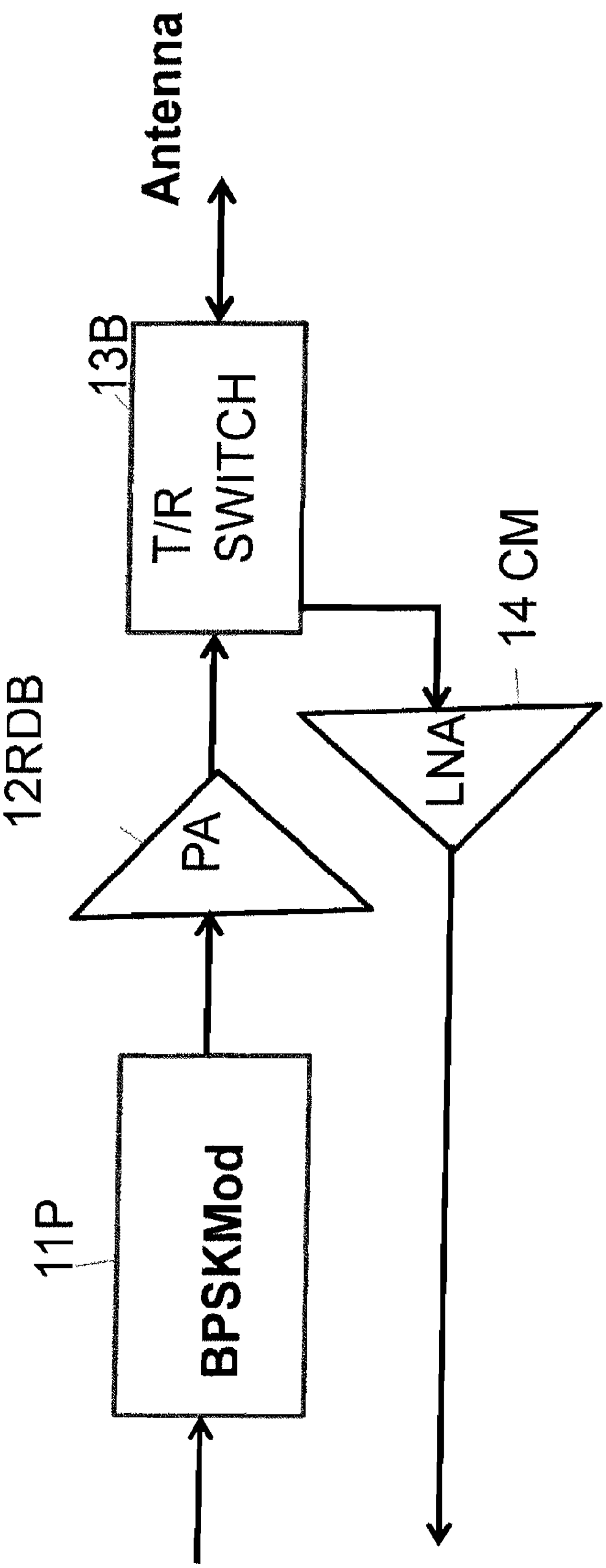
FIG. 35 [ARL 9] Design components of the RFIC enhancement to the booster chip architecture.

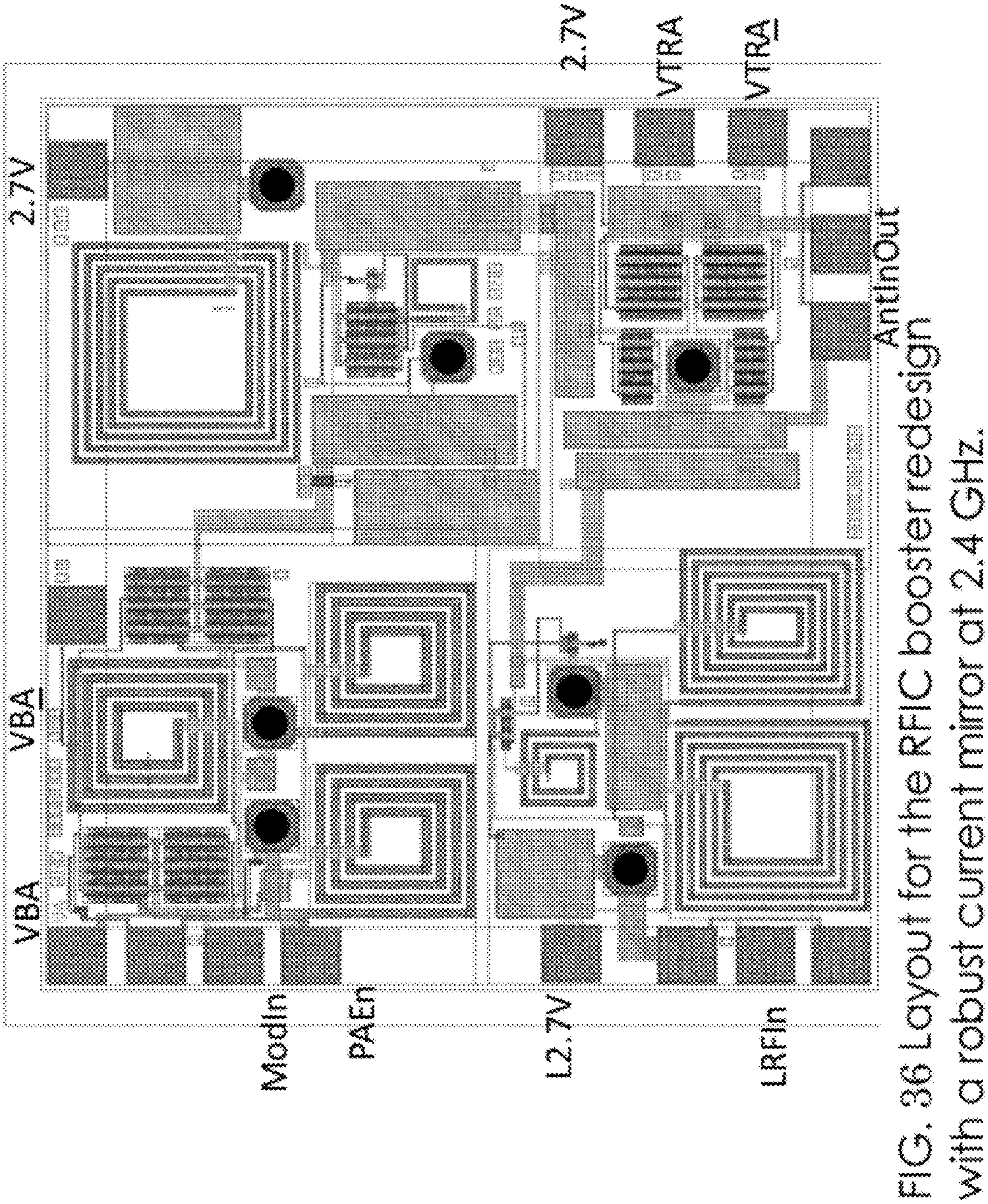
FIG. 36 Layout for the RFIC booster redesign with a robust current mirror at 2.4 GHz.

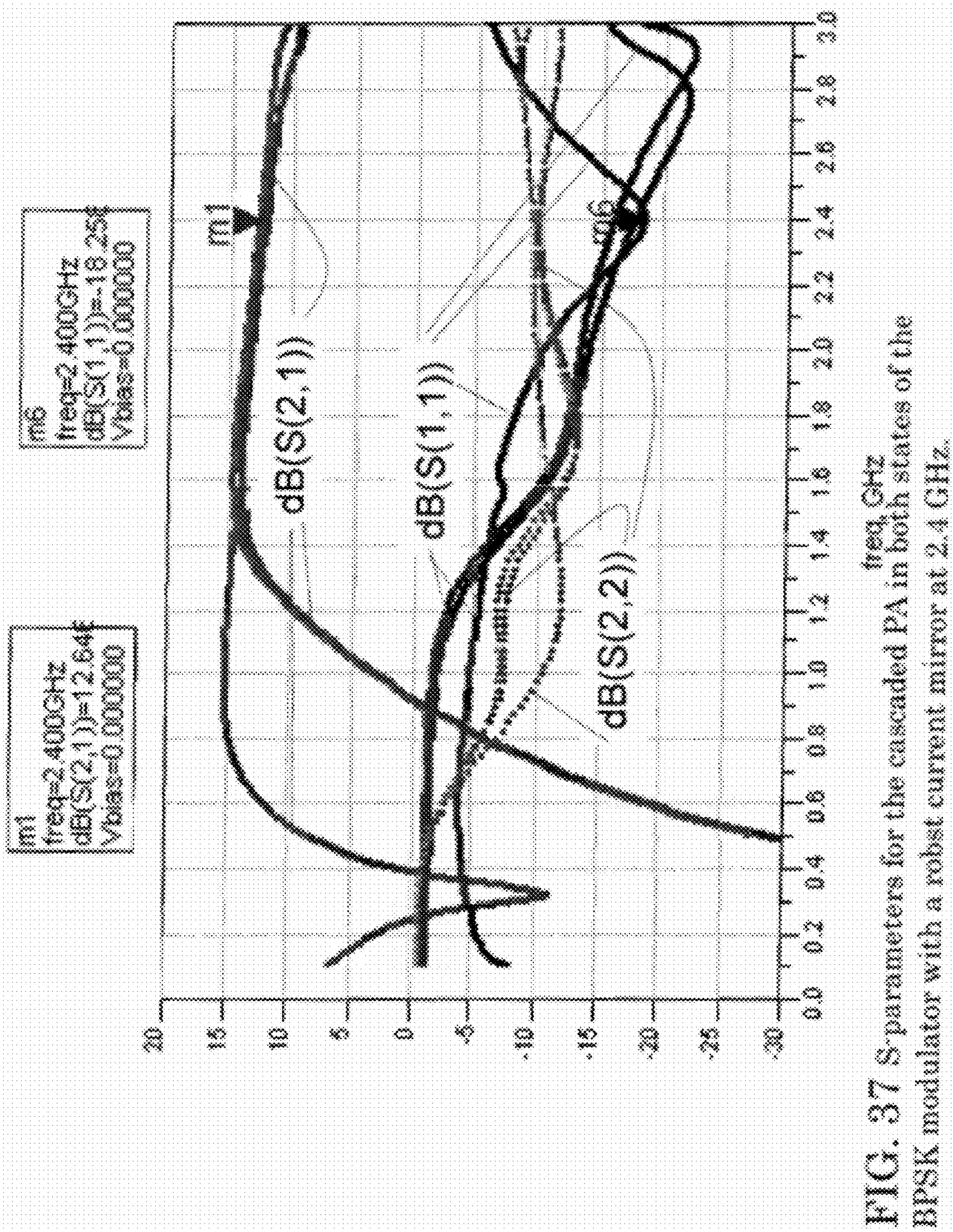
FIG. 37 S-parameters for the cascaded PA in both states of the BPSK modulator with a robst current mirror at 2.4 GHz.

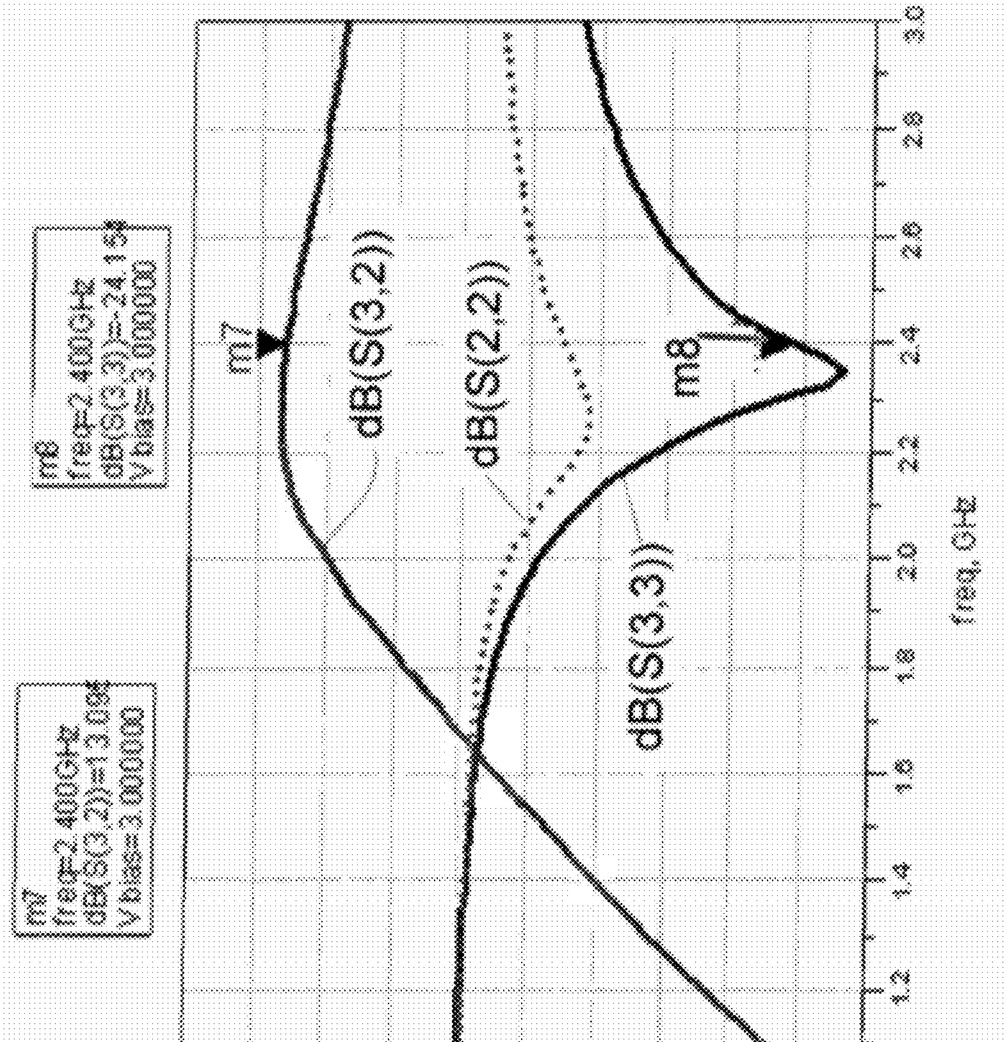
FIG. 38 S-parameters for the LNA with the TR switch set to receive mode and an additional current mirror at 2.4 GHz.

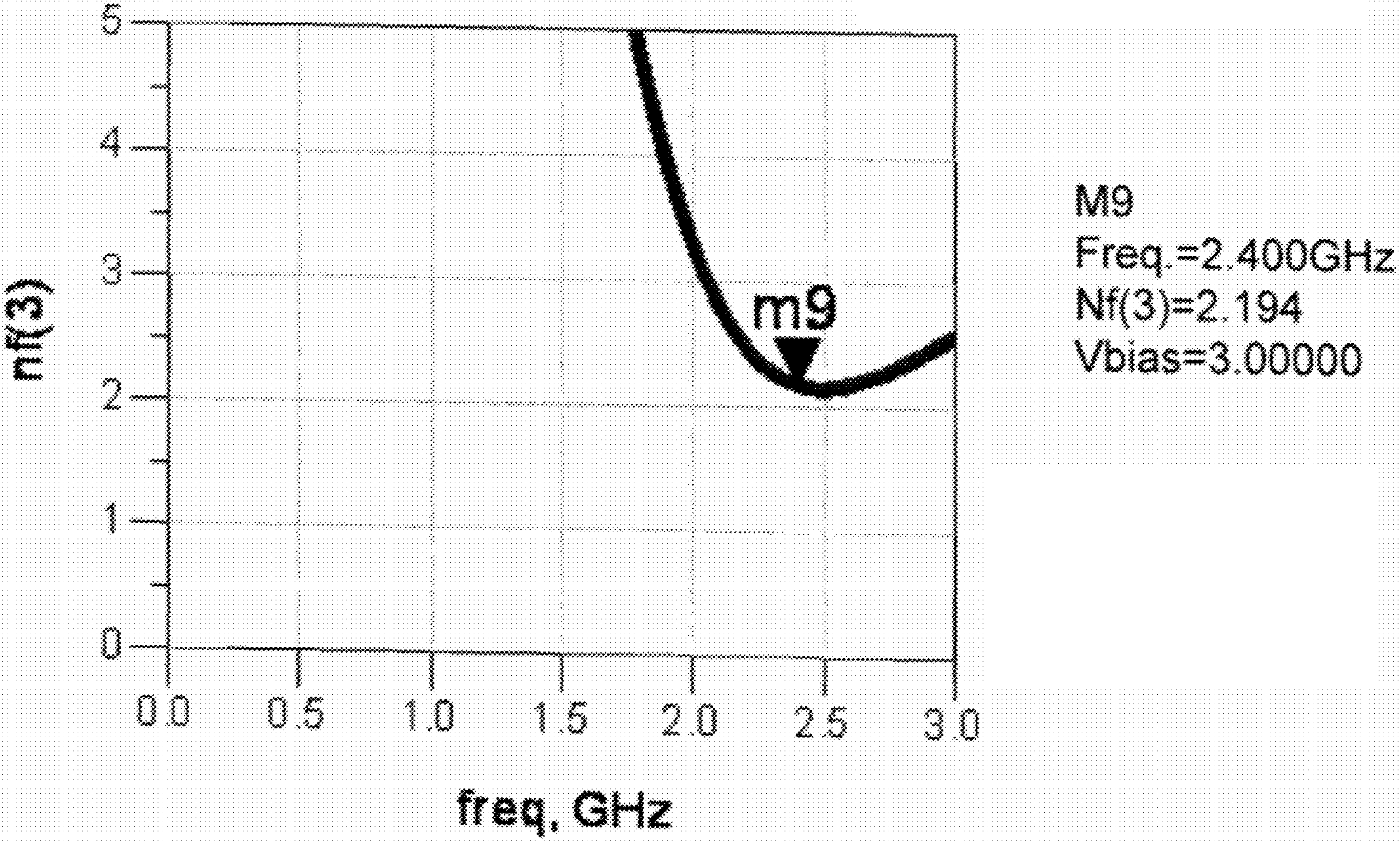
FIG. 39 NF for the LNA with the TR switch set to receive mode and an additional current mirror at 2.4 GHz.

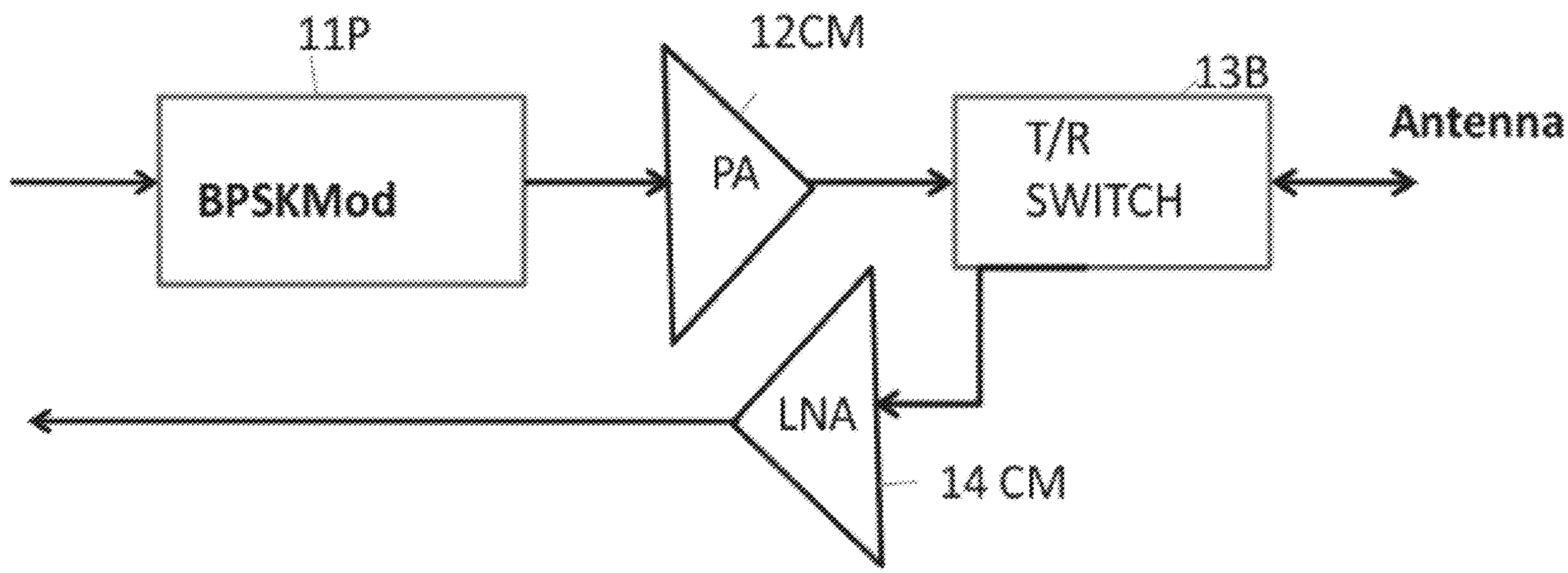
FIG. 40 [ARL 10] Design components of the RFIC enhancement to the booster chip architecture.

Layout : 4x4 mm narrowband RFIC booster redesign @ 900MHz

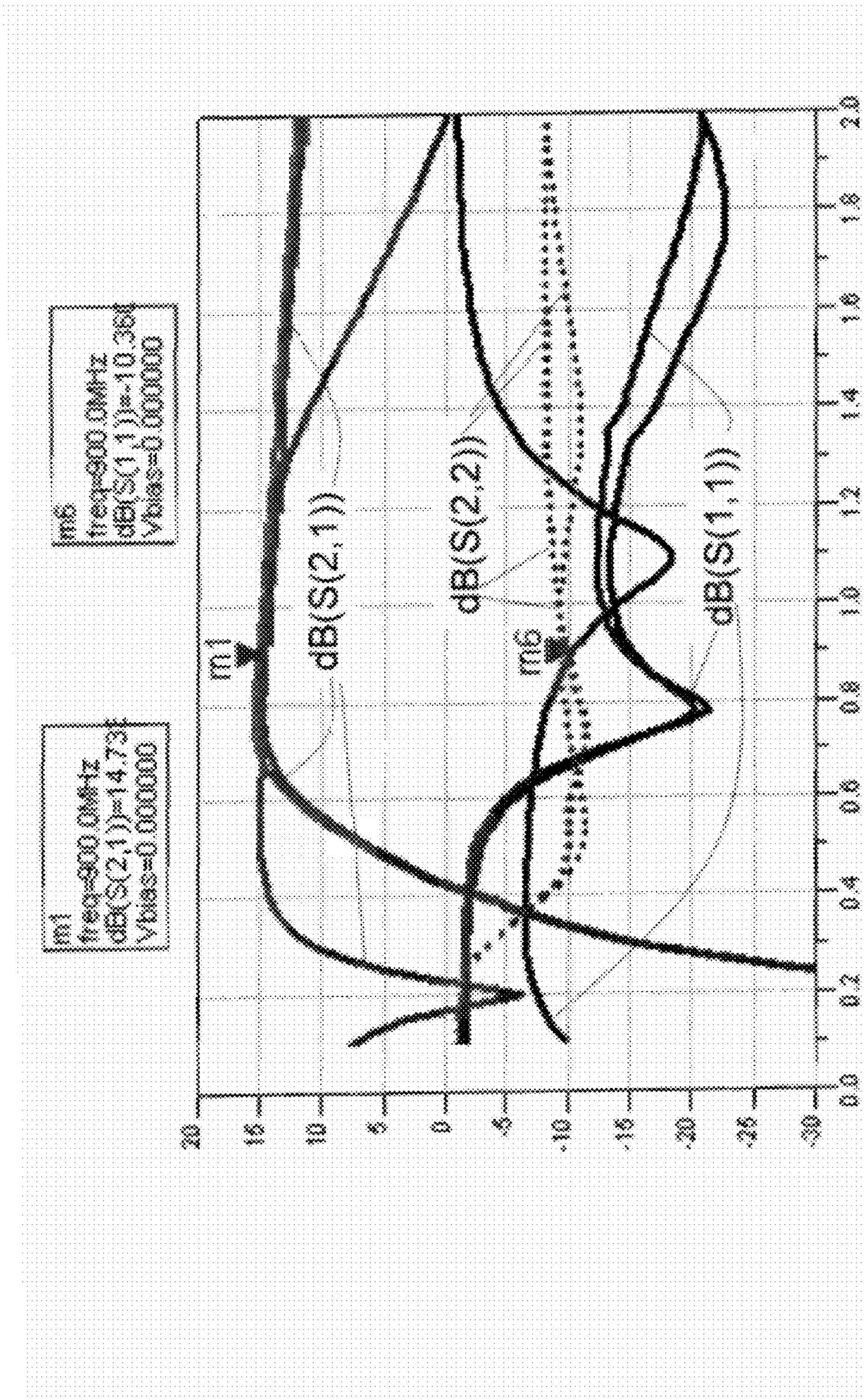
FIG. 42 S-parameters for the cascaded PA redesign in both states of the BPSK modulator.

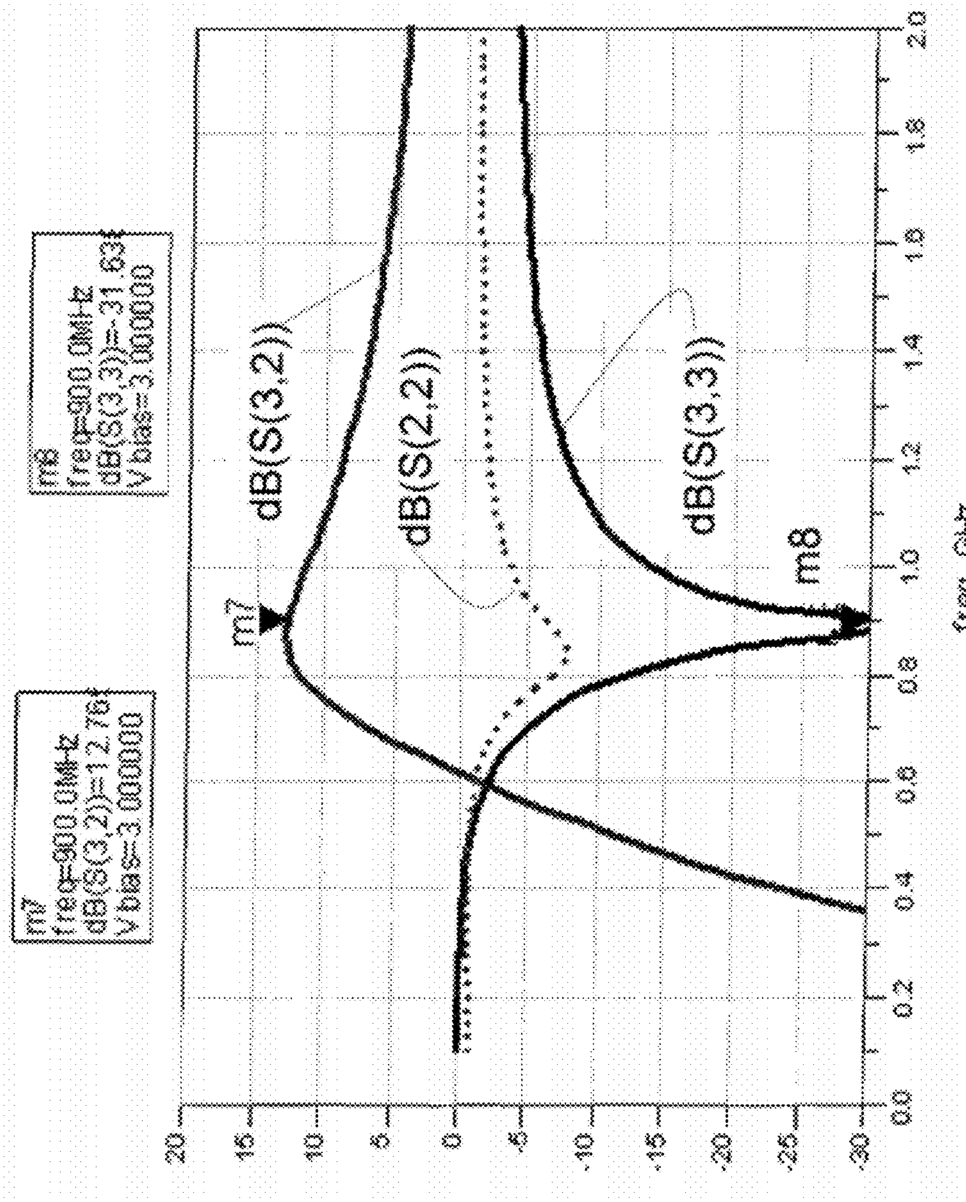
FIG. 43 S-parameters for the LNA redesign with the TR switch set to receive mode at 900 MHz.

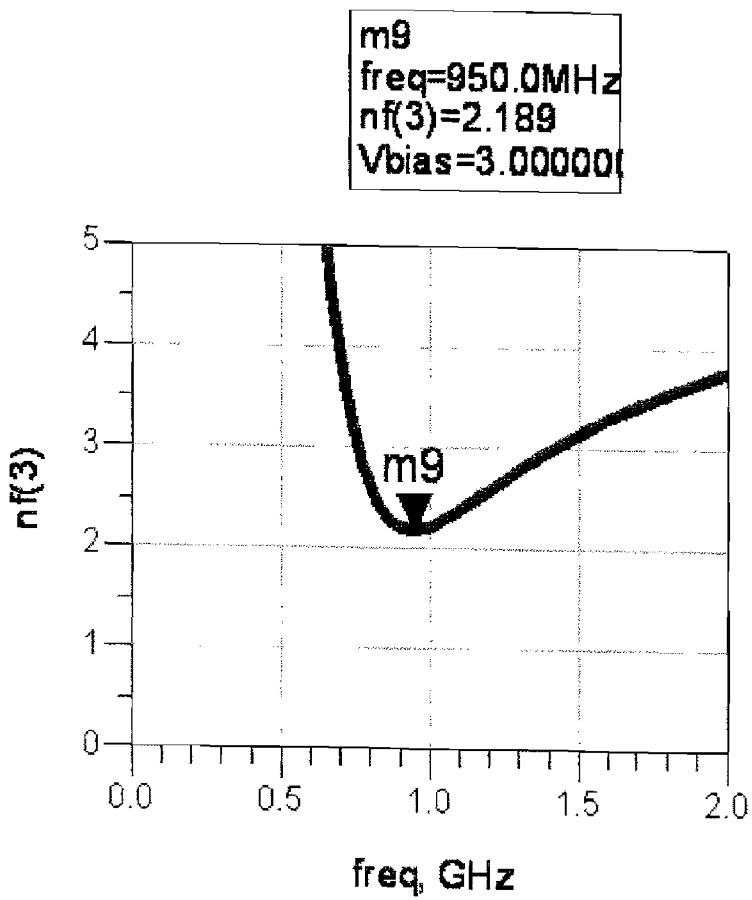
FIG. 44 NF for the LNA redesign wit the TR switch set to receive mode at 2.4 GHz.

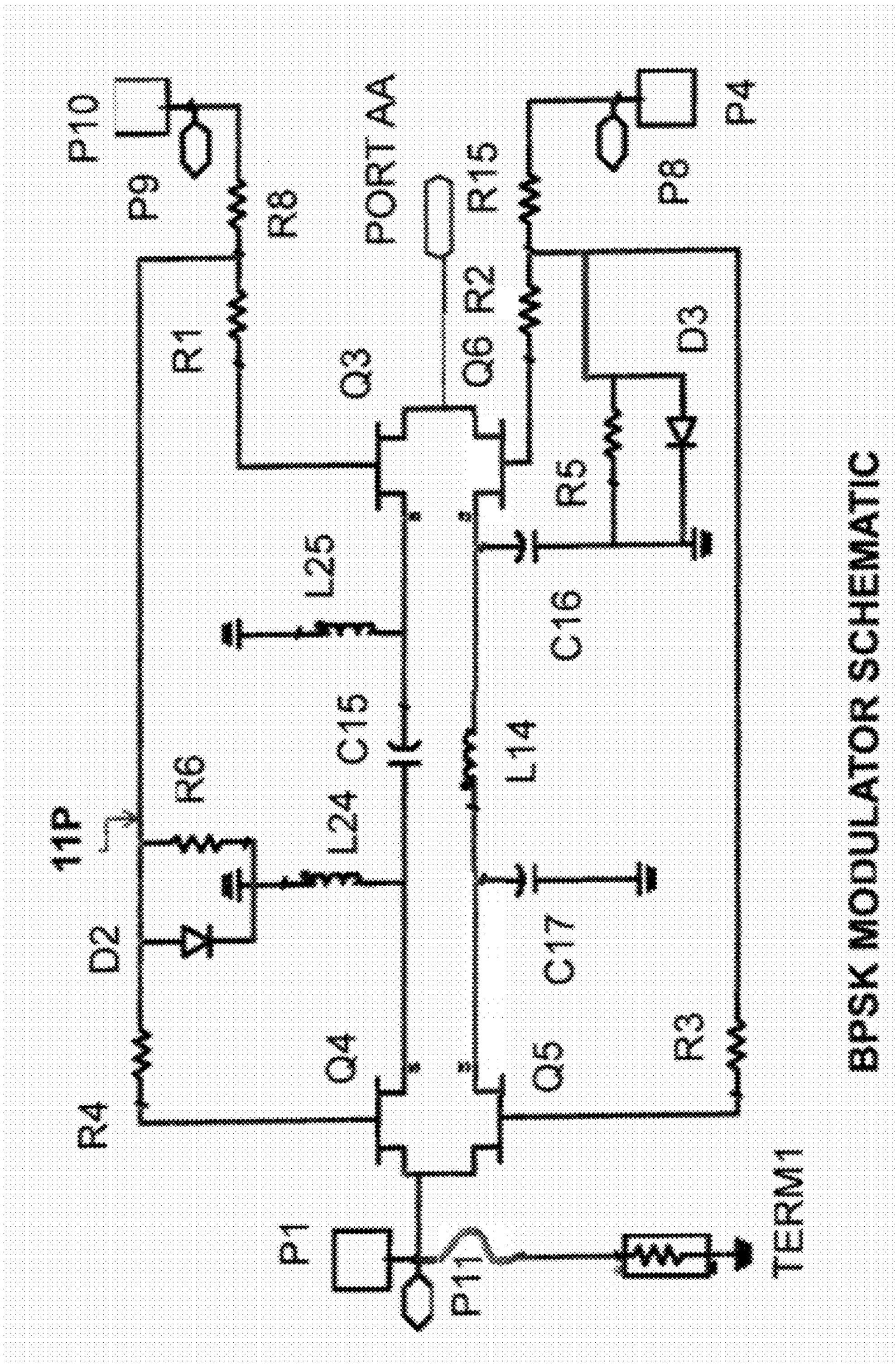
FIG. 45A PART A of Schematic for the full RFIC booster redesign at 450 MHz

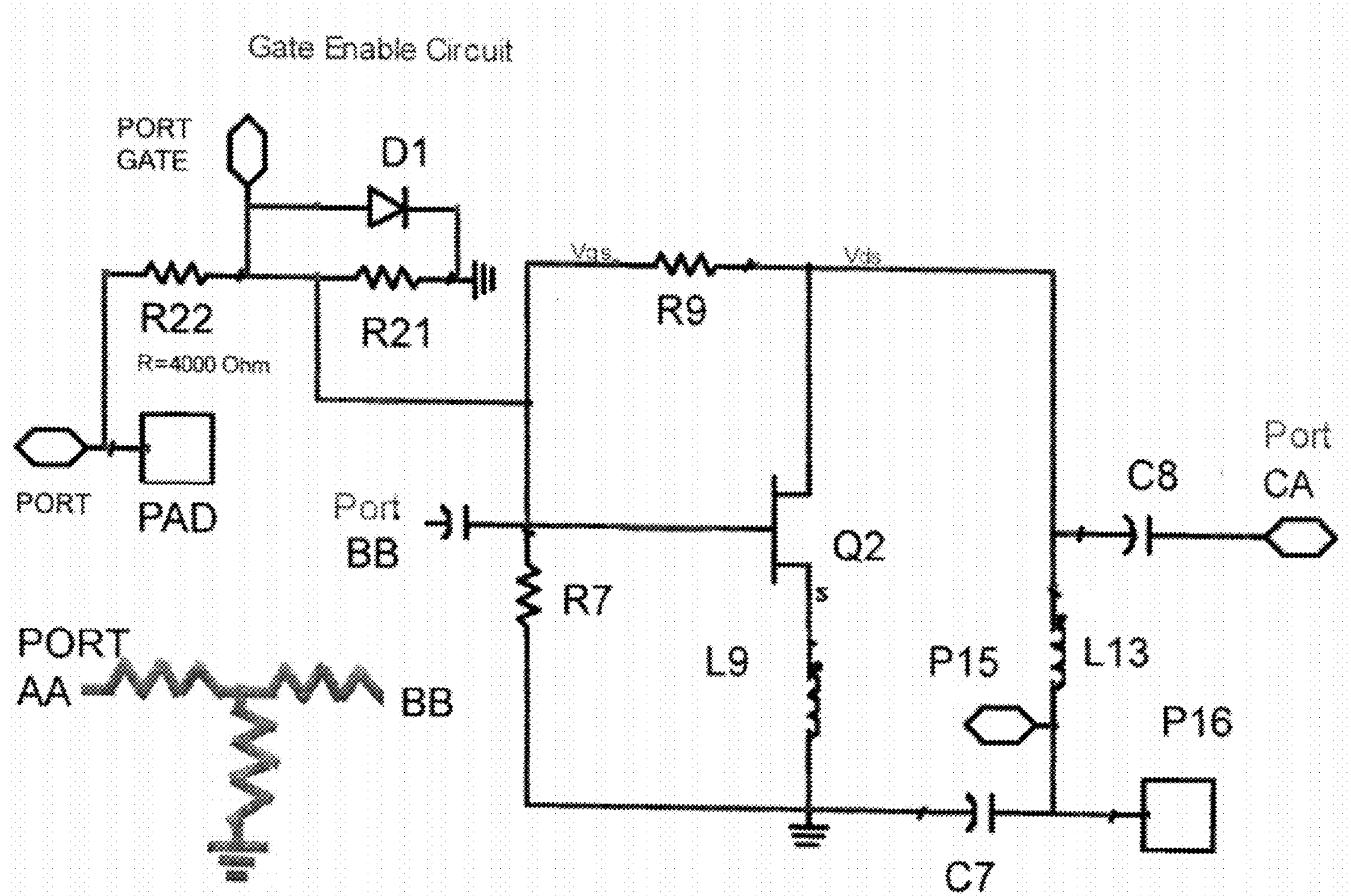
FIG. 45B PART B of Schematic for the full RFIC booster Redesign at 450 MHz ARL11

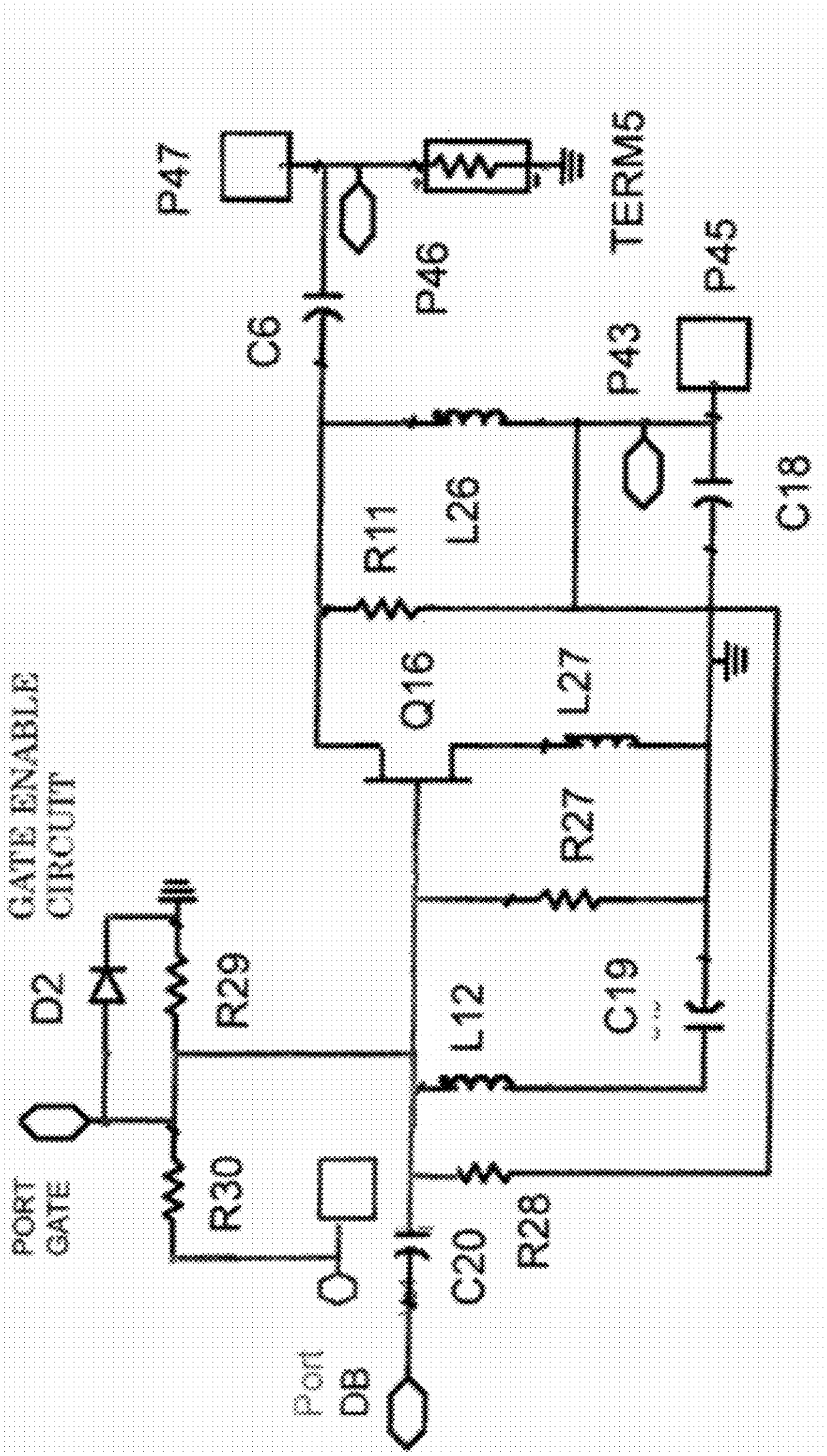
FIG. 45C - PART C of Schematic for the full RFIC booster redesign at 450 MHz

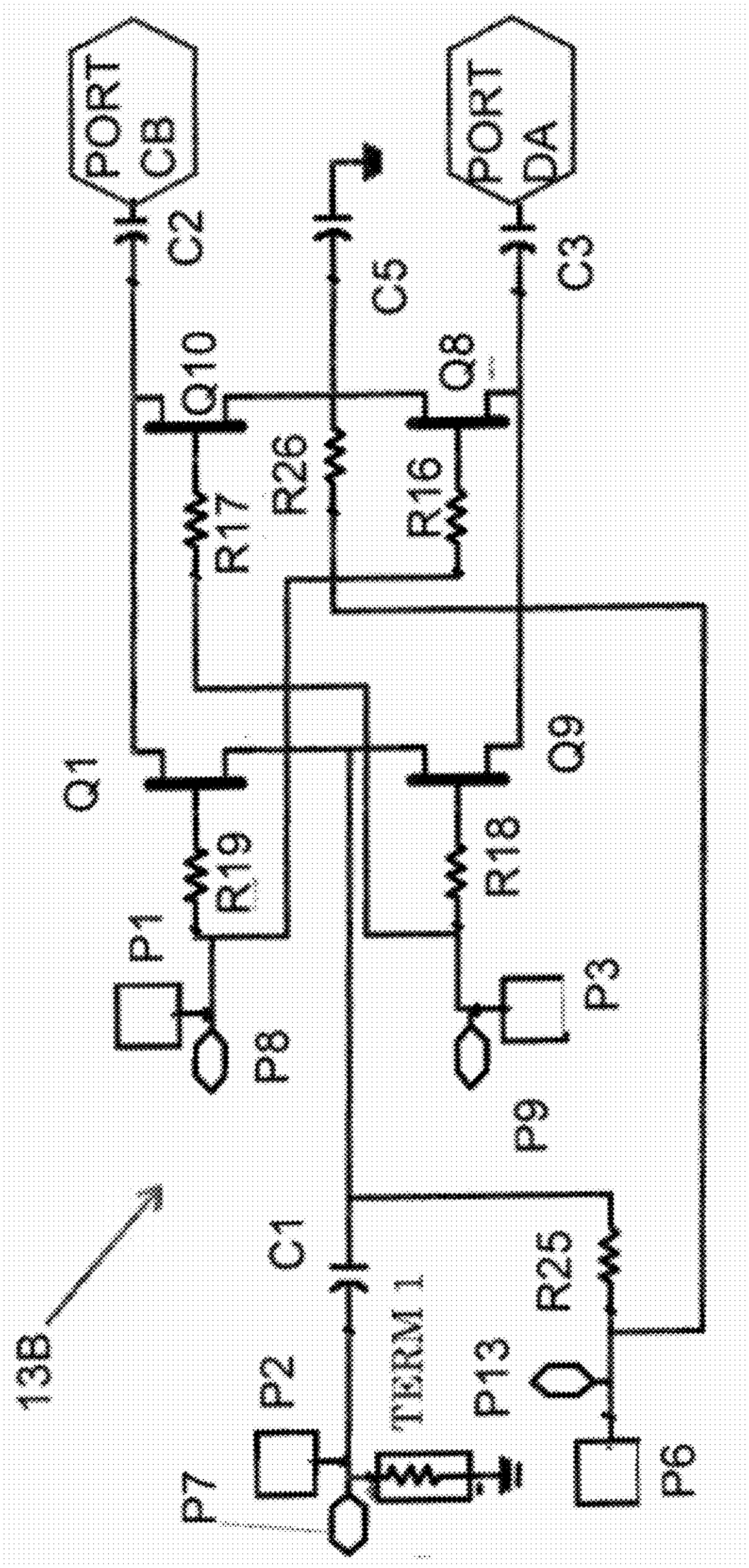
Broadband TR Switch Schematic with positive Voltage Control
FIG. 45D PART D of Schematic for the full RFIC booster redesign at 450 MHz.

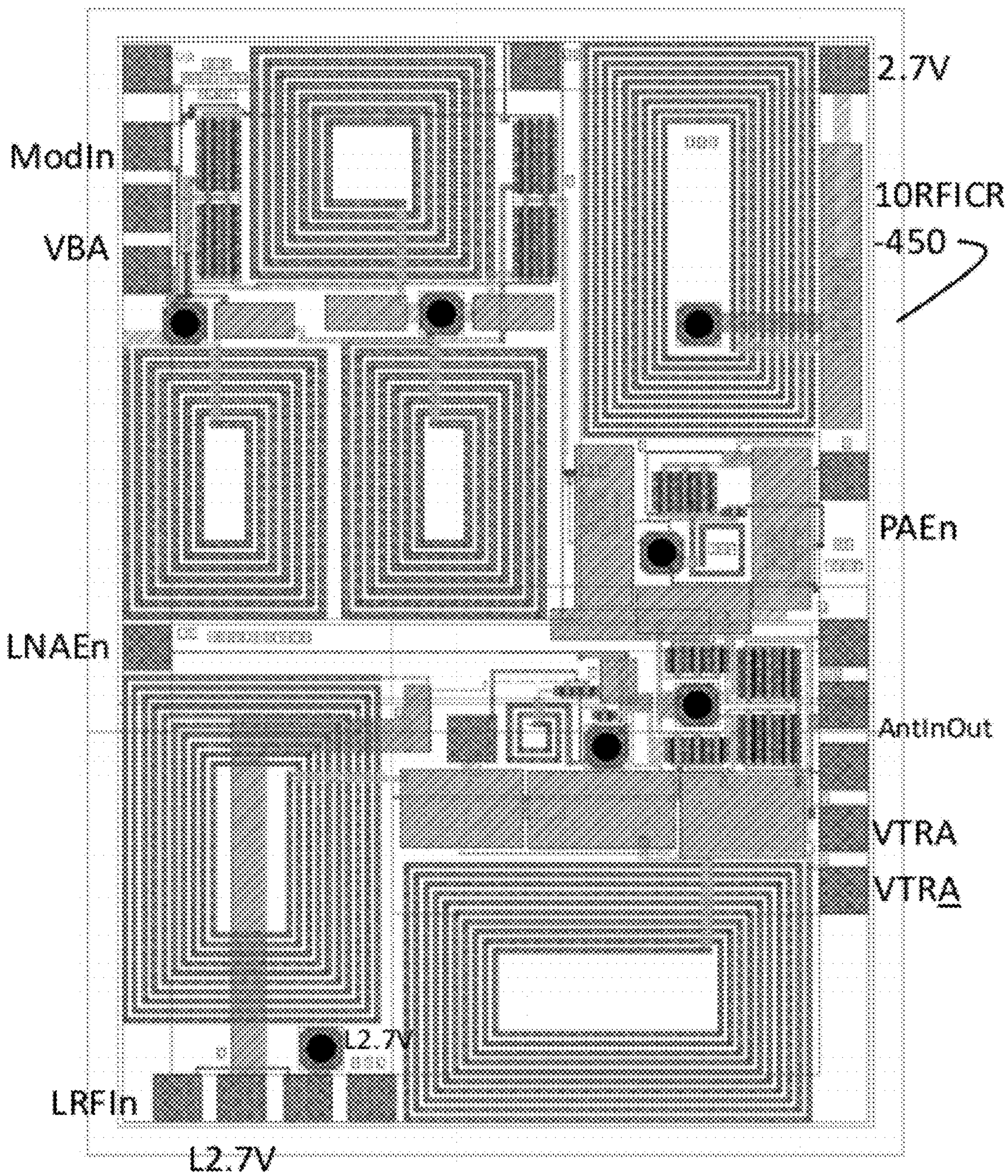
FIG. 46 Layout for the full RFIC booster redesign at 450 MHz.

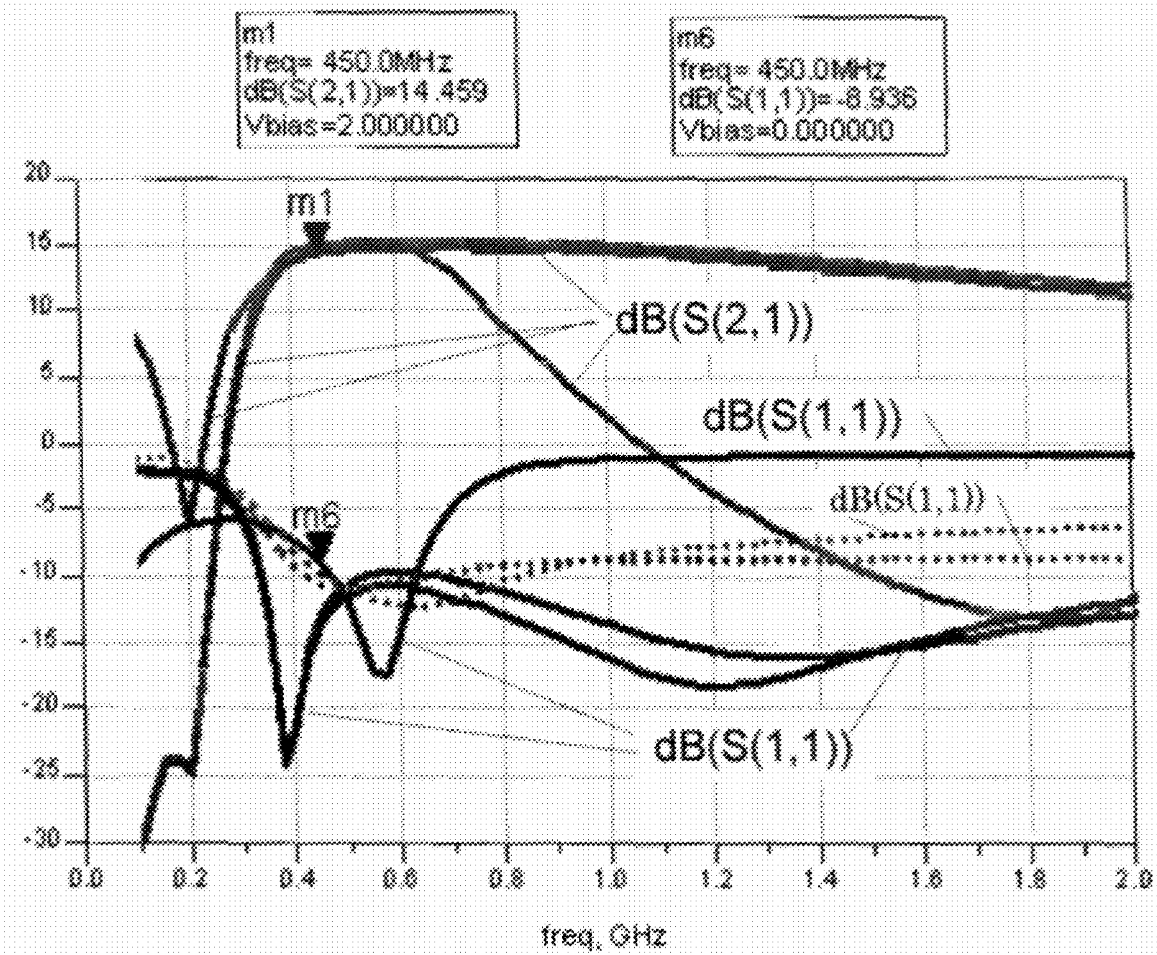
FIG. 47 S-parameters for the PA redesign in both states of the BPSK modulator with enabe ON at 450 MHz.

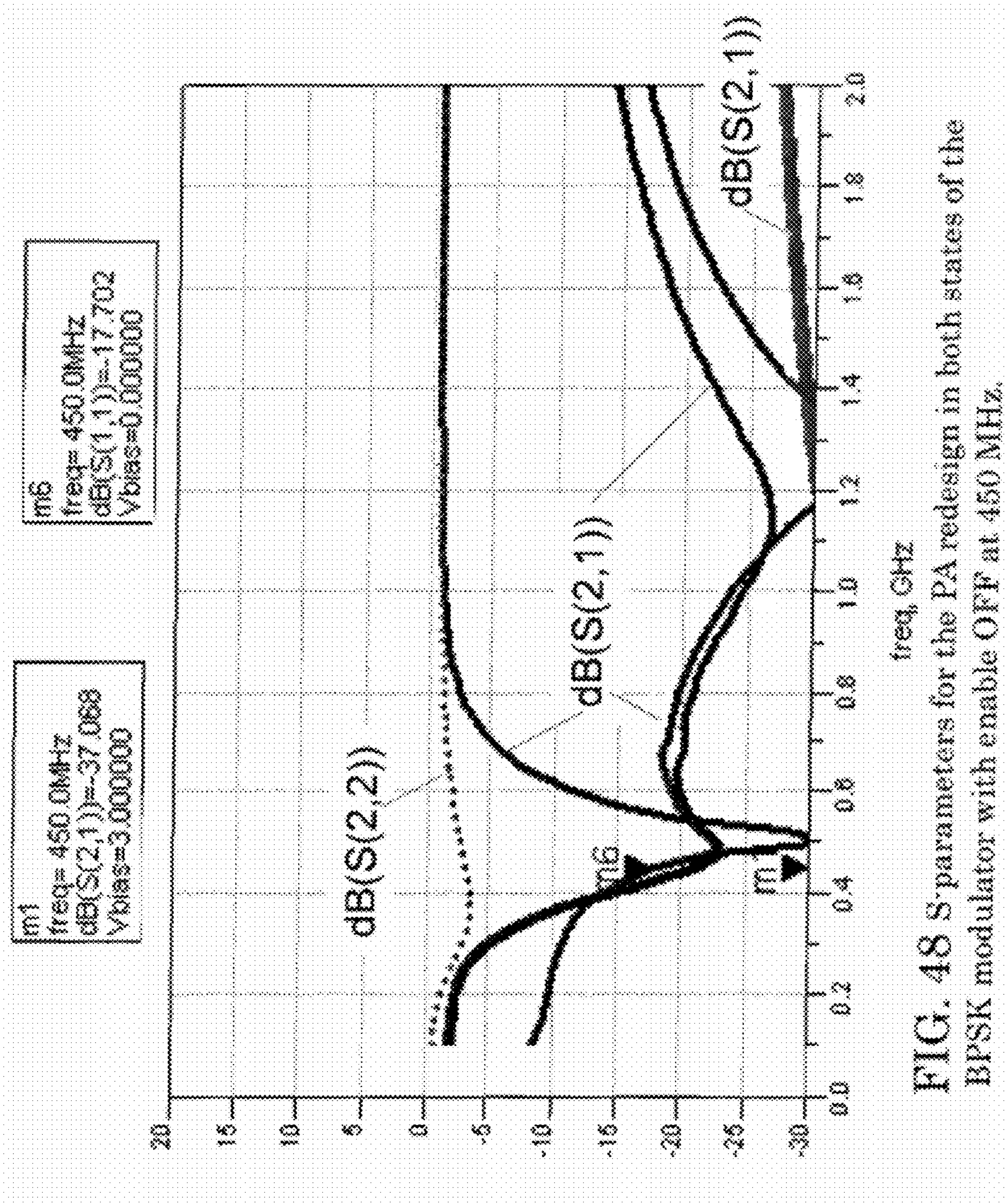
FIG. 48 S parameters for the PA redesign in both states of the BPSK modulator with enable OFF at 450 MHz.

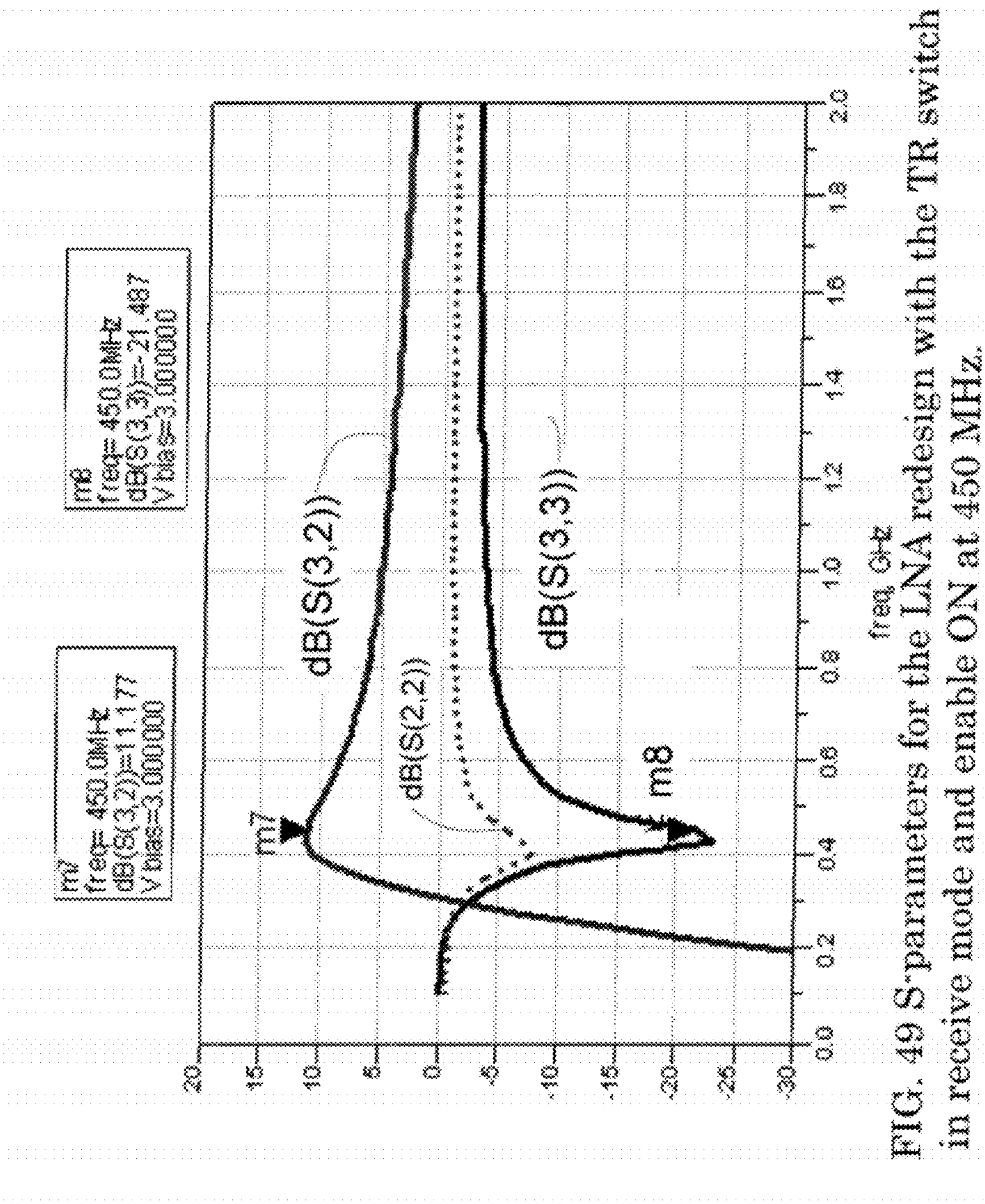
FIG. 49 S-parameters for the LNA redesign with the TR switch in receive mode and enable ON at 450 MHz.

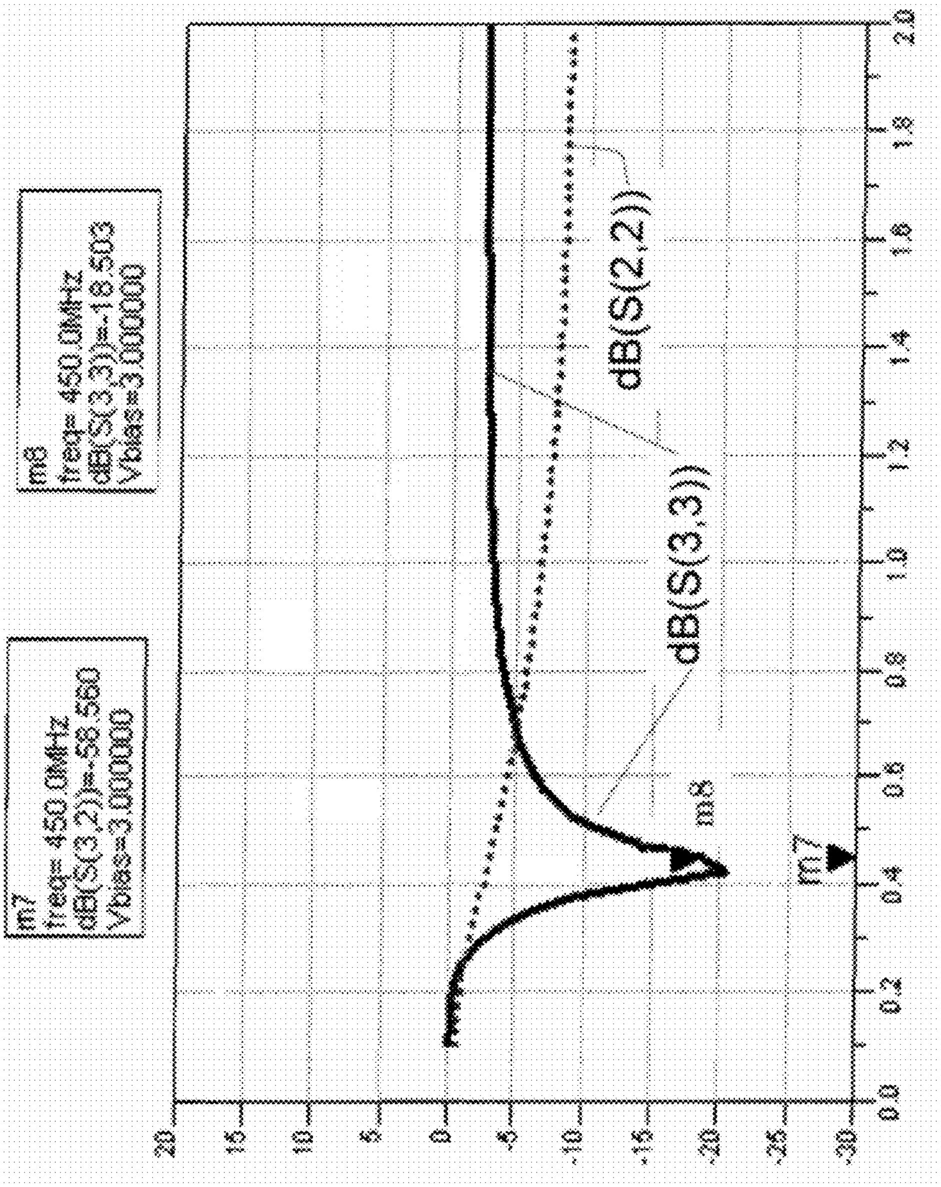
FIG. 50 S-parameters for the LNA redesign with the TR switch in receive mode and enable OFF at 450 MHz.

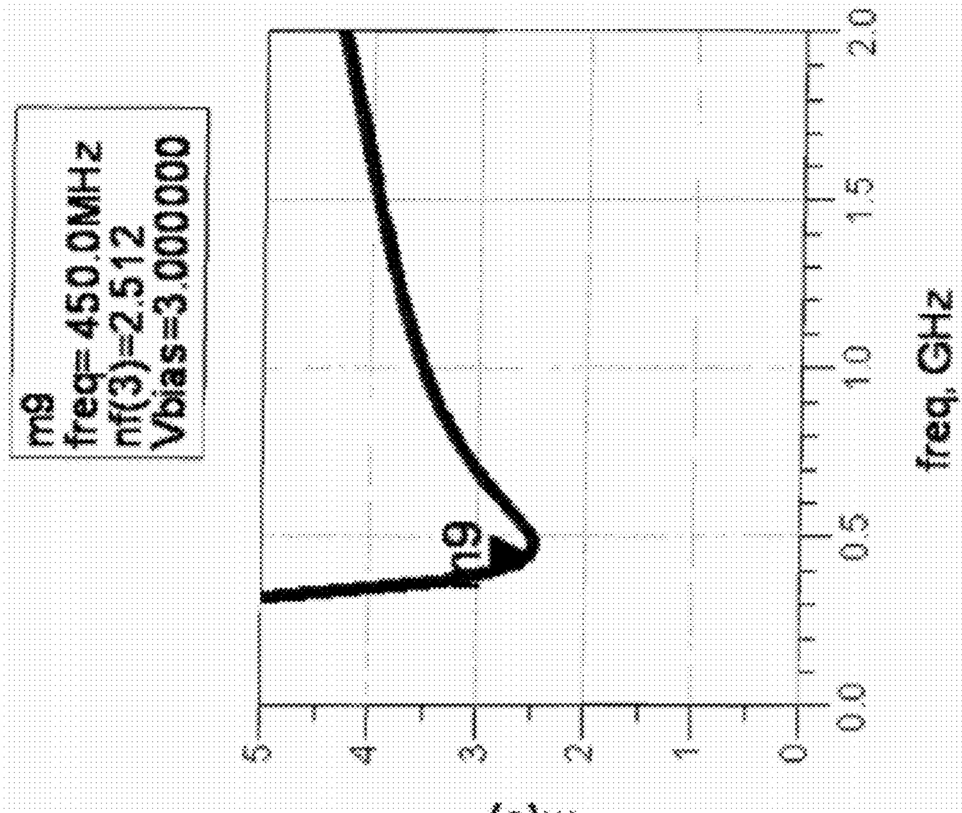
FIG. 51 NF for the LNA redesign with the TR switch in receive mode at 450 MHz.

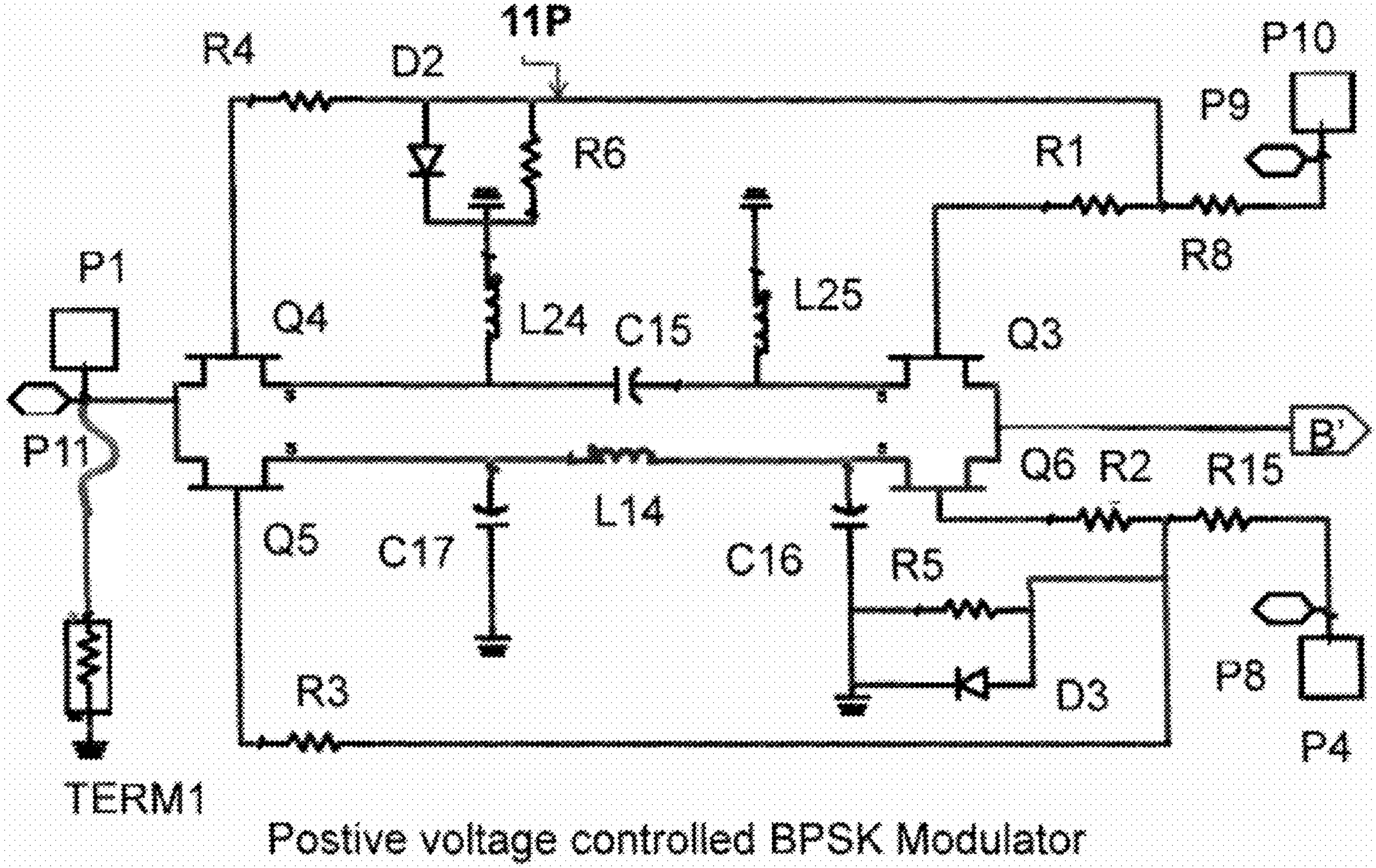
FIG. 52A PART A of Schematic for cascaded BPSK modulator, PA, and switch at 450 MHz.

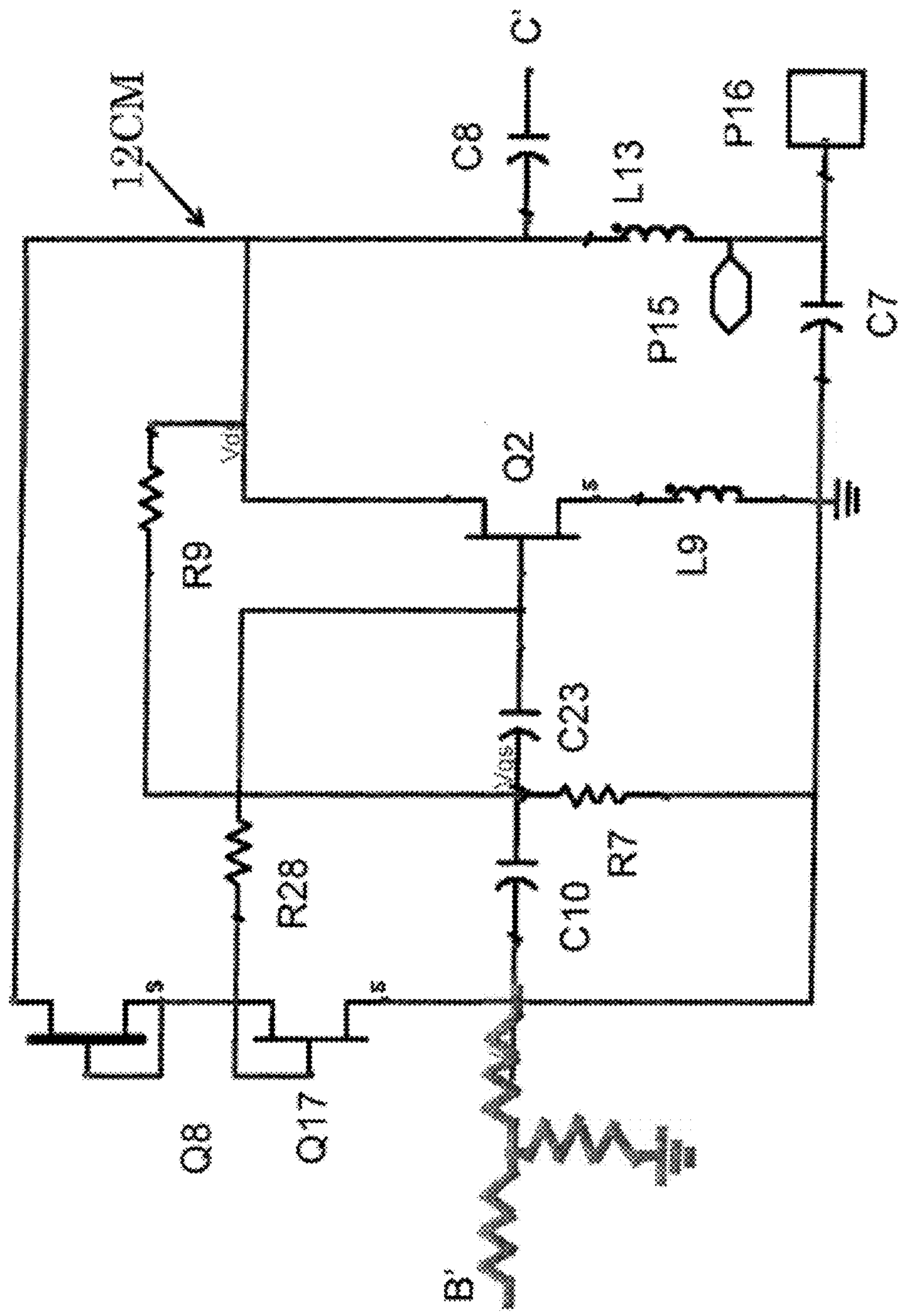
FIG. 52B PART B of Schematic for cascaded BPSK modulator, PA, and TR switch at 450 MHz.

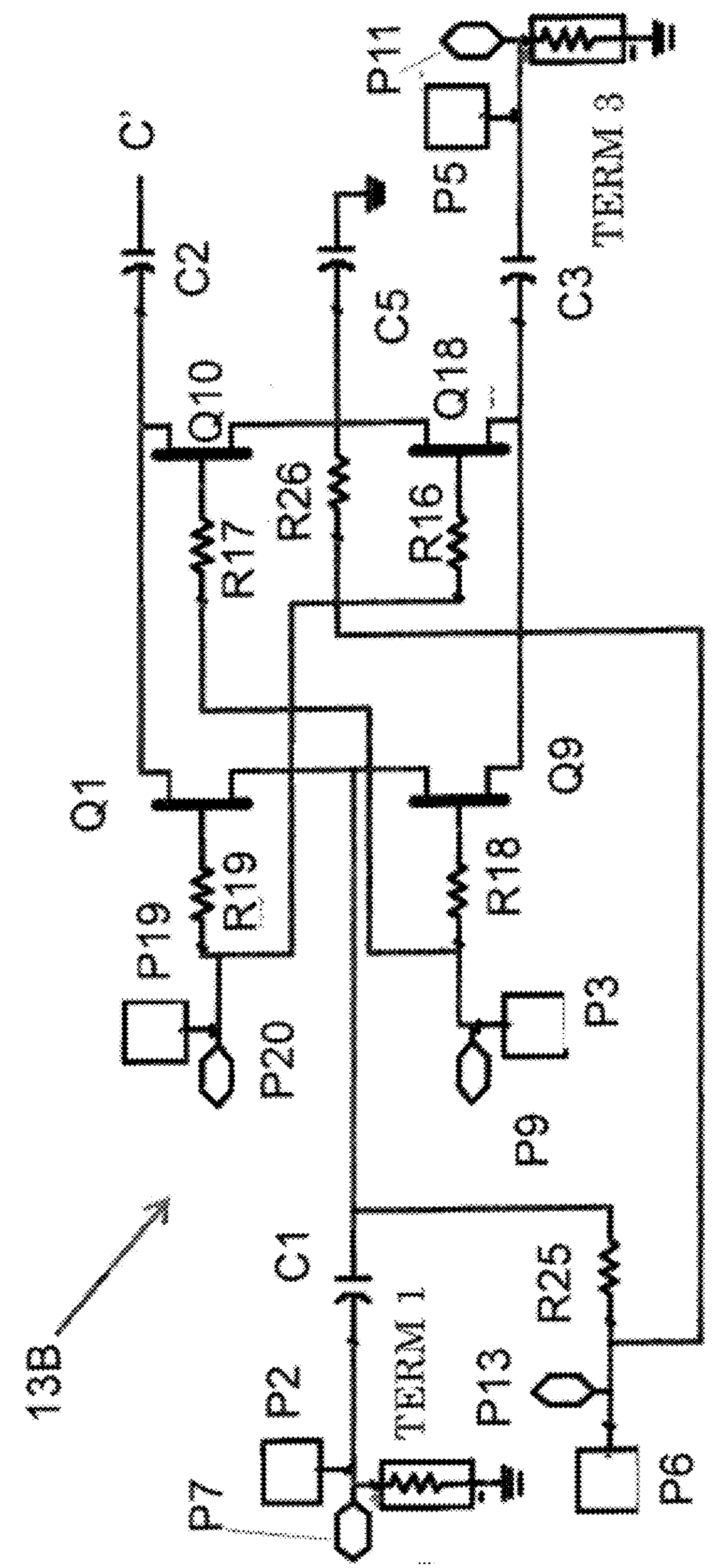
Broadband TR Switch Schematic with positive Voltage Control
FIG. 52C-PART C of Schematic for cascaded BPSK modulator, PA, and TR switch at 450 MHz.

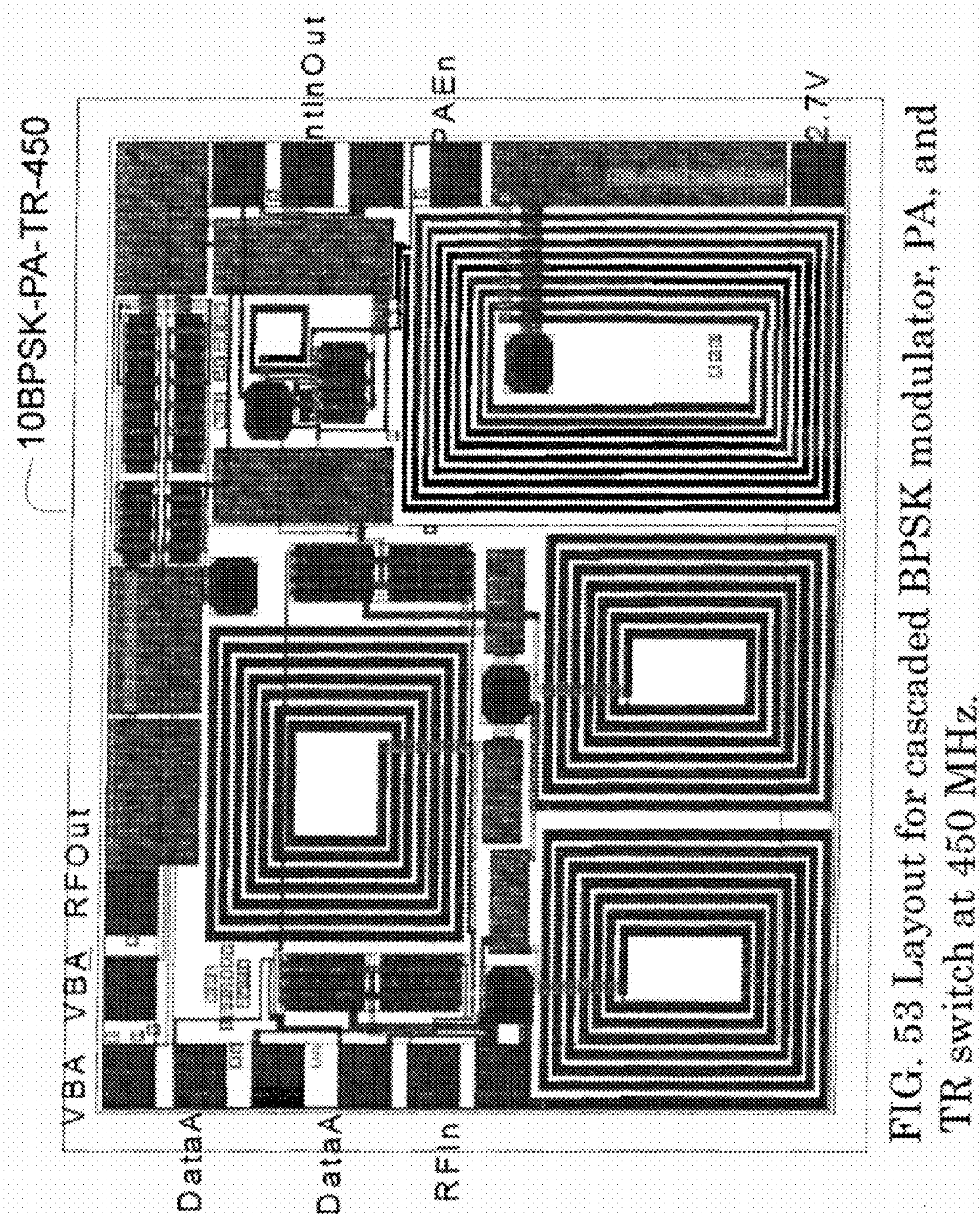
FIG. 53 Layout for cascaded BPSK modulator, PA, and TR switch at 450 MHz.

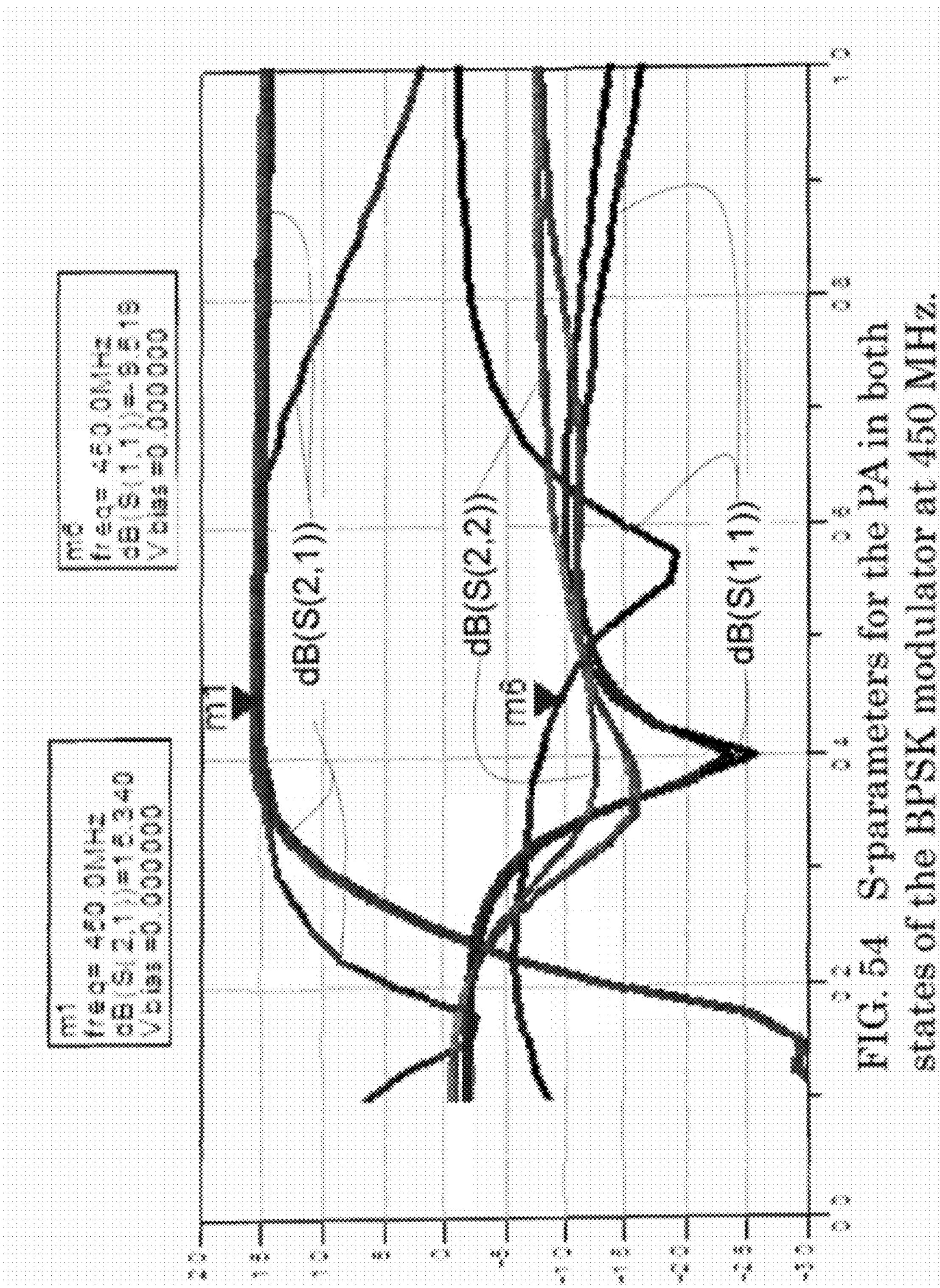
FIG. 54 S-parameters for the PA in both states of the BPSK modulator at 450 MHz.

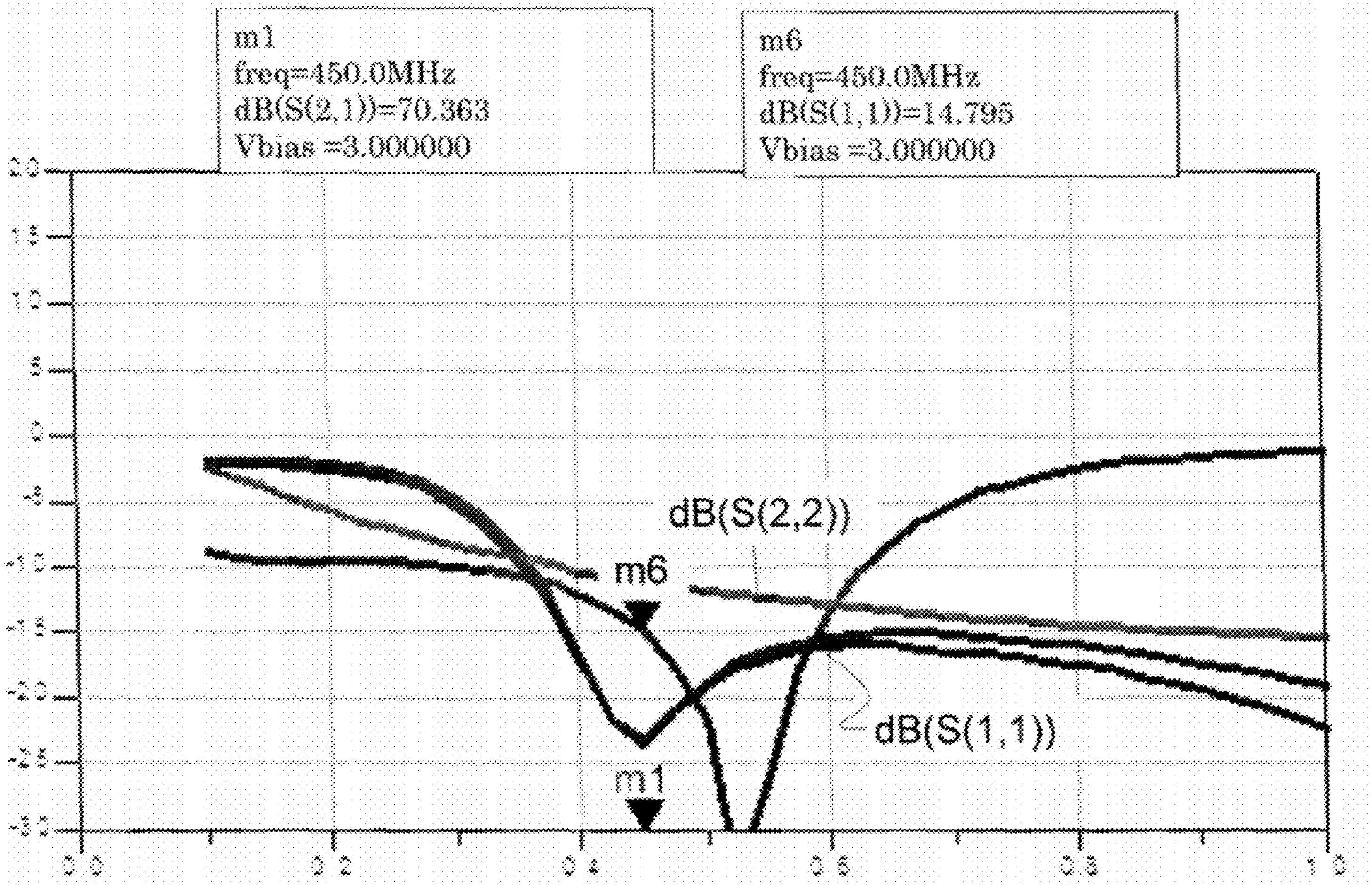
FIG. 55 S-parameters for the PA with the TR switch set to receive at 450 MHz.

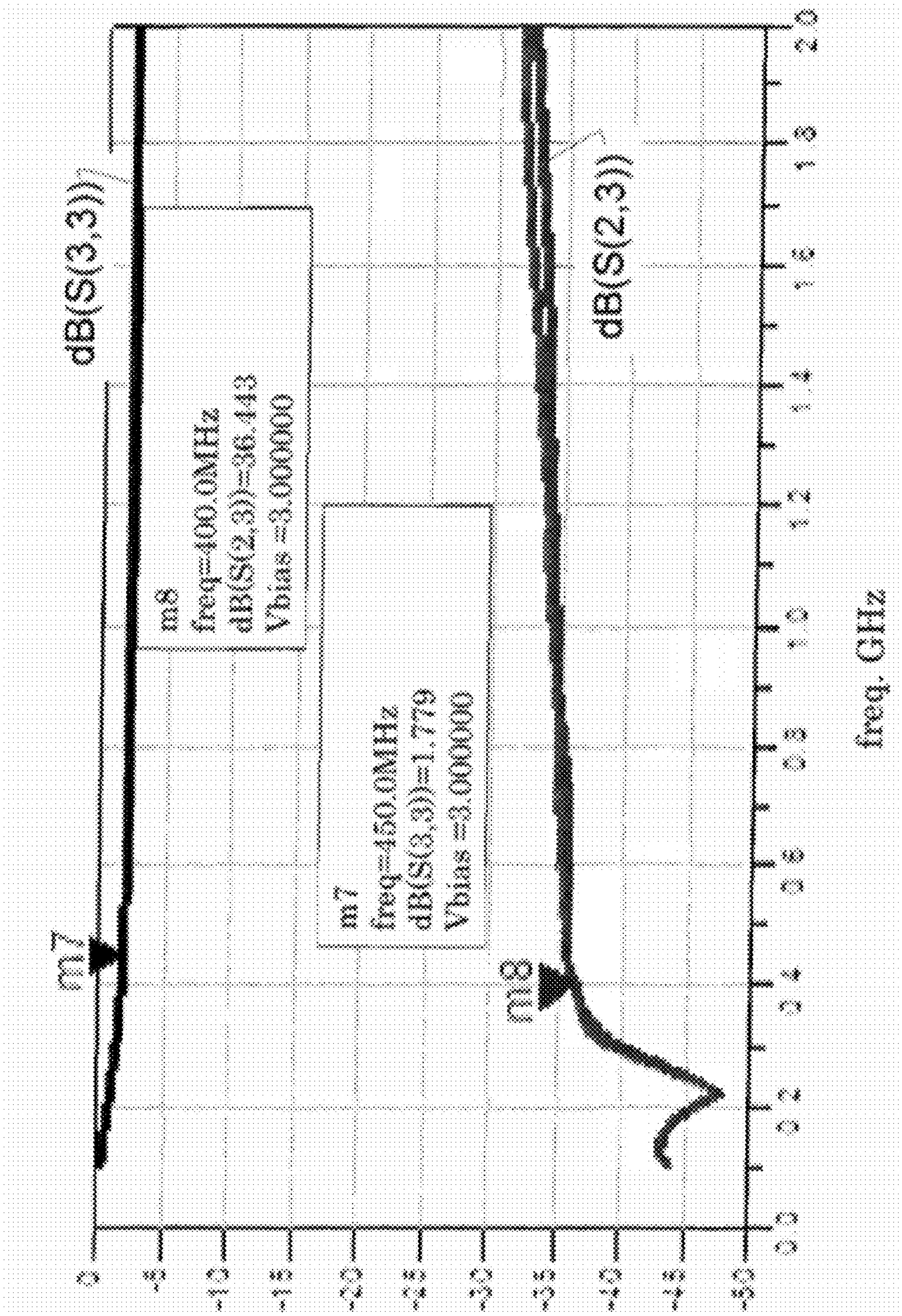
FIG. 56 S-parameters for the TR switch at 450 MHz.

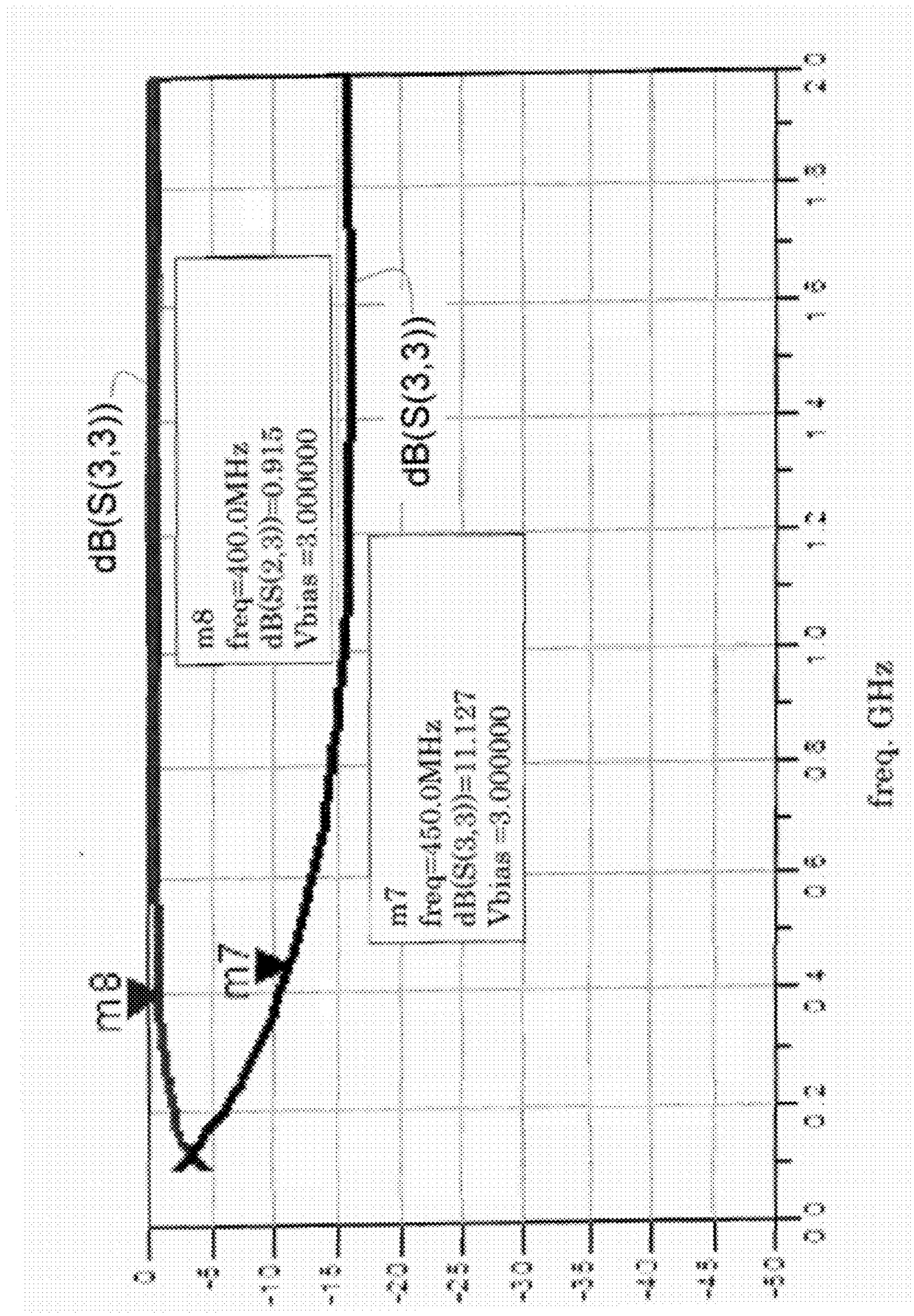
FIG. 57 S-parameters for the TR switch at 450 MHz.

RADIO FREQUENCY INTEGRATED CIRCUIT FOR ENHANCED TRANSMIT/RECEIVE PERFORMANCE IN LOW POWER APPLICATIONS AND METHOD OF MAKING THE SAME

STATEMENT OF GOVERNMENT INTEREST

The invention described herein may be manufactured, used, and licensed by or for the United States Government.

FIELD OF THE INVENTION

This invention relates broadly to IC circuits and in particular to radio frequency integrated circuits.

BACKGROUND OF THE INVENTION/DESCRIPTION OF THE RELATED ART

High performance microwave and radio frequency integrated circuits are of interest both for military and civilian applications. The ability to design custom integrated circuits and fabricate prototypes in a timely and cost effective manner is a prime concern. Low-power sensor networks have recently become very popular for applications such as logistics and home automations. Remote low-power radio frequency (RF) applications are becoming more prevalent and low power tends to mean short transmission range. This necessitates the need to develop custom RF enhancement chips to meet military and commercial needs that can't be met by commercial off the shelf (COTS) chips.

Low-power radio frequency (RF) transceivers have been used for low-cost, high volume commercial applications that do not always meet the needs of critical military systems. In low-power applications, a tradeoff between transmit range and battery life exists. A simple means of extending transmit range would be to add a custom integrated circuit (IC) between the transceiver and antenna. Using appropriate technologies, a tradeoff in size, efficiency, and performance is achievable.

By way of background, a high electron mobility transistor is referred to as an HEMT. Generally speaking, the two different materials used for the heterojunction in an HEMT must have the same lattice constant. A variation of this is a PHEMT, of pseudomorphic HEMT where an extremely thin layer of one of the materials stretches to fit the other material thin layer. GaAs PHEMTs make very good low noise amplifiers, high efficiency power amplifiers, and have very good RF switch characteristics. The blocks for the RFIC Booster chip take advantage of these high performance characteristics of GaAs to increase the output power, power efficiency, and noise figure.

By way of background, phase-shift keying (PSK) is a digital modulation scheme that conveys data by changing, or modulating, the phase of a reference signal (the carrier wave). Digital modulation schemes use distinct signals to represent digital data; while Phase-shift keying (PSK) uses phase shifts to represent a unique pattern of binary digits. Generally, each phase is encoded to represent a number of bits. Each pattern of bits represents a symbol that is represented by the particular phase. A demodulator designed specifically for the symbol-set used by the modulator, is used to determine the phase of the received signal and map it back to the original symbol or data. The capability of the receiver to compare the phase of the received signal to a reference signal is referred to as coherent PSK (CPSK). Similarly, instead of bit patterns being used to set the phase of the wave, the phase change can be utilized. The demodulator would then determine the change in the phase of the received signal rather than the phase itself; or the difference between successive phases (also referred to as differential phase-shift keying (DPSK).

In PSK, the chosen constellation points are usually positioned so as to be uniformly spaced around a circle for maximum phase-separation between adjacent points and the best immunity to corruption. Positioning within a circle provides transmission with the same energy and the moduli of the complex numbers they represent will be the same and so will the amplitudes needed for the cosine and sine waves. Two common examples are "binary phase-shift keying" (BPSK) which uses two phases, and "quadrature phase-shift keying" (QPSK) which uses four phases, although any number of phases may be used. Since the data to be conveyed are usually binary, the PSK scheme is usually designed with the number of constellation points being a power of 2.

SUMMARY OF THE INVENTION

A preferred embodiment of the invention comprises a radio frequency integrated circuit for enhancing wireless communication and/or sensing systems comprising a base comprising a gallium arsenide (GaAs) substrate; a binary phase shift keying modulator fabricated on the base; a power amplifier fabricated on the base and operatively associated with the binary phase shift keying modulator; the power amplifier having a first shunt operatively associated therewith; a transmit/receive switch fabricated on the base, the transmit/receive switch being operatively associated with the power amplifier and being alternately connectable to an antenna port adapted to be connected to an antenna; a low noise amplifier fabricated on the base; the low noise amplifier being alternately connectable to the antenna port, the low noise amplifier having a second shunt operatively associated therewith; the circuit operating in a transmit stage in which the power amplifier is connected to the antenna port and in a receive stage in which the low noise amplifier is connected to the antenna port; whereby in the receive stage the power amplifier is bypassed by the first shunt to reduce current consumption and substantially isolate the receive stage from the transmit stage; and in the transmit stage the low noise amplifier is bypassed by the second shunt to reduce current consumption and to substantially isolate the transmit stage from the receive stage. The preferred embodiments are designed to supplement commercial RFIC transceivers to enable improved power handling, standoff, noise-immunity, and size weight and power (SWAP) at the system level, using gallium arsenide (GaAs) technology to provide enhanced performance. Multiple variations were used to cover different frequencies and specifications for enhancing the GaAs RFIC Booster, including customizing the subcircuits of power amplifier, low noise amplifier, BPSK modulator, and a transmit/receive switch to optimize the output power, noise figure, power added efficiency, insertion loss, and range performance of an overall low-power radio frequency system. The extended range and small form factor greatly increases the operators' risk of staying out of harm's way when retrieving data or performing maintenance for remote applications. The invention includes a method of making the integrated circuit comprising method of making an integrated circuit comprising providing a base comprising a gallium arsenide (GaAs) substrate; fabricating a binary phase shift keying modulator on the base; fabricating a power amplifier on the base, the power amplifier being operatively associated with the binary phase shift keying modulator; the power amplifier having a first shunt operatively associated therewith; fabricating a transmit/receive switch on the base, the transmit/receive switch being operatively associated with the power amplifier and being alternately connectable to an antenna port adapted to be connected to an antenna; fabricating a low noise amplifier on the base; the low noise amplifier being alternately connectable to the antenna port, the low noise amplifier having a second shunt operatively associated therewith.

The embodiments of the invention provide a simplified design with the goal of being able to work with/enhance the RFIC's from multiple vendors. Moreover, a significant objective of the described preferred embodiments is to minimize the amount of software or other changes on the part of a given vendor; essentially a "drop in" technology (i.e., insertable into an existing system) geared towards optimizing the performance of existing RFIC's for use in high noise or extended range applications.

The invention can be used to enhance the performance of wireless RF systems using commercial parts. It could also be used as a standalone binary phase shift keying (BPSK) modulation system by adding the digital controller and an oscillator source using the RFIC booster chip as the front end of a transceiver.

Military and commercial applications using wireless data transmission are numerous and constantly growing in new directions. In low-power military applications, a tradeoff between transmit range and battery life exists. A simple means of extending transmit range would be to add the described custom integrated circuit (IC) between the transceiver and antenna. By way of example, the invention could be used to enhance the use of unattended ground sensor systems; allowing for the retrieval of sensor data from greater distances.

RFIC's are utilized in a variety of commercial products such as cell/cordless phones, computers and other wireless/networking applications. Because the described RF integrated circuit (IC) booster chip is intended to interface between the transceiver and antenna to increase range between nodes for low-power RF applications; the invention could provide benefit to a variety of commercial applications where the current performance is not able to meet a demand or challenge (e.g. high noise environments). Specific commercial applications could include: cellular communications, wireless networking devices, extended range RFID applications, etc.

A block diagram representation of a preferred embodiment booster chip is depicted in FIG. 1. FIG. 8 depicts an RFIC narrowband 450-MHz booster chip on a 4×4 mm tile to enhance performance of a companion integrated circuit (IC) on a GaAs substrate. The transmit stage of the circuit consists of the BPSK modulator cascaded with a power amplifier and TR switch. The receive stage of the circuit consists of the TR switch cascaded with the LNA. The BPSK modulator is a novel component and typically exists off-chip. There are additional gate enable DC inputs to provide a higher level of isolation between the power amplifier and LNA stages than is currently available. These gate enable features are also novel to this invention and are denoted in FIG. 7 as "LNAen" and "PAen", respectively. This will save power consumption and provide additional isolation between transmit and receive stages. This isolation could be essential for system level performance, and provides an additional 60 dB of isolation between transmit and receive beyond the 35-40 dB of isolation provided by the TR switch. This additional isolation could be provided in the other designs by providing switching supplies for the separate LNA and power amplifier supply inputs, but this would require significant board area compared to the simple gate enable inputs. The BPSK modulator has a negative DC OFF state of approximately 3.0 V and an ON state of 0.0 V to activate the A and B control pins. The TR switch has a positive DC reference of 2.5 V on the control inputs corresponding to ON and 0.0 V corresponding to OFF, which activate the transmit stage or the receive stage, respectively. The PA and LNA both have a +2.7 to +3.0 V supply voltage.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 1A is a schematic block diagram representation of an RFIC enhancement to the booster chip architecture comprising a BPSK Modulator 11, power amplifier 12, T/R Switch 13, and low noise amplifier 14.

FIG. 1B is a schematic illustration of a negative voltage controlled BPSK Modulator 11N, which may be used in conjunction with the circuit of FIG. 1A.

FIG. 1C is a schematic illustration of a BPSK Modulator 11P with positive voltage control, which may be used in conjunction with the circuit of FIG. 1A.

FIG. 1D is a schematic illustration of a broadband power amplifier 12CM with current mirror bias, which may be used in conjunction with the circuit of FIG. 1A.

FIG. 1G is a schematic illustration of a narrow band amplifier 14CM with current mirror bias, which may be used in conjunction with the circuit of FIG. 1A.

FIG. 1H is a schematic illustration of a narrowband low noise amplifier 14RD with resistor divider bias.

FIG. 1I is a schematic illustration of a gate enable circuit, which may be used in conjunction with the circuit of FIG. 1A.

FIG. 1K is a schematic illustration of a Broadband TR switch 13A, which may be used in conjunction with the circuit of FIG. 1A.

FIG. 1L is a schematic illustration of a Broadband TR switch 13*b* with positive voltage control, which may be used in conjunction with circuit of FIG. 1A.

FIG. 2 is a graphical illustration of a plot of the RF Probe Measurements Cascaded with the 450 MHz Broadband Power amp. (2.5, 2.7, and 3.0 V).

FIG. 18 is an illustration of the S-parameters for the LNA at 900 MHz.

FIG. 19 is an illustration showing comparisons between measured and simulated data for the LNA gain and NF.

FIG. 20 is an illustration of an image of wire bonded RFIC booster chip on a 4×4 mm QFN package.

FIG. 21A is a schematic illustration of Part A of a narrowband cascaded BPSK modulator (shown in Part A) and PA at 900 MHz.

FIG. 21B is a schematic illustration of Part B of a narrowband cascaded BPSK modulator and PA (shown in Part B) at 900 MHz.

FIG. 21C is a schematic illustration of Part C of a narrowband cascaded BPSK modulator and PA at 900 MHz with a low noise amplifier (shown in Part C).

FIG. 22 illustrates a layout for the narrowband cascaded BPSK modulator and PA at 900 MHz.

FIG. 23 illustrates S-parameters for the narrowband cascaded BPSK modulator and PA simulators at 900 MHz.

FIG. 24 illustrates graphically output power and PAE of the PA at 900 MHz & 3.6 V DC bias.

FIG. 25 illustrates graphically simulations of the S-parameters for the broadband LNA.

FIG. 26 illustrates graphically noise factor for the broadband LNA.

FIG. 27 is a schematic illustration of a preferred embodiment for the 3×3 mm RFIC design at 900 MHz, comprising the BPSK modulator 11N (shown in FIG. 1B), the power amplifier 12RDB (shown in FIG. 1E), T/R switch 13B (shown in FIG. 1L) and low noise amplifier 14 RDB (shown in FIG. 1F).

FIG. 28 is an illustration of a layout of the 3×3 mm design at 900 MHz.

FIG. 29 is a graphical illustration of S-parameters for the PA in both states of the BPSK modulator (of the preferred embodiment of FIG. 27) at 900 MHz.

FIG. 30 is a graphical illustration of S-parameters for the broad band LNA (of FIG. 27) with the TR switch set to receive mode at 900 MHz.

FIG. 31 is a graphical illustration of the NF for the broadband LNA with the TR switch set to receive mode at 900 MHz.

FIG. 32A is Part A of a Schematic illustration of a preferred embodiment narrowband cascaded BPSK modulator & PA redesign with a robust current mirror at 450 MHz.

FIG. 32B is Part B of a Schematic illustration of a preferred embodiment narrowband cascaded BPSK modulator & PA redesign with a robust current mirror at 450 MHz.

FIG. 33 is a schematic illustration of a layout for the embodiment of FIGS. 32A-B.

FIG. 34 is a graphical representation of S-parameters for the cascaded PA redesign in both states of the Narrowband BPSK modulator with a robust current mirror at 450 MHz.

FIG. 35 is a schematic illustration for a preferred embodiment RFIC booster circuit with robust current mirror operable at 2.4 GHz.

FIG. 36 is an illustration of the layout for the preferred embodiment of FIGS. 35A-D.

FIG. 37 is a graphical representation of S-parameters for the cascaded PA in both states of the BPSK modulator with a robust current mirror at 2.4 GHz.

FIG. 38 is a graphical representation of S-parameters for the LNA with the TR switch set to receive mode and an additional current mirror at 2.4 GHz.

FIG. 39 is a graphical representation of NF for the LNA with the TR switch set to receive mode and an additional current mirror at 2.4 GHz.

FIG. 40 is a schematic illustration of a preferred embodiment RFIC circuit comprising the BPSK modulator 11P (shown in FIG. 1C), the power amplifier 12CM (shown in FIG. 1D), T/R switch 13B (shown in FIG. 1L) and low noise amplifier 14 CM (shown in FIG. 1G).

FIG. 42 is a graphical representation of S-parameters for the cascaded PA in both states of the BPSK modulator for the preferred embodiment of FIG. 40.

FIG. 43 is a graphical representation of S-parameters for the LNA with the TR switch set to receive mode and an additional current mirror at 900 MHz for the embodiment of FIG. 40.

FIG. 44 is a graphical representation of NF for the embodiment of FIG. 40.

FIG. 45A is Part A of a preferred embodiment RFIC booster circuit operable at 450 MHz, comprising a BPSK Modulator 11P.

FIG. 45B is Part B of a preferred embodiment RFIC booster circuit operable at 450 MHz.

FIG. 45C is Part C of a preferred embodiment RFIC booster circuit operable at 450 MHz.

FIG. 45D is Part D of a preferred embodiment RFIC booster circuit operable at 450 MHz, comprising a Broadband TR switch 13B, similar to that of FIG. 1L.

FIG. 46 is an illustration of a layout for the preferred embodiment of FIGS. 45A-D.

FIG. 47 is a graphical illustration of S-parameters for the PA redesign in both states of BPSK modulator with enable on at 450 MHz (for the preferred embodiment of FIGS. 45A-D).

FIG. 48 is a graphical representation of S-parameters for the PA redesign in both states of the BPSK modulator with enable OFF at 450 MHz (for the embodiment of FIGS. 45A-D.

FIG. 49 a graphical representation of S-parameters for the LNA redesign with TR switch in receive mode and enable ON at 450 MHz (embodiment of FIGS. 45A-D).

FIG. 50 a graphical representation of S-parameters for the LNA redesign with TR switch in receive mode and enable OFF at 450 MHz (embodiment of FIGS. 45A-D).

FIG. 51 is a graphical representation of the NF for the embodiment of FIGS. 45A-D.

FIG. 52A is Part A of a schematic of a preferred embodiment comprising a cascaded BPSK Modulator 11P.

FIG. 52B is Part B of a schematic of a preferred embodiment circuit comprising a power amplifier 12CM.

FIG. 52C is Part C of a schematic of a preferred embodiment circuit comprising a Broadband TR Switch 13B.

FIG. 53 is an illustration of a layout for the preferred embodiment of FIGS. 52A-C.

FIG. 54 is a graphical representation of S-parameters for the PA 12CM in both states of the BPSK modulator at 450 for the preferred embodiment of FIGS. 52A-C.

FIG. 55 is a graphical representation of S-parameters for the PA 12CM with the TR switch set to receive at 450 MHz.

FIG. 56 is a graphical representation of S-parameters for the TR switch at 450 MHz for the embodiment of FIGS. 52 A-C.

FIG. 57 is a graphical representation of S-parameters for the TR switch at 450 MHz for the embodiment of FIGS. 52 A-C.

Figure 1E:
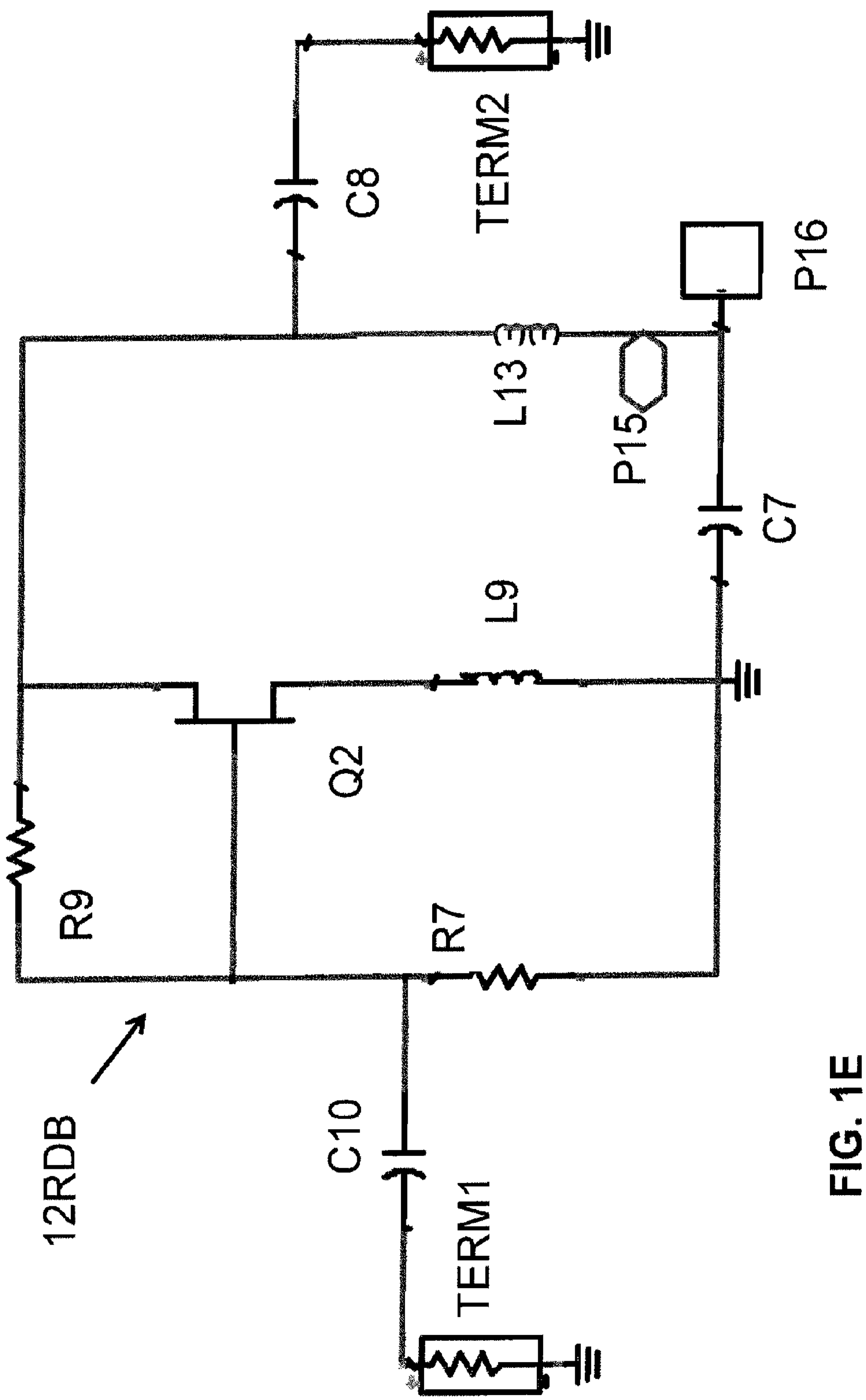
FIG. 1E is a schematic illustration of a broadband power amplifier 12RDB with resistor divider bias, which may be used in conjunction with the circuit of FIG. 1A.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

For many environments, commercial-off-the-shelf (COTS) radio frequency integrated circuits (RFICs) have been exploited to the extent of their capabilities. High noise environments require increased dynamic range and optimized power budget. Improved RF performance and optimal use of system resources is needed to function in critical applications.

Commercial companies have RFIC front-end chips that boost output power that are targeted for 2.4 GHz, but use a silicon based chip/silicon processes. Gallium arsenide (GaAs) is superior in performance to silicon in efficiency, noise figure, and switching speeds. In addition, at least one preferred embodiment includes an on-board BPSK modulator, uses a robust current mirror bias for varying battery supply voltages, and has gate enables that provide very high isolation between the transmit and receive paths. The present invention supplements commercial RFIC transceivers for improved power handling, standoff, noise immunity, and SWAP at the system level. The optional designs of the preferred embodiments emphasize circuits that take advantage of superior GaAs characteristics. This also provides a simple means to enhance the performance of existing COTS RFICs without modifying the existing programming and intellectual property (IP) investment of a given manufacturer. Using the concept of the present invention wireless sensors can operate remotely, for longer periods of time and deliver increased transmission range; as well as retrieve critical data from safer distances which may be a challenge in certain environments or applications.

While most RFIC's provide power output in the up to 10 mW range, the invention has shown it can provide up to 100 mW output; an order of magnitude improvement. Furthermore, a targeted goal of a 50% increase in power added efficiency (PAE) may be achieved using the invention. Efforts demonstrated potential optimizing of the IC performance characteristics for requirements such as battery voltage, output power, or noise figure (NF).

The preferred embodiments RFIC integrated circuits utilize the superior performance of GaAs technology, which provides better performance properties, and may be used for applications such as high-efficiency solar cells, laser diodes, and the high-electron-mobility transistor (HEMT; which is used in cell phones, communication systems, radars, etc.).

There also exists a desire was to keep the design footprint small with a goal of fitting in a 3×3 mm QFN package and optimizing performance over a 20-25% bandwidth rather than a high octave or more expansive bandwidth. For output power, a goal of 50 to 100 mW of output power with close to 50% Power Added Efficiency was desired. For noise figure, a goal of 1 to 2 dB is desirable, far lower than the noise figure of a typical RFIC of 7 dB or worse. Block enhancement included incorporation of the BPSK modulator which can provide extremely high modulation rates due to the high switching speeds of GaAs PHEMTs. A designed "gate enable" transistor on each Emode PHEMT based amplifier was added to provide much greater isolation between the operation modes of the TR switch.

Figure 1F:
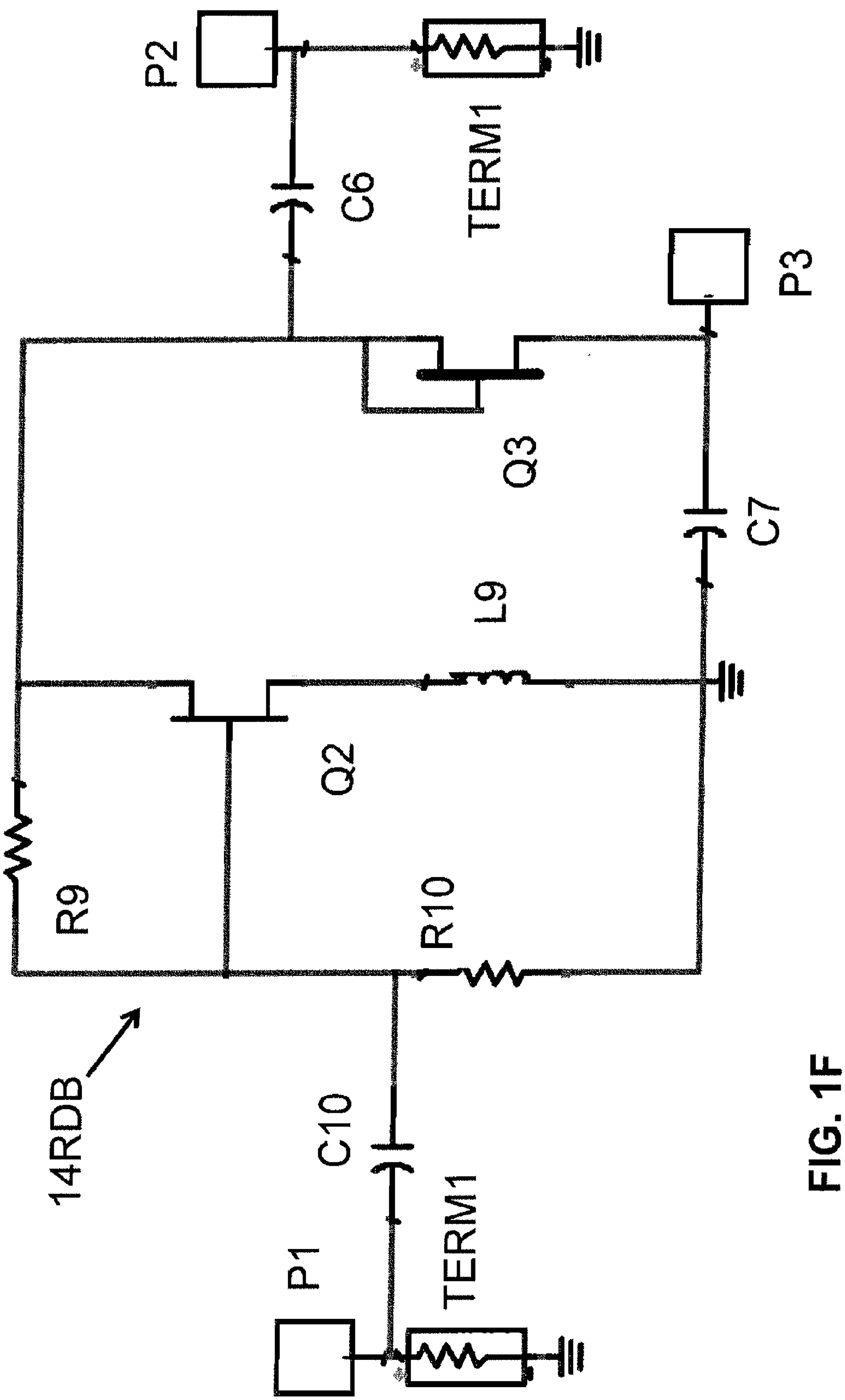
FIG. 1F is a schematic illustration of a low noise amplifier 14RDB with resistor divider bias, which may be used in conjunction with the circuit of FIG. 1A.

FIG. 1A is a schematic block diagram representation of an RFIC enhancement to the booster chip architecture comprising a BPSK Modulator 11, power amplifier 12, T/R Switch 13, and low noise amplifier 14. FIG. 1B is a schematic illustration of a negative voltage controlled BPSK Modulator 11N, which may be used in conjunction with the circuit of FIG. 1A. FIG. 1C is a schematic illustration of a BPSK Modulator 11P with positive voltage control, which may be used in conjunction with the circuit of FIG. 1A. FIG. 1D is a schematic illustration of a broadband power amplifier 12CM with current mirror bias, which may be used in conjunction with the circuit of FIG. 1A. FIG. 1E is a schematic illustration of a broadband power amplifier 12RDB with resistor divider bias, which may be used in conjunction with the circuit of FIG. 1A. FIG. 1F is a schematic illustration of a low noise amplifier 14RDB with resistor divider bias, which may be used in conjunction with the circuit of FIG. 1A. FIG. 1G is a schematic illustration of a narrow band amplifier 14CM with current mirror bias, which may be used in conjunction with the circuit of FIG. 1A. FIG. 1H is a schematic illustration of a narrowband low noise amplifier 14RD with resistor divider bias. FIG. 1I is a schematic illustration of a gate enable circuit, which may be used in conjunction with the circuit of FIG. 1A. FIG. 1K is a schematic illustration of a Broadband TR switch 13A, which may be used in conjunction with the circuit of FIG. 1A. FIG. 1L is a schematic illustration of a Broadband TR switch 13*b* with positive voltage control, which may be used in conjunction with circuit of FIG. 1A.

In the embodiment illustrated in FIG. 1A, in the transmit mode, the RF signal traverses the BPSK modulator, PA, and TRS. The resulting output signal has about 100 mW of output power. The goal of the PA design is to achieve a gain of 20 dB, an input match of at least −10 dB, and a PAE of at least 50%. The BPSK modulator should have a 180° phase difference between the two modulation states, with minimal insertion loss, and an input and output match of −10 dB or better. In receive mode, the RF signal traverses the TRS and LNA, which is designed to amplify the incoming signal with minimal effect on the noise level. It is desired that the LNA should have a noise figure (NF) of less than 2 dB, a gain of 15 dB, and an input and output match of at least −10 dB.

In the PA design, there is always a tradeoff between the PAE and gain, and likewise there will be a similar tradeoff between the NF and gain for the LNA design. For the TRS, there is a tradeoff between layout area, insertion loss, isolation, and bandwidth. The goal of the following design is to optimize the performance between these tradeoffs while minimizing the power consumption and IC footprint.

The initial tests of the RFIC Booster designs were performed with a manual RF probe station and other RF measurement equipment, such as network analyzers, power meters, spectrum analyzers, and noise figure meters. S-parameters. RF power output. phase shift, noise figure. DC power consumption and power efficiency (PAE) were measured for the various designs and circuit blocks. Results were close to the original simulations and expectations with some minor differences. Some circuit enhancements could not easily be measured on the RF probe station because of the limited number of DC probes to feed the DC voltage to set the biases. These designs were later tested on a small PC board using Rogers 4003 dielectric after the die were assembled in RF QFN packages.

FIG. 2 is an initial plot of the RF probe measurements with the 450 MHz Broadband power amp (2.5, 2.7 and 3.0 volts). FIG. 2 shows the experimental S-parameter measurements of the power amplifier design to be incorporated in the booster chip. All measurements were made at different DC input frequencies to verify optimal operation. At 450 MHz there is a gain of 19.85 dB, input match of −4.4 dB and output match of −9.5 dB. As a first pass this is acceptable but further designs have yielded better results. As used herein the terminology "S-parameters" or "S parameters" means scattering parameters, which are the reflection and transmission coefficients between the incident and reflection waves. Scattering parameters describe the behavior of a device under linear conditions at microwave frequency range; with each parameter typically characterized by magnitude and phase. Since s-parameters are voltage ratios of the waves, they may be expressed in decibel format as 20 log(Sij). Sij is the voltage at port i from an input at port j. For instance, the typical two port parameters are:

S11: input reflection coefficient of an impedance terminated output.

S21: forward transmission coefficient of an impedance terminated output.

S12: reverse transmission coefficient of an impedance terminated input.

S22: output reflection coefficient of an impedance terminated input.

Figure 3:
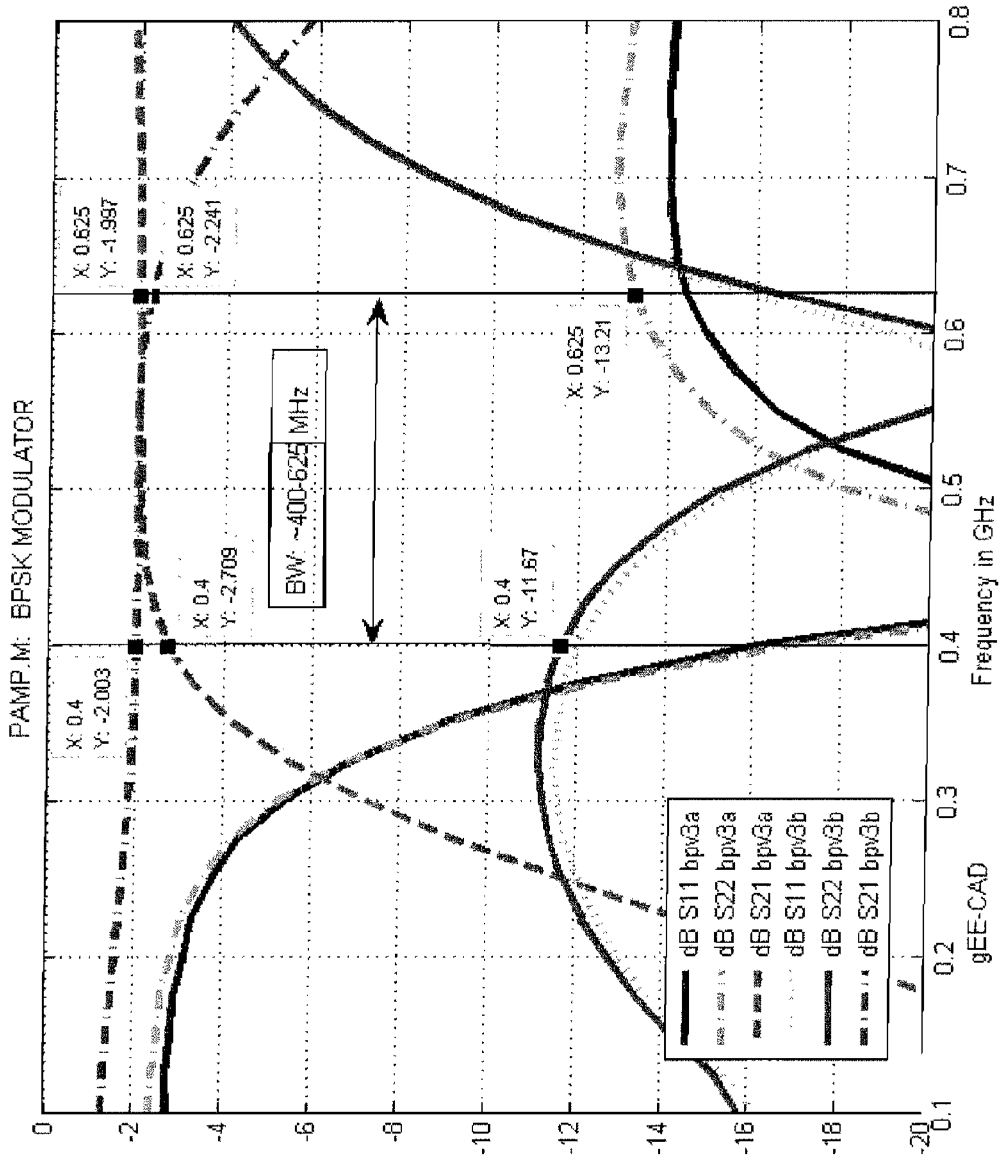
FIG. 3 is a graphical illustration of a plot of the RF Probe Measurements of 450 MHz BPSK Modulator (3.0 V).

FIG. 3 shows the parameters of the BPSK modulator in both modulation states. There is approximately a 180 degree phase shift between the "high-pass" and "low-pass" states which provides BPSK modulation over a band of about 400 to 625 MHz. Over the useful bandwidth, the insertion loss is about 2 dB and the return loss has a match of 12 dB or better.

Figure 4:
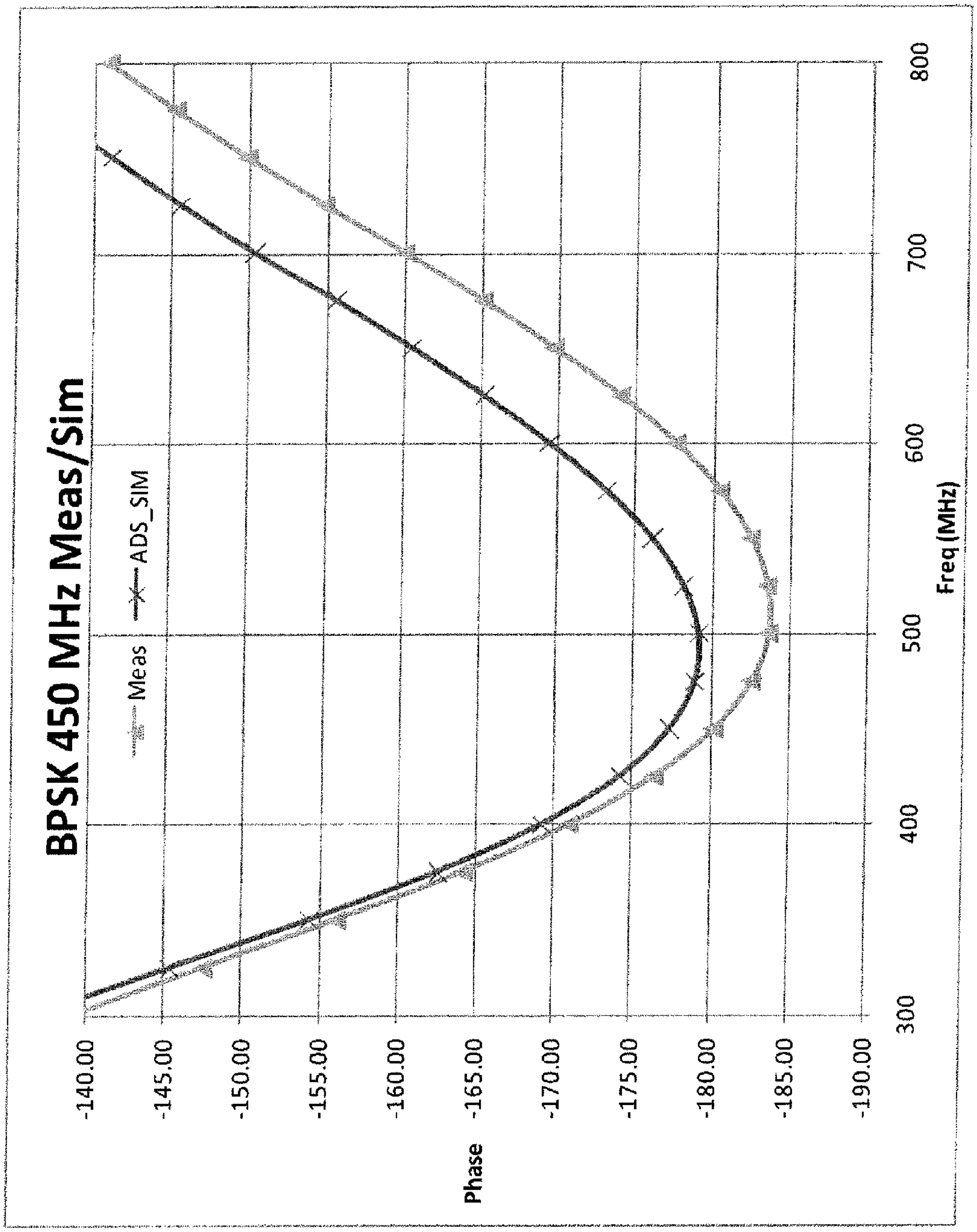
FIG. 4 is a graphical illustration of a plot of RF probe measurements at 450 MHz for the BPSK Modulator Phase (3.0 V)

FIG. 4 shows the experimental (▲s) versus simulated data (X's) for the BPSK modulator to be incorporated into the booster chip design. An 180° phase difference at 450 MHz is desired and the measured data actually performs better than the simulated data in this regard. The simulated data has about a 178° phase difference at the frequency of interest while the experimental data is exactly 180°.

Table 1 gives the first test results for a DC bias of 2.7 V and 17 mA and table 2 gives the results for a DC bias of 3.0 V and 25 mA. As expected. the output power and PAE increase with input power, but there is a tradeoff between increasing PAE and decreasing gain.

Figure 5:
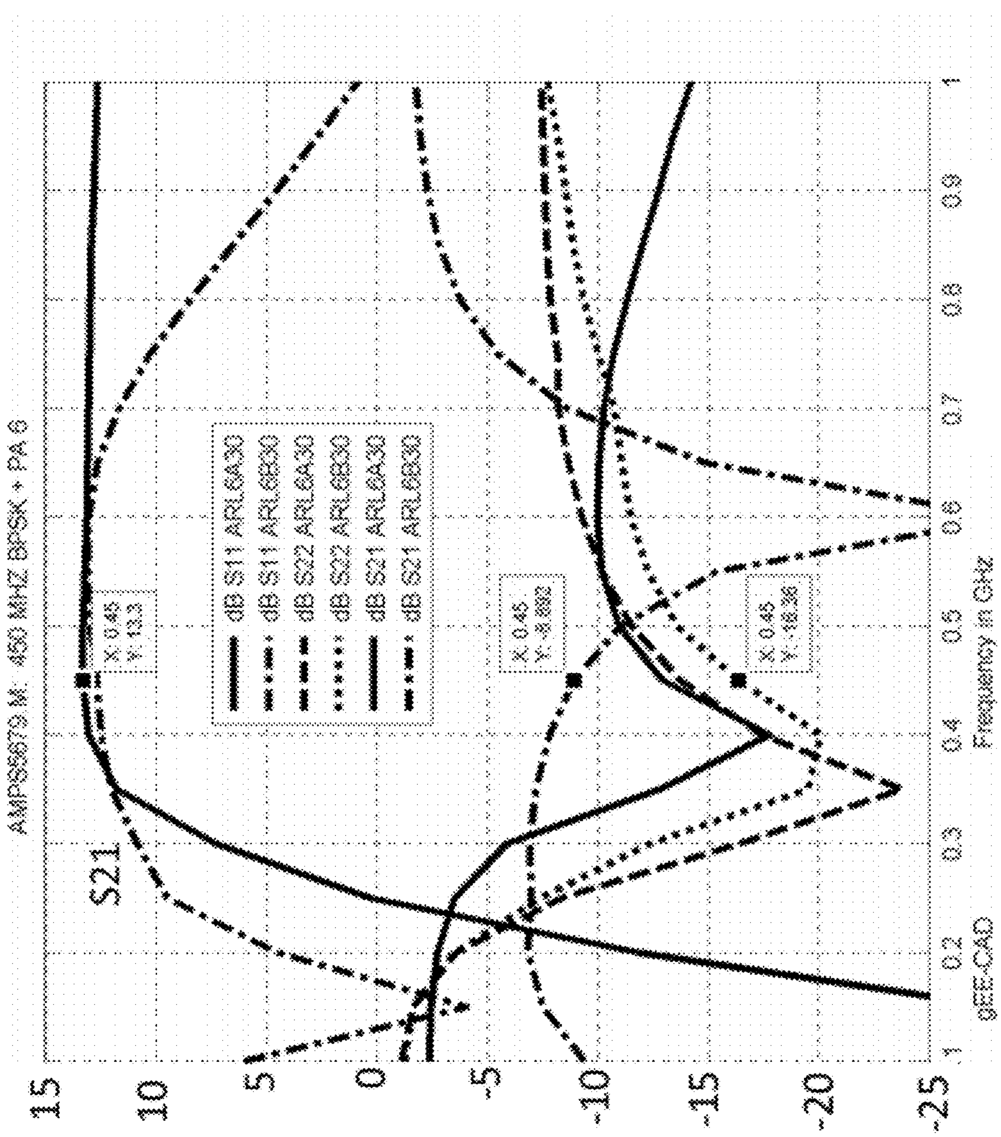
FIG. 5 illustrates a plot of RF probe measurements of 450 MHz BPSK modulator, power amp, and TRS.

FIG. 5 shows the first experimental S-parameter measurements of the cascaded TR switch, BPSK modulator and power amplifier in both modulation states. A gain of only 13.3 dB results from the added insertion losses introduced by the modulator and TR switch. Otherwise. the input and output matches of less than −10 dB are in good agreement at 450 MHz except for the input match of modulation State A.

Figure 6:
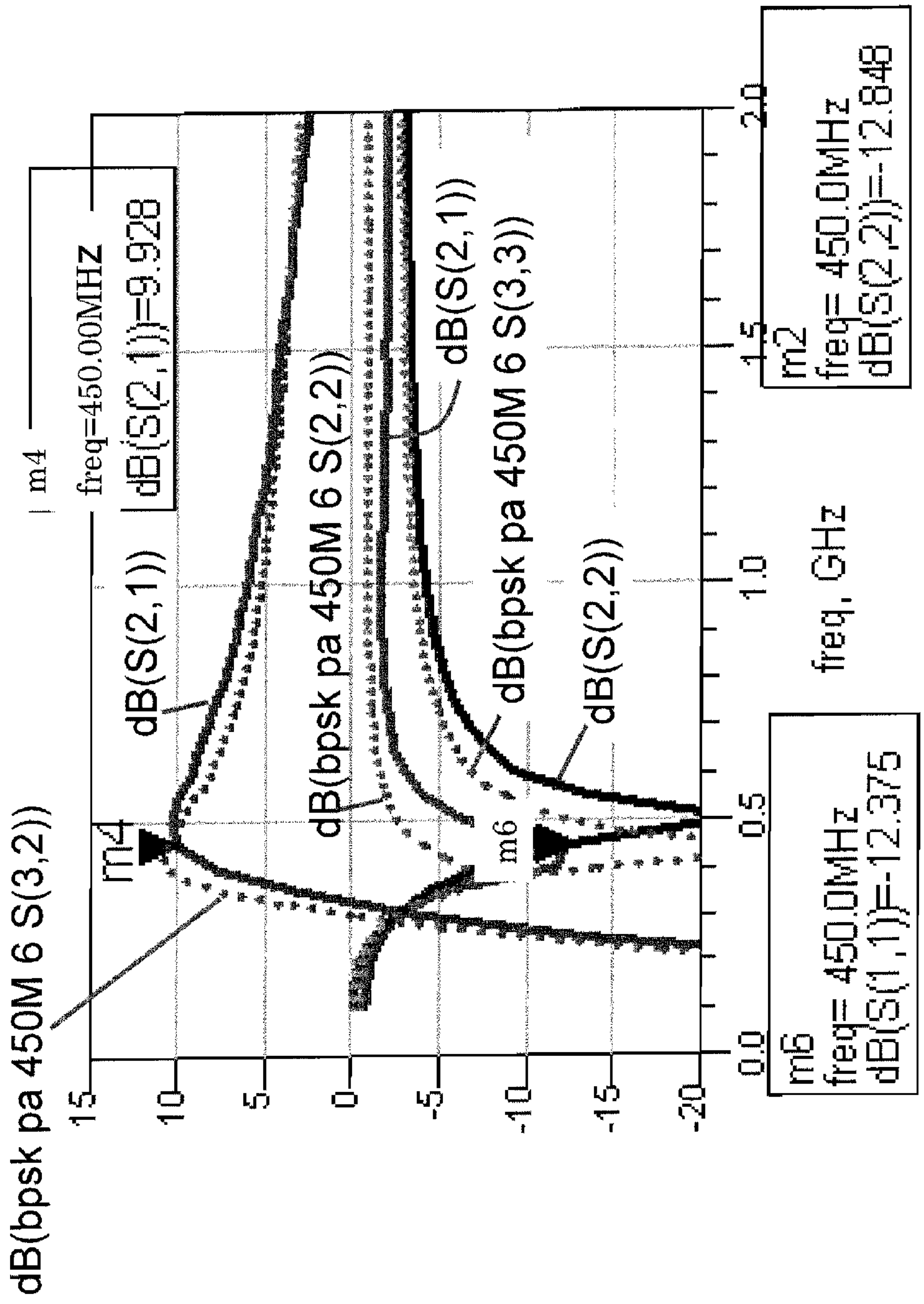
FIG. 6 is a graphical illustration of a plot of RF probe measurements of 450 MHz LNA and TRS (ALR 6).

FIG. 6 shows the first experimental S-parameter measurements of the cascaded TR switch and LNA. These experimental results show spectacular agreement with simulations. The input and output matches are all well below ~10 dB but the gain is a little lower than desired at only 9.9 dB. Unfortunately, the insertion loss of the TR switch is not enough to account for this discrepancy. The LNA was most likely matched to a 50 ohm load, prior to the design of the TR switch. This would cause the combined load of the antenna input and the TR switch to look different than SO ohms.

Table 3 gives the first test results for a DC bias of 3.0 V and 18 mA, For the BPSK modulator plus power amplifier, there is a PAE of 41.6% at the beginning of 3 dB compression for a DC input power of only 78.0 mW, lower than for the power amplifier tested without the modulator.

TABLE 1

| Initial Power and Efficiency Performance of 450 MHz Power Amp 2.7 V | | | | | | | | | |
|---|---|---|---|---|---|---|---|---|---|
| 450 MHz | Die#1 | PA450 MHz Emode ARL Tile 1 TQPED | | | | 2.7 V; 17 mA | | | |
| Pin(SG) | Pout(SA) | Pin(corr) | Pout(corr) | Gain | I1(2.7 V) | PDC(mw) | Pout(mw) | Drn Eff | PAE |
| −15.0 | 4.00 | −15.38 | 4.70 | 20.08 | 17 | 45.9 | 2.95 | 6.4 | 6.4 |
| −13.0 | 5.83 | −13.38 | 6.53 | 19.91 | 17 | 45.9 | 4.50 | 9.8 | 9.7 |
| −11.0 | 7.67 | −11.38 | 8.37 | 19.75 | 18 | 48.6 | 6.87 | 14.1 | 14.0 |
| −9.0 | 9.50 | −9.38 | 10.20 | 19.58 | 19 | 51.3 | 10.47 | 20.4 | 20.2 |
| −7.0 | 11.00 | −7.38 | 11.70 | 19.08 | 20 | 54.0 | 14.79 | 27.4 | 27.1 |
| −5.0 | 12.67 | −5.38 | 13.37 | 18.75 | 23 | 62.1 | 21.73 | 35.0 | 34.5 |
| −3.0 | 14.17 | −3.38 | 14.87 | 18.25 | 26 | 70.2 | 30.69 | 43.7 | 43.1 |
| −1.0 | 15.17 | −1.38 | 15.87 | 17.25 | 28 | 75.6 | 38.64 | 51.1 | 50.1 |
| 0.0 | 15.50 | −0.38 | 16.20 | 16.58 | 29 | 78.3 | 41.69 | 53.2 | 52.1 |

Table 2 shows a PAE of 52.1% at the beginning of 3 dB compression for a DC input power of only 78.3 mW and table 2 shows a PAE of 50.6% for a DC power of 102.0 mW.

TABLE 2

| Initial Power and Efficiency Performance of 450 MHz Power Amp 3.0 V and 25 mA | | | | | | | | | |
|---|---|---|---|---|---|---|---|---|---|
| 450 MHz | Die#1 | PA450 MHz Emode ARL Tile 1 TQPED | | | | 3 V; 25 mA | | | |
| Pin(SG) | Pout(SA) | Pin(corr) | Pout(corr) | Gain | I1(3 V) | PDC(mw) | Pout(mw) | Drn Eff | PAE |
| −15.0 | 5.17 | −15.38 | 5.87 | 21.25 | 25 | 75.0 | 3.86 | 5.2 | 5.1 |
| −13.0 | 7.00 | −13.38 | 7.70 | 21.08 | 25 | 75.0 | 5.89 | 7.9 | 7.8 |
| −11.0 | 8.83 | −11.38 | 9.53 | 20.91 | 25 | 75.0 | 8.97 | 12.0 | 11.9 |
| −9.0 | 10.67 | −9.38 | 11.37 | 20.75 | 25 | 75.0 | 13.71 | 18.3 | 18.1 |
| −7.0 | 12.33 | −7.38 | 13.03 | 20.41 | 27 | 81.0 | 20.09 | 24.8 | 24.6 |
| −5.0 | 14.00 | −5.38 | 14.70 | 20.08 | 29 | 87.0 | 29.51 | 33.9 | 33.6 |
| −3.0 | 15.33 | −3.38 | 16.03 | 19.41 | 31 | 93.0 | 40.09 | 43.1 | 42.6 |
| −1.0 | 16.17 | −1.38 | 16.87 | 18.25 | 33 | 99.0 | 48.64 | 49.1 | 48.4 |
| 0.0 | 16.50 | −0.38 | 17.20 | 17.58 | 34 | 102.0 | 52.48 | 51.5 | 50.6 |

TABLE 3

| Initial power and efficiency performance of a 450 MHz power amp with 3.0 V/25 mA bias | | | | | | | | | |
|---|---|---|---|---|---|---|---|---|---|
| 450 MHz | Die#1 | PA450 MHz Emode ARL #6 Tile 1 TQPED | | | 3 V; 18 mA | | | | |
| Pin(SG) | Pout(SA) | Pin(corr) | Pout(corr) | Gain | I(3 V) | PDC(mw) | Pout(mw) | Drn Eff | PAE |
| −10.0 | 3.17 | −10.70 | 3.55 | 14.25 | 18 | 54.0 | 2.26 | 4.2 | 4.0 |
| −8.0 | 5.17 | −8.70 | 5.55 | 14.25 | 18 | 54.0 | 3.59 | 6.6 | 6.4 |
| −6.0 | 7.17 | −6.70 | 7.55 | 14.25 | 18 | 54.0 | 5.68 | 10.5 | 10.1 |
| −4.0 | 9.00 | −4.70 | 9.38 | 14.08 | 19 | 57.0 | 8.66 | 15.2 | 14.6 |
| −2.0 | 10.67 | −2.70 | 11.05 | 13.75 | 20 | 60.0 | 12.72 | 21.2 | 20.3 |
| 0.0 | 12.17 | −0.70 | 12.55 | 13.25 | 21 | 63.0 | 17.97 | 28.5 | 27.2 |
| 2.0 | 13.67 | 1.30 | 14.05 | 12.75 | 23 | 69.0 | 25.38 | 36.8 | 34.8 |
| 4.0 | 14.67 | 3.30 | 15.05 | 11.75 | 25 | 75.0 | 31.95 | 42.6 | 39.8 |
| 6.0 | 15.17 | 5.30 | 15.55 | 10.25 | 26 | 78.0 | 35.85 | 46.0 | 41.6 |

Figure 7:
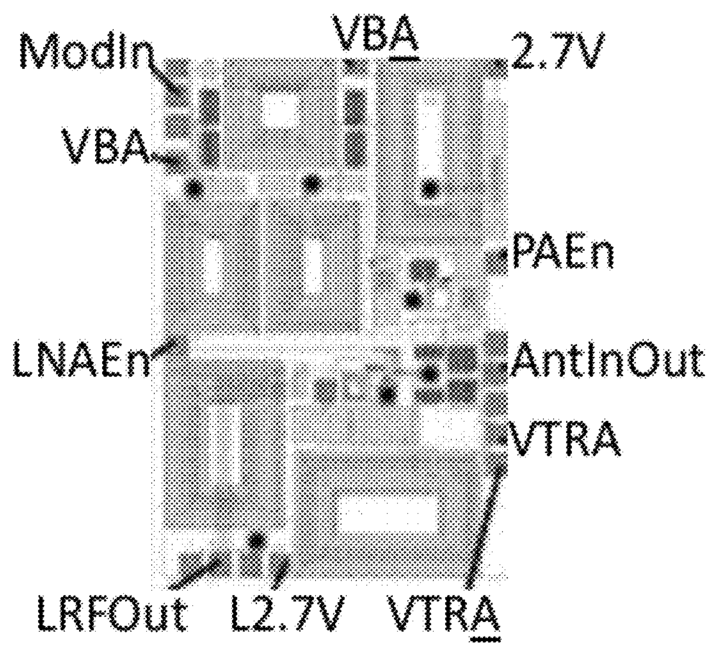
FIG. 7 is an illustration of a layout for the full RFIC booster design at 450 MHz including novel BPSK modulator and gate enable inputs on-chip.

A designed "gate enable" transistor on each Emode PHEMT based amplifier was added to provide much greater isolation between the operation modes of the TR switch. The gate enable also functions to virtually turn off the power supply consumption without requiring additional real estate and external circuitry for an additional voltage regulator. Included was a robust current mirror biased so that the amplifier circuits could operate over a range of battery voltages keeping the output power and power added efficiency (PAE) optimal over lower supply voltages. This feature also does not typically exist in COTS chips and is extremely important for remote, low-power applications. A schematic layout representation of the booster chip is depicted in FIG. 7, which depicts a full RFIC narrowband 450-MHz booster chip on a 4×4 mm tile on a GaAs substrate. The transmit stage of the circuit consists of the BP SK modulator cascaded with a power amplifier and TR switch. The receive stage of the circuit consists of the TR switch cascaded with the LNA. The BPSK modulator typically exists off-chip. There are additional gate enable DC inputs to provide a higher level of isolation between the power amplifier and LNA stages than is currently available. These gate enable features are denoted in FIG. 7 as "LNAen" and "PAen," respectively, and save power consumption and provide additional isolation between transmit and receive stages. This isolation could be essential for system level performance, and provides an additional 60 dB of isolation between transmit and receive beyond the 35-40 dB of isolation provided by the TR switch. Alternately, without departing from the scope of the invention, this additional isolation could be provided in the other designs by providing switching supplies for the separate LNA and power amplifier supply inputs, but this would require significant board area compared to the simple gate enable inputs. The BPSK modulator has a negative DC OFF state of approximately 3.0 V and an ON state of 0.0 V to activate the A and B control pins. The TR switch has a positive DC reference of 2.5 V on the control inputs corresponding to ON and 0.0 V corresponding to OFF, which activate the transmit stage or the receive stage, respectively. The PA and LNA both have a +2.7 to +3.0 V supply voltage.

Figure 8:
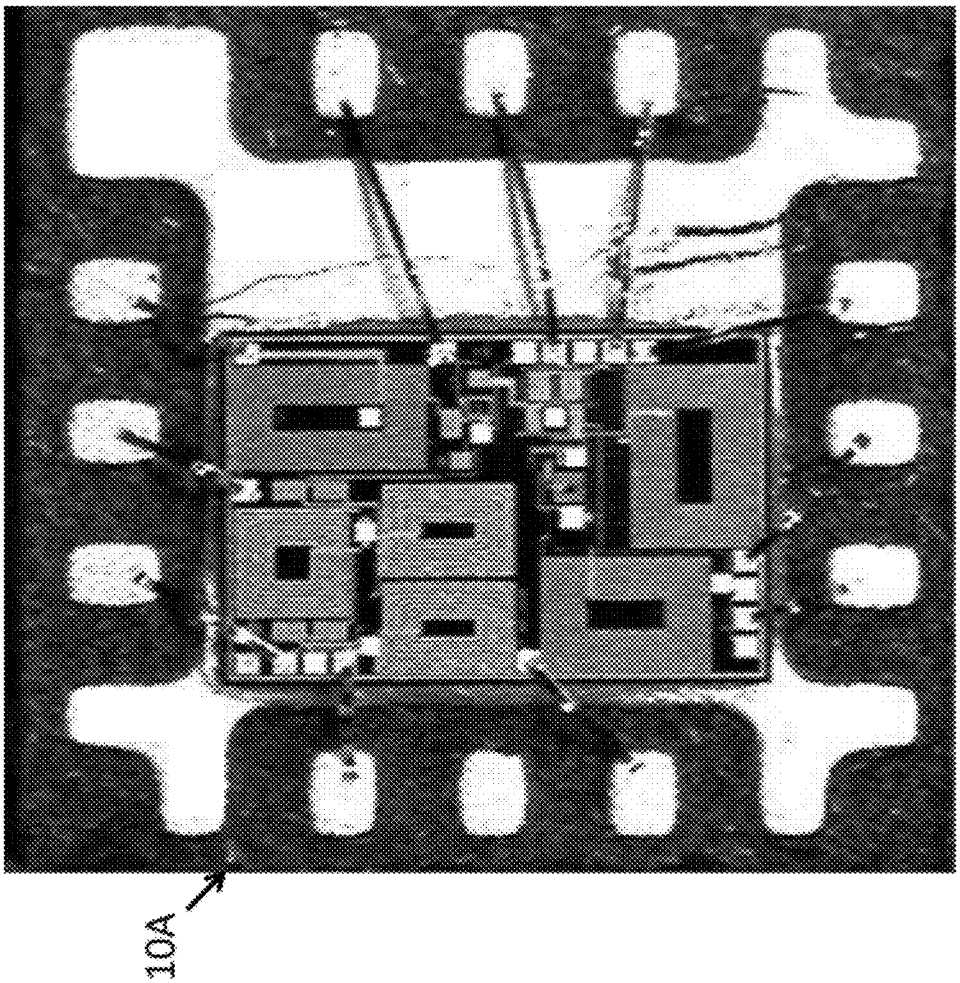
FIG. 8 shows the fabricated chip from FIG. 7 wire bonded and packaged in a 4×4 mm QFN package utilized for testing the gate enable inputs.

FIG. 8 is an illustration of the fabricated chip from FIG. 7 wire bonded and packaged in a 4×4 mm QFN package utilized for testing the gate enable inputs.

Figure 9:
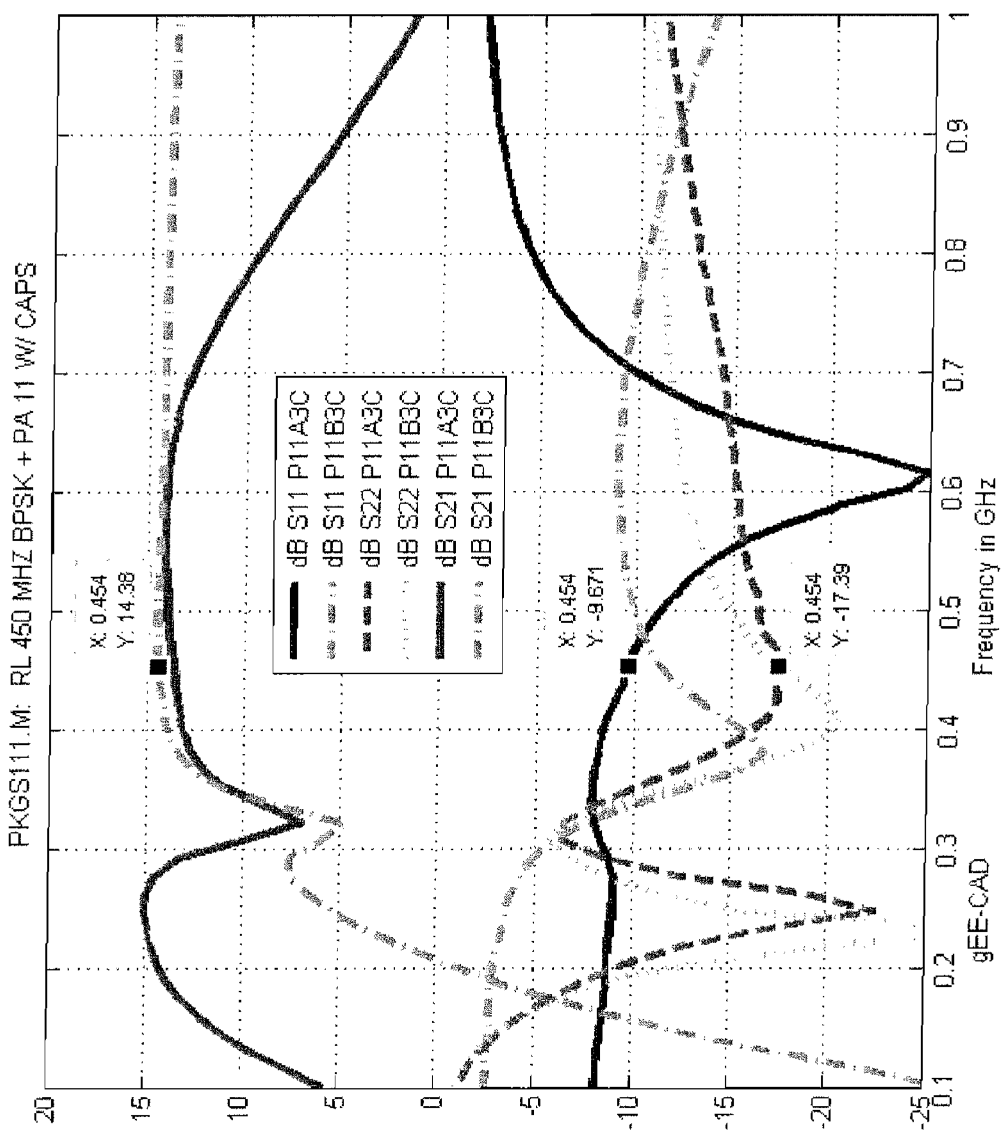
FIG. 9 illustrates the gain and return loss of BPSK Modulator and Power Amplifier in Both States (Shows the measured modulator and power amplifier after assembly into QFN Package). The gain and return loss are comparable to the measurements made on the bare die.

FIG. 9 is a graphical illustration showing the measured modulator and power amplifier after assembly into the QFN package. The gain and return loss are comparable to the measurements that were made on the bare die.

Figure 10:
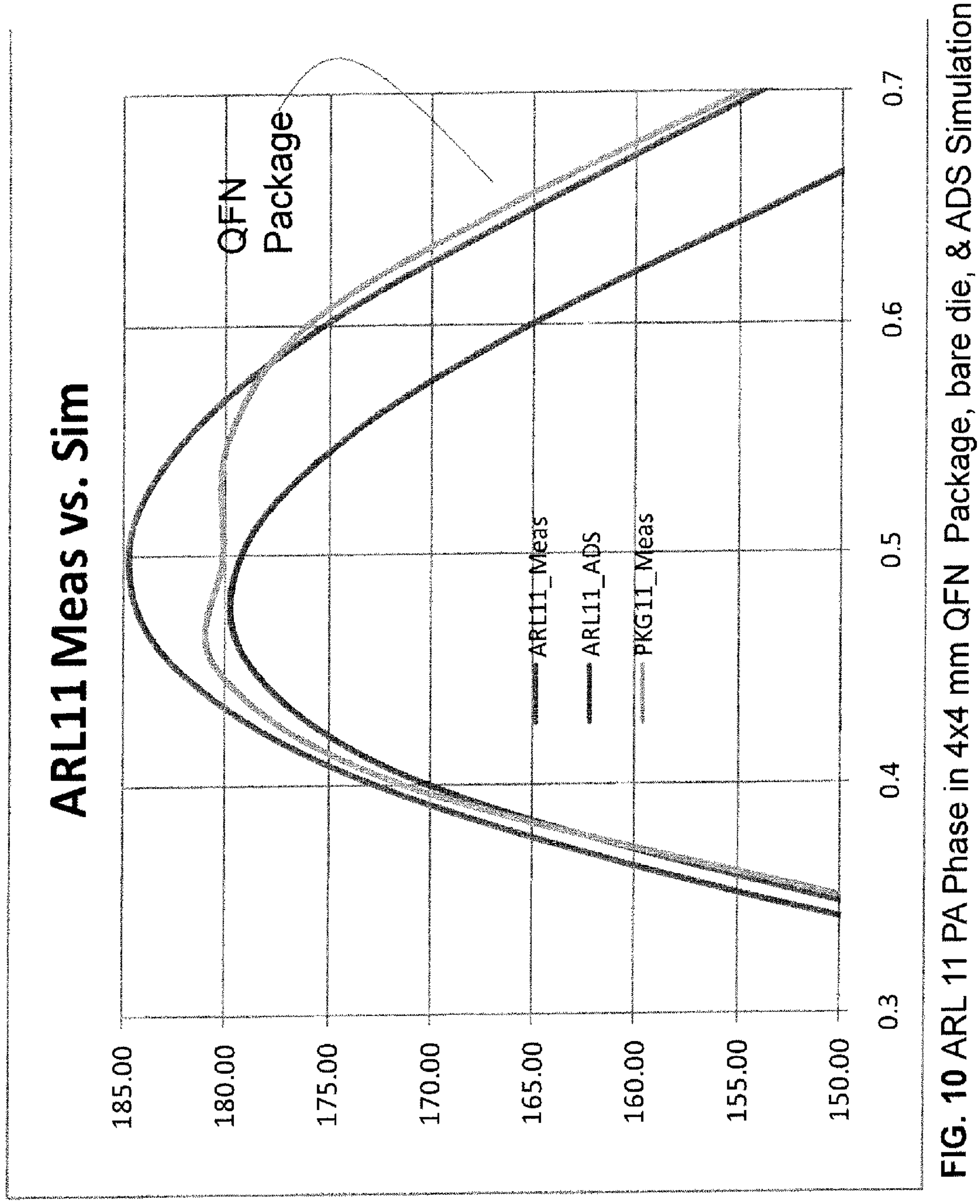
FIG. 10 illustrates the PA phase in 4×4 mm QFN Package, bare die, and ADS Simulation; showing the simulated, experimental, and experimental data after the chip has been wire bonded in the package as shown in FIG. 8. The package shows about an 181° phase difference at 450 MHz which is very desirable; indicating the wire bonds and package parasitics had a negligible impact on the performance of the BPSK modulator.

FIG. 10 is a graphical illustration showing the simulated experimental and experimental data after the chip has been wire bonded in the package as shown in FIG. 8. The packaged data shows about an 181° phase difference at 450 MHz which is very desirable. This means the wire bonds and package parasitics had a negligible impact on the performance of the BPSK modulator.

Figure 11:
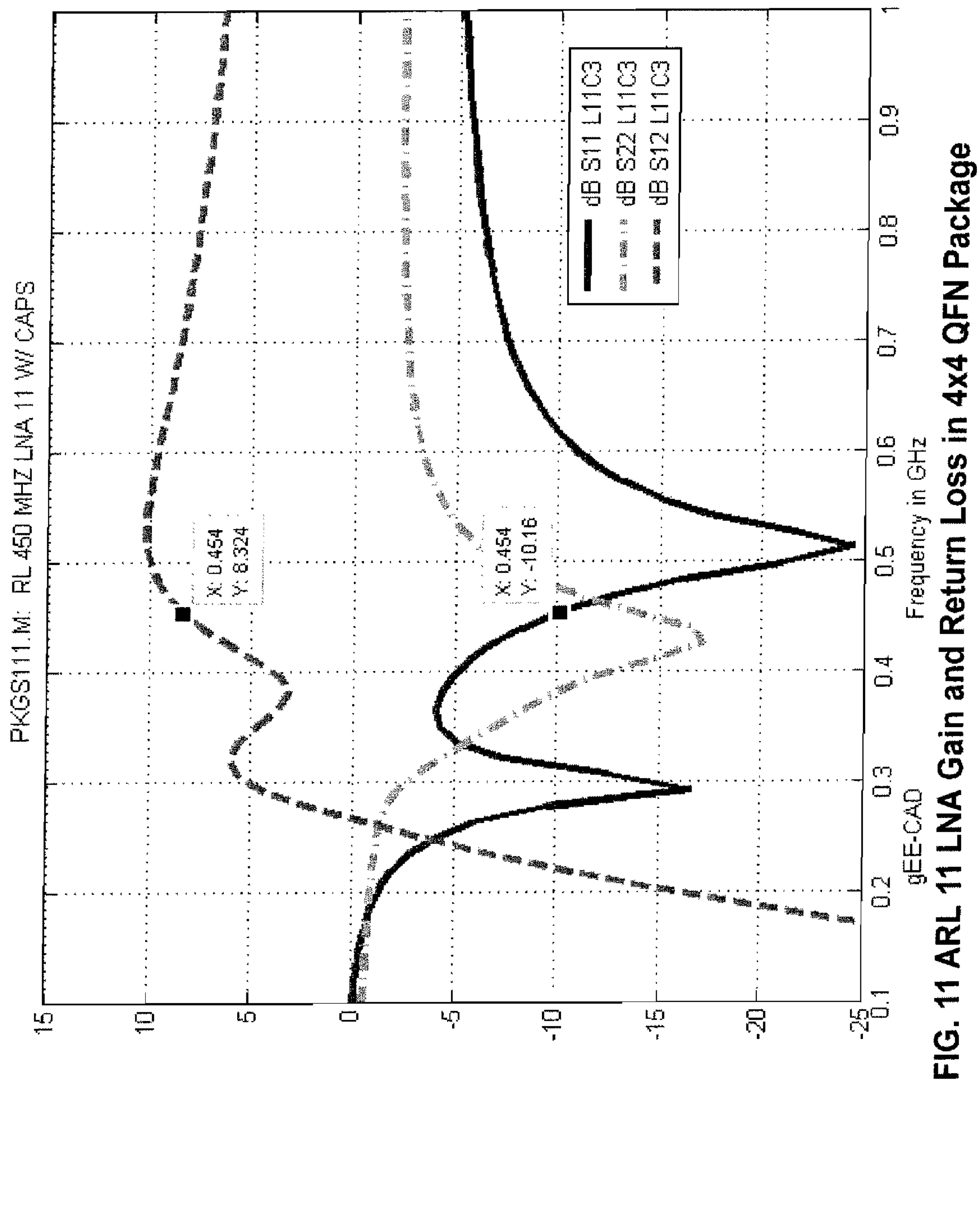
FIG. 11 is an illustration of experimental S-parameter measurements of the LNA in the QFN wire bonded package showing LNA Gain and Return loss, wherein both the input and output loss are −10 dB or better with a gain of about 8.8 dB.

FIG. 11 is a graphical illustration showing the first experimental S-parameter measurements of the LNA in the QFN wire bonded package. Both the input and output loss are −10 dB or better with a gain of about 8.8 dB.

Figure 12:
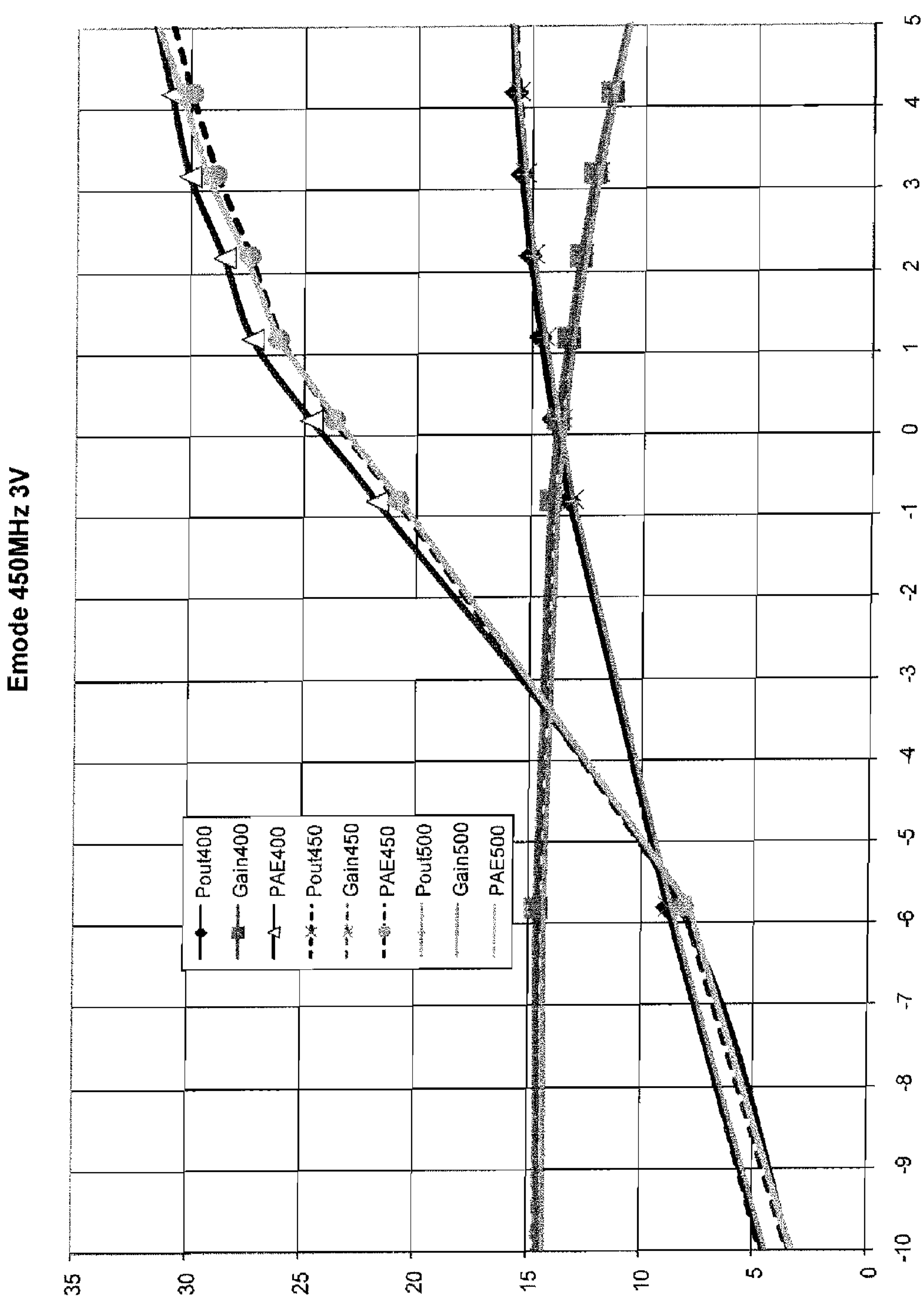
FIG. 12 is a graphical depiction PA Output Power and Efficiency in 4×4 QFN Package (3.0 V) illustrating the relationship between input power, output power, gain, and PAE of the transmit stage (Table 4 shows the numerical data of such a test)

FIG. 12 is a graphical illustration showing the relationship between input power, output power, gain, and PAE of the transmit stage. The gain remains fairly steady until non-linear effects begin to dominate at higher input power.

Table 4 gives the numerical test results of the power amplifier in the QFN packaged for a DC bias of 2.7 V and 22 mA and of 3.0 V and 32 mA. There is a PAE of 33.4% at the beginning of 3 dB compression for a DC input power of only 86.4 mW and a PAE of 31.0% for a DC power of 114.0 mW. The PAE of the packaged IC is about 10% lower than the probed bare die measurement. It could be that the inductance of the wire bond in the package is negatively affecting the performance of the transmit stage.

| 450 MHz | PKG#1 | PA450 MHz Emode ARL #11 Tile 1 TQPED | | | 2.7 V; 22 mA | | | | |
|---|---|---|---|---|---|---|---|---|---|
| Pin(SG) | Pout(PS) | Pin(corr) | Pout(corr) | Gain | I1(2.7 V) | PDC(mw) | Pout(mw) | Drn Eff | PAE |
| −10.0 | 2.70 | −10.82 | 2.80 | 13.62 | 20 | 54.0 | 1.91 | 3.5 | 3.4 |
| −5.0 | 7.56 | −5.82 | 7.66 | 13.48 | 21 | 56.7 | 5.83 | 10.3 | 9.8 |
| 0.0 | 11.94 | −0.82 | 12.04 | 12.86 | 24 | 64.8 | 16.00 | 24.7 | 23.4 |
| 1.0 | 12.69 | 0.18 | 12.79 | 12.61 | 25 | 67.5 | 19.01 | 28.2 | 26.6 |
| 2.0 | 13.36 | 1.18 | 13.46 | 12.28 | 27 | 72.9 | 22.18 | 30.4 | 28.6 |
| 3.0 | 13.93 | 2.18 | 14.03 | 11.85 | 28 | 75.6 | 25.29 | 33.5 | 31.3 |
| 4.0 | 14.38 | 3.18 | 14.48 | 11.30 | 30 | 81.0 | 28.05 | 34.6 | 32.1 |
| 5.0 | 14.73 | 4.18 | 14.83 | 10.65 | 31 | 83.7 | 30.41 | 36.3 | 33.2 |
| 6.0 | 14.97 | 5.18 | 15.07 | 9.89 | 32 | 86.4 | 32.14 | 37.2 | 33.4 |

-continued

| 450 MHz | PKG#1 | PA450 MHz Emode ARL #11 Tile 1 TQPED | | | 3 V; 32 mA | | | | |
|---|---|---|---|---|---|---|---|---|---|
| Pin(SG) | Pout(PS) | Pin(corr) | Pout(corr) | Gain | I1(3 V) | PDC(mw) | Pout(mw) | Drn Eff | PAE |
| −10.0 | 3.75 | −10.82 | 3.85 | 14.67 | 30 | 90.0 | 2.43 | 2.7 | 2.6 |
| −5.0 | 8.71 | −5.82 | 8.81 | 14.63 | 30 | 90.0 | 7.60 | 8.4 | 8.2 |
| 0.0 | 13.10 | −0.82 | 13.20 | 14.02 | 32 | 96.0 | 20.89 | 21.8 | 20.9 |
| 1.0 | 13.80 | 0.18 | 13.90 | 13.72 | 33 | 99.0 | 24.55 | 24.8 | 23.7 |
| 2.0 | 14.37 | 1.18 | 14.47 | 13.29 | 34 | 102.0 | 27.99 | 27.4 | 26.2 |
| 3.0 | 14.85 | 2.18 | 14.95 | 12.77 | 36 | 108.0 | 31.26 | 28.9 | 27.4 |
| 4.0 | 15.24 | 3.18 | 15.34 | 12.16 | 37 | 111.0 | 34.20 | 30.8 | 28.9 |
| 5.0 | 15.56 | 4.18 | 15.66 | 11.48 | 38 | 114.0 | 36.81 | 32.3 | 30.0 |
| 6.0 | 15.77 | 5.18 | 15.87 | 10.69 | 38 | 114.0 | 38.64 | 33.9 | 31.0 |

Figure 13:
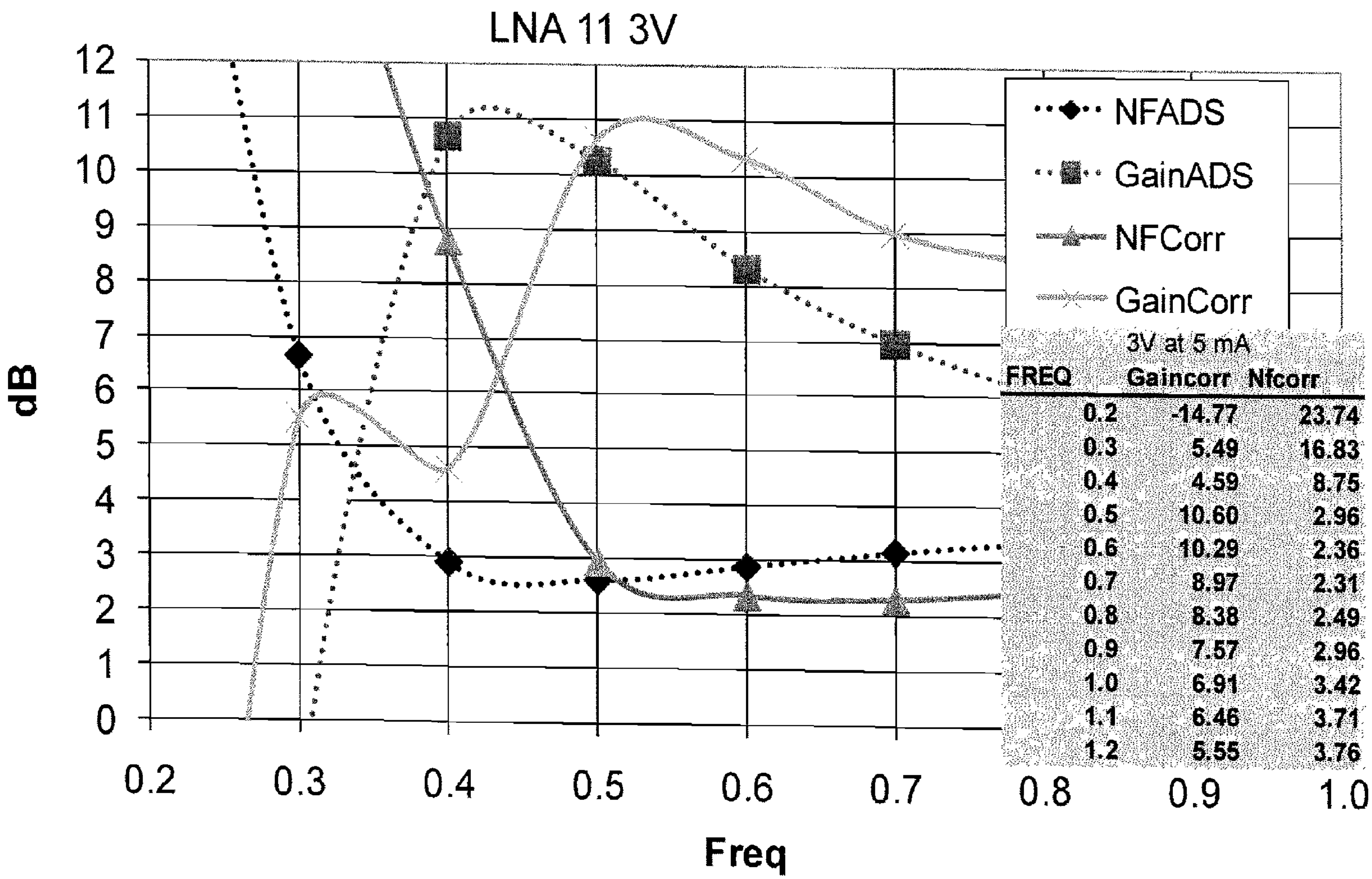
FIG. 13 is an illustration of LNA Gain and Noise Figure in 4×4 QFN Package (3.0 V) wherein the measurements and design of a QFN package are shown for comparison to the initial probe measurements for the bare die and the performance in the package is comparable to the die measurements in most cases.

FIG. 13 shows the relationship between operational frequency, gain, and noise figure of the QFN packaged LNA. A tradeoff exists between gain and noise figure, but in this case a gain of greater than 10 dB and a noise figure of less than 3 shows the success of this design. Commercial LNA chips may often have a noise figure as high as 7 dB or worse.

Measurements of the design in a QFN package are shown for comparison to the initial probe measurements of the bare die. The performance in the package is comparable to the die measurements in most cases, or slightly worse due to additional losses in the package.

Generally speaking, commercial companies have chips that boost output power that are targeted for 2.4 GHz, but use silicon processes. GaAs is superior in performance to silicon in efficiency, noise figure, and switching speeds. In addition, the present design includes an on-board BPSK modulator, optionally uses a robust current mirror bias for varying battery supply voltages, and have optional gate enables that provide very high isolation between the transmit and receive paths. The preferred embodiments may include circuits that take advantage of superior GaAs characteristics. This circuitry provides a simple means to reduce power consumption to the power amplifier or low noise amplifier without having to utilize a separate external power supply.

The preferred embodiment GaAs design improves performance over the newer silicon based RFIC booster chips by enabling their use in environments or applications beyond the capabilities of COTS parts. The addition of the optional current mirror into the design provides longer operational life in remote operations and additional pins to increase the isolation between transmit and receive stages of the circuit for improved performance.

The invention may be used, for example, to enhance the performance of any wireless RF system using commercial parts. It could also be used as a standalone BPSK modulation system by adding a digital controller and an oscillator source with the RFIC booster chip as the front end of a transceiver. One substantial benefit is the fact that wireless sensors can operate remotely, for longer periods of time, and increased transmission range means critical data can be retrieved from safer differences.

Using the concepts of the present invention, there is high isolation between transmit and receive paths by the combination of TR switch isolation and an amplifier gate enable circuit. The addition of the current mirror allows stable current consumption even at decreasing DC voltage supplies.

Figure 14:
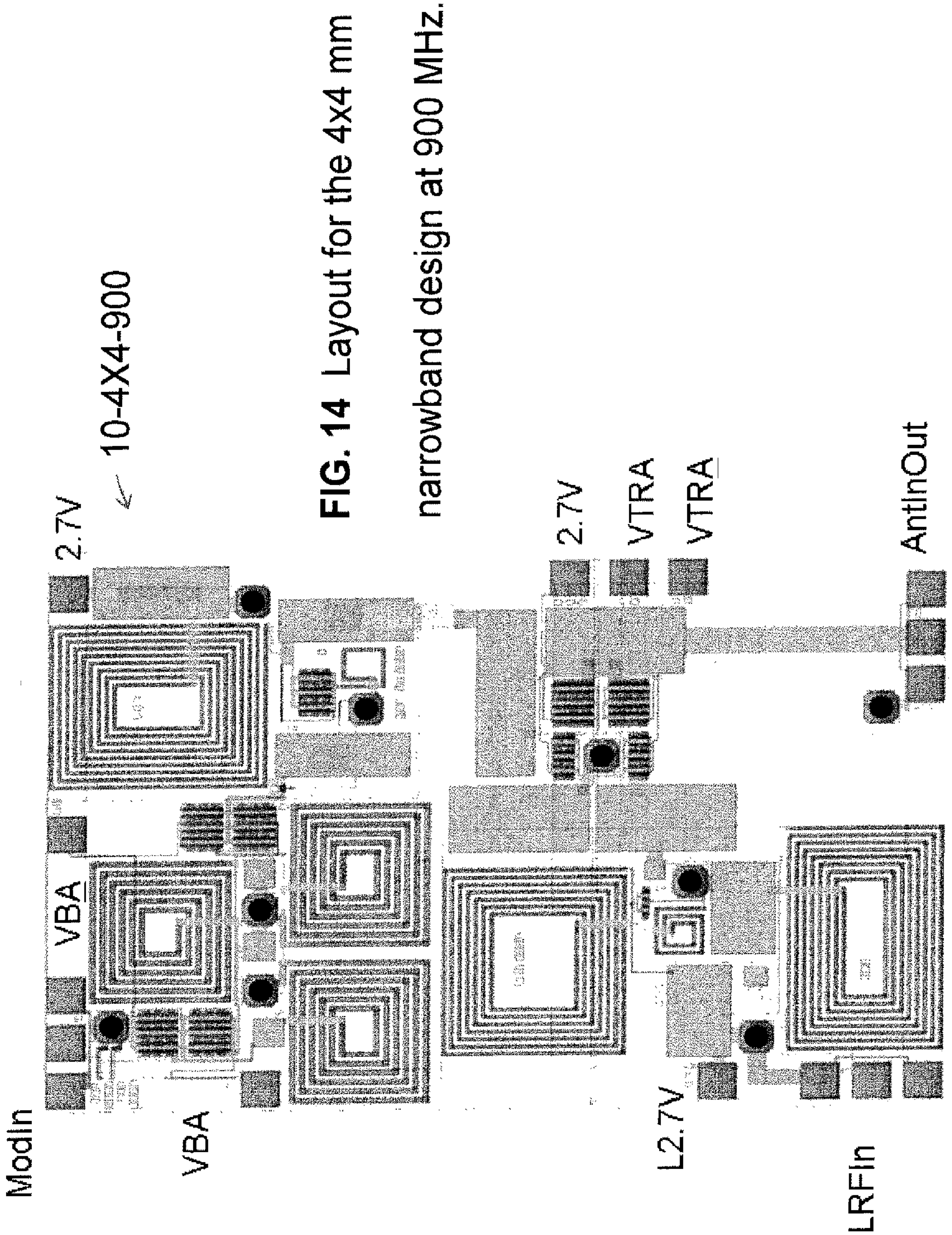
FIG. 14 is an illustration of a 900 -MHz booster chip on a 95×65 mil die. Shown is the layout for the 4×4 mm narrowband design at 900 MHz.

The design in FIG. 14 is a 900-MHz booster chip on a 95×65 mil die. A current mirror at the DC input limits variation of current consumption in the PA and LNA over for a wider range of supply voltages. For battery operated applications, this ensures chip operation even as the battery output degrades over time and usage. The BPSK modulator has a positive DC OFF state of approximately 3.0 V and an ON state of 0.0 V to activate the modulation state control pins. The TRS has a positive DC reference of 2.5 V on the control inputs corresponding to ON and 0.0 V corresponding to OFF, which activates the transmit and receive stages, respectively. The PA and LNA both have a 2.7 to 3.0 V supply voltage for optimal performance.

Figure 15:
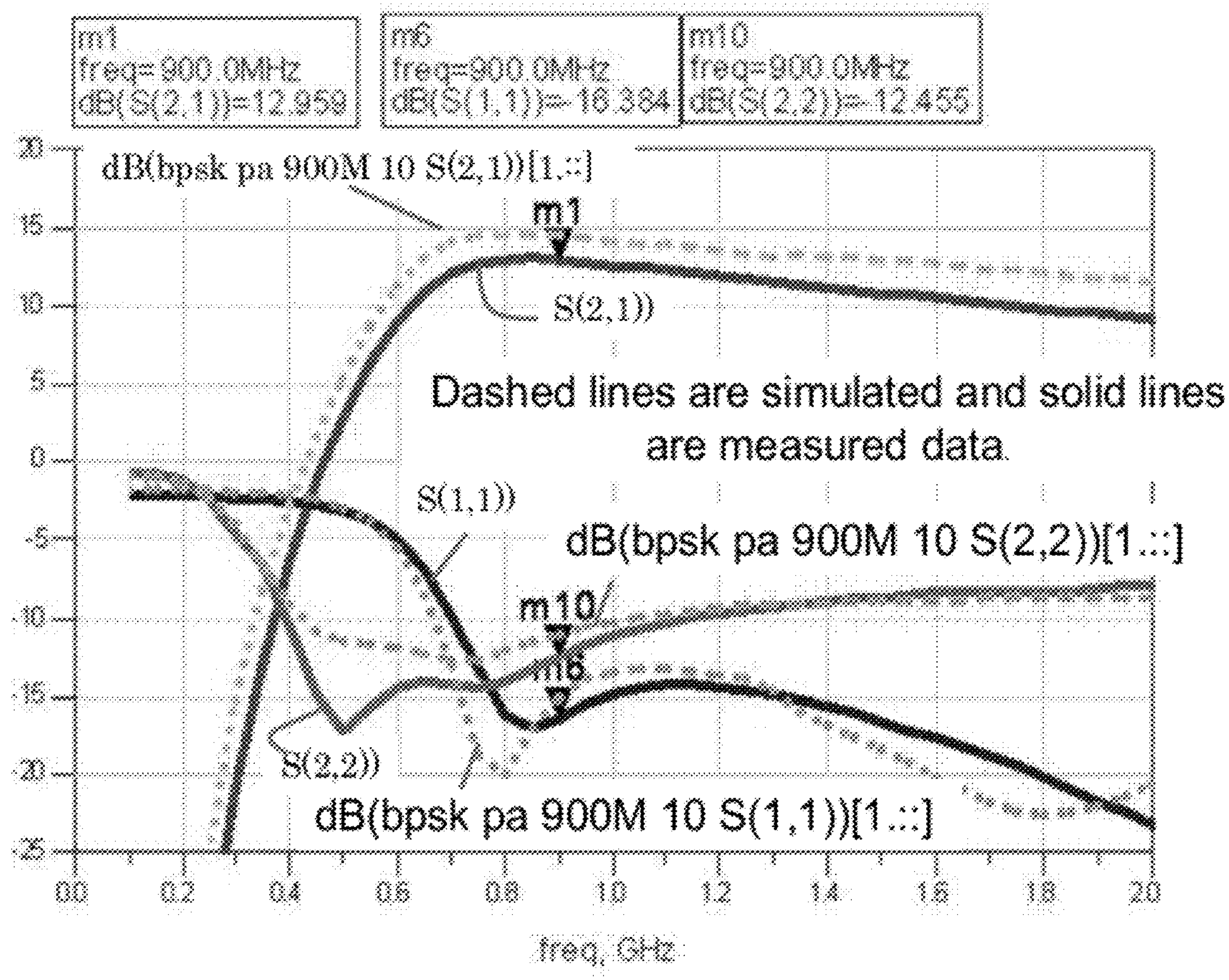
FIG. 15 illustrates graphically the results of experimental S-parameters for the transmit stage in state A at 900 MHz. Dashed lines are simulated and solid lines are measured data.
Figure 16:
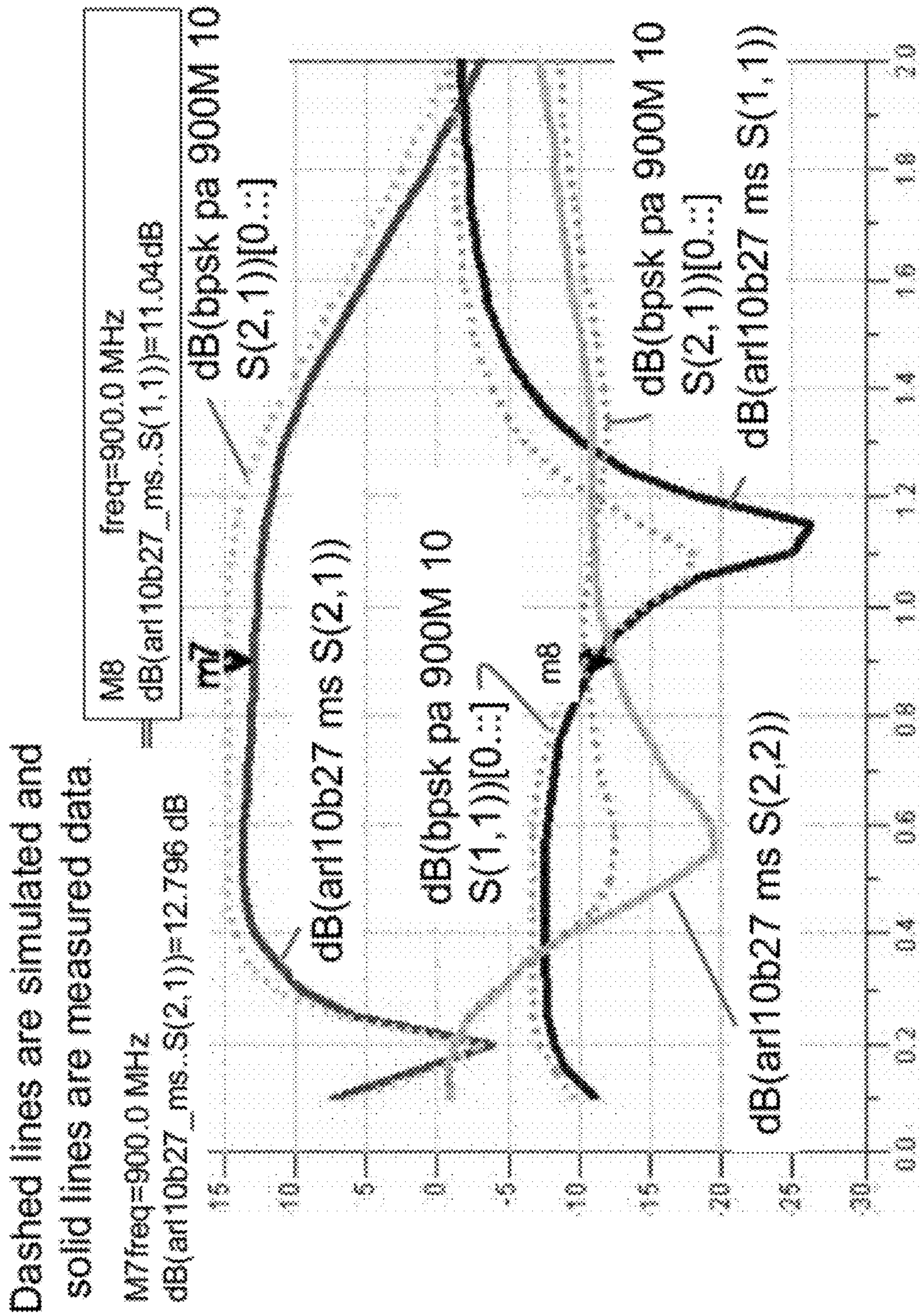
FIG. 16 illustrates graphically measured and simulated S-parameters of the transmit stage in state B at 900 MHz. Dashed lines are simulated and solid lines are measured data.

The gain of the transmit stage is expected to be about 14 dB since the PA is designed to 20 dB, and there is an insertion loss of −2 dB in the BPSK modulator, an attenuator of 3 dB between the two stages, and a loss of −1.0 dB in the TRS. The gain of the receive stage is expected to be about 14 dB after taking the insertion loss of the TRS into account. The two-port S-parameters of the transmit stage were simulated with each of the two BPSK modulation states activated individually, and the results are depicted in FIGS. 15 and 16, which show the simulated versus measured results of the S-parameters for the transmit stage of the chip in both modulation states. Both states show fairly good agreement with the simulated results at 900 MHz with some discrepancy in the S21 measurement. State A has a measured S11 of −15.34 dB, which is better than a simulation of approximately −14.5 dB, but degrades from the −19.67 dB of the simulation. The input match of state B is −10.73 dB, which matches the simulation exactly, but also degrades from −12.13 dB. The measured S21 of states A and B are 13.6 dB and 13.3 dB, respectively, which averages to a 2-dB degradation from the simulation. The gain for state A degrades 1.5 dB, while the gain of state B only degrades approximately 0.3 dB.

At 900 MHz, a gain of 14.6 dB was seen for both modulation states, an output match of approximately −9.0 dB for both modulation states, and an input match of approximately −13.0 and −10.5 dB for state A versus state B, respectively. With the additional losses introduced by the BPSK modulator, attenuator, and TRS, the PA is providing a gain of about 20.6 dB, which exceeds the original design goals. The output match of both states was also good, and the input match was acceptable.

Figure 17:
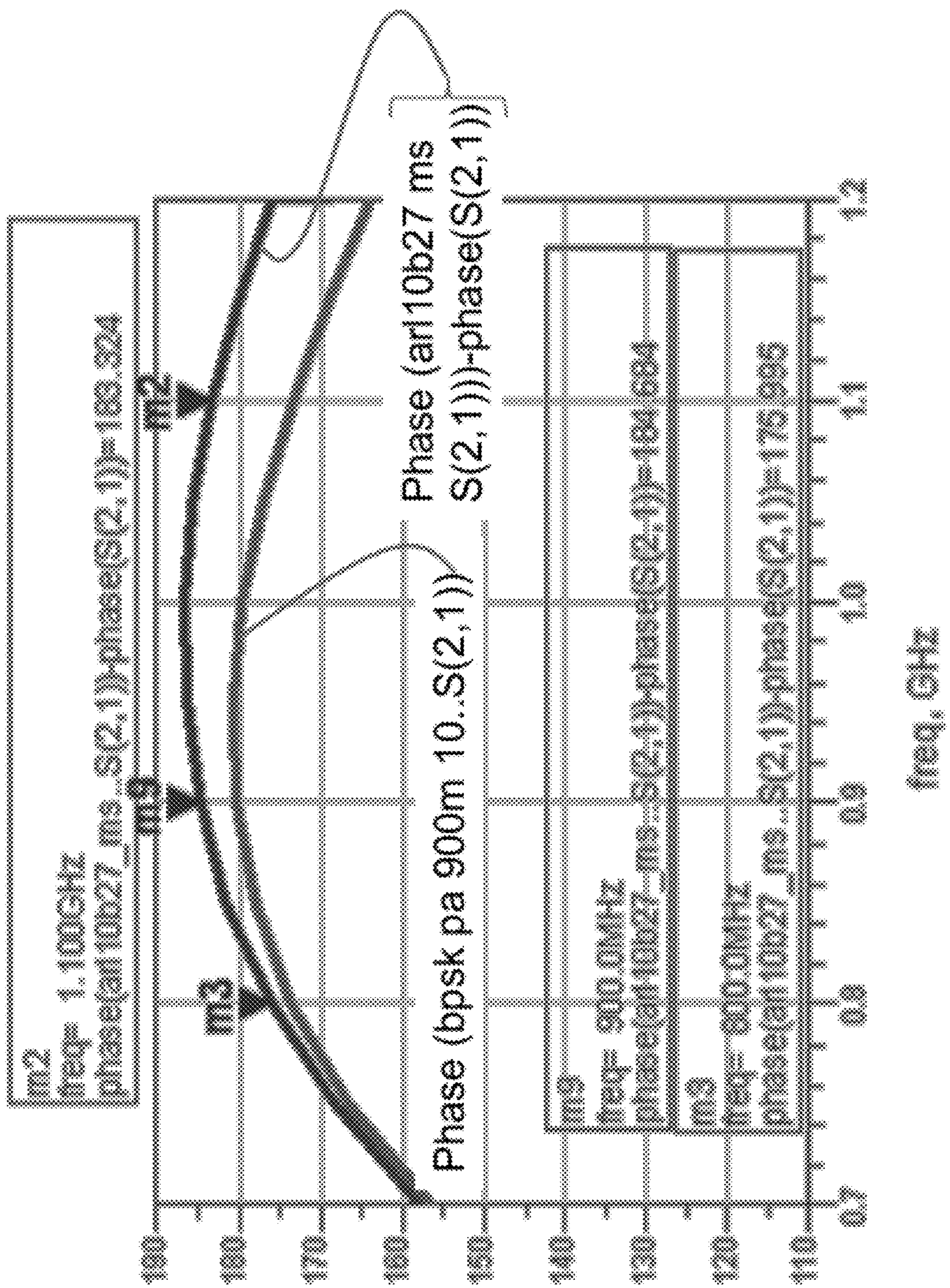
FIG. 17 illustrates graphically phase data of the transmit stage at 900 MHz; showing the measured (lower line) versus simulated (upper line) results for the phase difference of the two modulation states of the BPSK modulator.

FIG. 17 shows the measured versus simulated phase data results for the phase difference of the two modulation states of the BPSK modulator (transmit stage). The graph depicts the measured (lower line) versus the simulated (upper) results for the phase difference of the two modulation states of the BPSK modulator. At 900 MHz, the measured phase difference was approximately 184.5° versus a simulated value of approximately 179.0°. Ideally, the modulator would have a 180° phase difference between the two modulation states at the design frequency; but the measured phase difference was within operational limits.

The PAE was tested by injecting sequentially increasing power levels and recording the corresponding output levels on a spectrum analyzer after accounting for cable losses. The following equation to calculate PAE was used, where $P_{out}$ is output power, $P_{in}$ is input power, and $P_{DC}$ is the DC input:

$$PAE = \frac{P_{out} - P_{in}}{P_{DC}} \tag{1}$$

The results for the PAE measurements are depicted in table 5.

TABLE 5

Measured gain, PAE, and output power versus input power for the transmit stage of the RFIC booster chip at 900 MHz for a 2.7 V DC supply voltage.

| 900 MHz | Die#1 | PA900 MHz Emode ARL #10 Tile 1 TQPED | | | | 2.7 V; 17 mA | | | |
|---|---|---|---|---|---|---|---|---|---|
| Pin(SG) | Pout(SA) | Pin(corr) | Pout(corr) | Gain | I1(2.7 V) | PDC(mw) | Pout(mw) | Drn Eff | PAE |
| −10.0 | 2.50 | −10.48 | 3.52 | 14.00 | 29 | 78.3 | 2.25 | 2.9 | 2.8 |
| −8.0 | 4.50 | −8.48 | 5.52 | 14.00 | 29 | 78.3 | 3.56 | 4.6 | 4.4 |
| −6.0 | 6.50 | −6.48 | 5.52 | 14.00 | 29 | 78.3 | 5.65 | 7.2 | 6.9 |
| −4.0 | 8.50 | −4.48 | 9.52 | 14.00 | 29 | 78.3 | 8.95 | 11.14 | 11.0 |
| −2.0 | 10.33 | −2.48 | 11.35 | 13.83 | 29 | 78.3 | 13.65 | 17.4 | 16.7 |
| 0.0 | 12.17 | −0.48 | 13.19 | 13.67 | 29 | 78.3 | 20.84 | 26.6 | 25.5 |
| 2.0 | 13.67 | 1.53 | 14.69 | 13.17 | 29 | 78.3 | 29.44 | 37.6 | 35.8 |
| 4.0 | 14.50 | 3.53 | 15.52 | 12.00 | 30 | 81.0 | 35.65 | 44.0 | 41.2 |
| 6.0 | 15.17 | 5.53 | 16.19 | 10.67 | 32 | 86.4 | 41.59 | 48.1 | 44.0 |

The two-port S-parameters of the receive stage were simulated, and the results are depicted in FIG. 18. At 900 MHz, a gain of 12.8 dB was achieved, an output match of −31.6 dB, and an input match of approximately −6.5 dB. With the additional losses introduced by the TRS, the LNA is providing a gain of about 13.8 dB. FIG. 19 shows the NF of the receive stage to be 3 dB.

Circuit Packaging

Optimal custom Monolithic Microwave Integrated Circuit (MMIC) design requires knowledge of the intended packaging of the device to absorb package parasitics at microwave frequencies. Quad-flat-no-leads (QFN) packages are small, inexpensive plastic packages that minimize board space relative to the die size and are very popular for lower frequency RFICs. A die was designed for a 3×3 mm QFN or a 4×4 mm QFN. Modeling of the wire bond inductances at these ultra-high frequencies (UHF) indicated that the packaging should have minimal impact on the performance.

Generally, the performance was comparable to the probe station measurements. Typically, output power and PAE was only slightly degraded by additional package parasitics. NF measurements were typically better when tested at the package level because of the floating grounds in the probe tests. The NF of the design was 1.9 dB in the package, less than the 3 dB measured at the bare die level. Some features, such as the high isolation of the gate enables, were only testable at the package level because of the limited number of DC probes available during the characterization of the bare die. A simple test board with subminiature version A (SMA) connectors for the RF and wire leads for the DC connections was used to test the bare die assembled in the QFN packages. FIG. 20 is an illustration of an image of wire bonded RFIC booster chip on a 4×4 mm QFN package. The QFN packages are not standard in terms of the I/O pad placement and die pads, but at these sub 1-GHz frequencies, the package parasitics are negligible The design, simulation, fabrication characterization, packaging, and testing of a custom GaAs RFIC chip is to enhance the range performance of low-power RF applications. In accordance with the principles of the present invention, four separate elements—a BPSK modulator, a highly linear low-power PA with 20 dB gain, an LNA with a NF lower than 2 dB, and/or a low insertion loss TRS—may be included in a small form factor, where the footprint of the inductors and capacitors is was large in comparison to the overall footprint of the chip at lower frequencies. Overall, the power amplifier met the design goals by providing 50 mW of output power at 2.7 V coupled with a 50% PAE. It can be readily appreciated by those skilled in the art that IC performance characteristics for a particular set of system level requirements such as battery voltage, output power, or NF can be optimized without departing from the scope of the present invention.

Discrete Circuit Designs and Simulation Results

Several Monolithic Microwave Integrated Circuits (MMICs) were designed to enhance the performance of commercial off-the-shelf (COTS) RF Integrated Circuits (RFICs). These various U.S. Army Research Laboratory (ARL) designs were fabricated at TriQuint Semiconductor with their Prototype Development Quickturn (PDQ) Option using their gallium arsenide (GaAs) 0.5 μm TQPED Pseudomorphic High Electron Mobility Transistor (PHEMT) process. The designs were tested with a Microwave Probe Station and then were packaged in Quad Flat No Lead (QFN) parts for additional testing at a board level. The packaged designs may be incorporated into actual TTL circuit boards for performance testing. Following is documentation of the packaging of these GaAs designs and the test results in those packages.

The following sections describe Gallium Arsenide (GaAs) Integrated Circuit Design for Radio Frequency Booster Chips at 450, 900, and 2400 MHz.

The RFIC booster chip may optionally incorporate four different elements: the binary phase shift keying (BPSK) modulator, the power amplifier (PA), the transmit/receive (TR) switch, and the low-noise amplifier (LNA). In transmit mode, the RF signal traverses the BPSK modulator and PA. The resulting output signal has about 100 mW of output power. In receive mode, the RF signal traverses the LNA, which amplifies the incoming signal with minimal effect on the noise level. This, in turn, increases the power level of the received signal, making it easier to detect. The TR switch toggles the circuit from transmit and receive mode as necessary.

The goal of the PA design was to achieve a gain of 20 dB, an input match of at least −10 dB, and a power added efficiency (PAE) of at least 50%. Ideally, the BPSK modulator should have a 180° phase difference between the two modulation states, with a minimal insertion loss, and an input and output match of at least −10 dB. Ideally, the LNA should have a noise figure (NF) of less than 2 dB, a gain of 15 dB, and an output match of at least −10 dB. Ideally, the TR switch should have a minimal insertion loss of less than 1 dB or better, a good isolation between the switch states of better than 30 dB, and the ability to operate with at least the expected 20-dBm signal level of the PA.

In the PA design, a tradeoff exists between the PAE and gain, and likewise there exists a similar tradeoff between NF and gain for the LNA design. For the TR switch, there is a tradeoff of layout area, insertion loss, isolation, and bandwidth. A goal of the following preferred embodiments was to optimize the performance between these tradeoffs while minimizing the power consumption and IC footprint.

Preliminary Single Chip RFIC Booster Designs

A preferred embodiment referred to as the Cascaded Narrowband BPSK Modulator and PA Design at 900 MHz with Broadband LNA (ARL01M900)(FIGS. 21A-C) is a narrowband 900-MHz cascaded BPSK modulator and PA with a separate broadband LNA on a 3×3 mm tile. The BPSK modulator has a negative DC OFF state of approximately −3.0 V and an ON state of 0.0 V to activate the A and B control pins, while the PA has a +2.7 to +3.0 V supply voltage. FIGS. 21A-C and 22 show the schematic and layout of the design that was used for the simulations.

The intent of the simulation of the embodiment of FIGS. 21A-C was to measure how the BPSK modulator and PA will work in combination, as well as evaluate the performance of the LNA design at 900 MHz. The gain of the transmit stage was expected to be 15 dB, since the PA is designed to 20 dB and there is a 2-dB insertion loss in the BPSK modulator with a 3-dB attenuator between the two circuits.

The two-port S-parameters of the cascaded BPSK and PA embodiment of FIGS. 21-C were simulated with each of the two BPSK modulation states activated individually, and the results are depicted in FIG. 23. At 900 MHz, we see a gain of 14.5 dB for both modulation states, an output match of approximately −9.5 and −10.5 dB for state A versus state B, and an input match of approximately −10.8 and −14.0 dB for state A versus state B. With the additional losses introduced by the BPSK modulator and additional attenuator, the PA provided a gain of about 19.5 dB, which is in line with the original design goals. The input and output matches of both states produced acceptable results. FIG. 24 shows the PAE and output power of the PA without the BPSK modulator to be 53.6% at a 20.1-dBm output power.

The two-port S-parameters of the broadband LNA were simulated, and the results are depicted in FIG. 25. From 400 MHz to 8 GHz, a gain ranging from approximately 17.5 to 6.0 dB was observed. The gain up to about 2 GHz stays within range of the design goals. There is much less variation in output match and input match over the frequency range. From 400 MHz to 8 GHz, an output match ranging from −9.0 to −11.5 dB, and an input match ranging from approximately −8.0 to −10.5 dB was observed. FIG. 26 shows the NF of the receive stage to be less than 2.0 from about 400 MHz to 3 GHz, which incorporates all of our frequency bands of interest. This broadband LNA met all of the design goals, but consumed more DC power than the narrowband designs.

Next will be described a preferred embodiment referred to as the BPSK Modulator, PA, Broadband LNA, and TR Switch at 900 MHz (ARL04M900) as depicted schematically in FIG. 36. An example of the layout of the design, a full RFIC 900-MHz booster chip, is illustrated in FIG. 28; shown on a 3×3 mm tile. The LNA is both broadband and higher in gain. The BPSK modulator has a negative DC OFF state of approximately −3.0 V and an ON state of 0.0 V to activate the A and B control pins. In this design, the TR switch also has a negative DC OFF state of approximately −3.0 V and an ON state of 0.0 V, which activate the transmit stage or the receive stage, respectively. The PA and LNA both have the same +2.7 V to +3.0 V supply voltage as in section 3.3.

The intent of this design is to compare the results of this smaller footprint to that of section describing the Narrowband BPSK Modulator, PA, Narrowband LNA and TR Switch at 900 MHz (ARL03M900—FIGS. 31A-D), where the same elements and operating frequency are used, but the layout has a 4×4 mm footprint. This circuit has been designed to have the similar values for gain, input match, output match, and NF as in the section describing the Narrowband BPSK Modulator, PA, Narrowband LNA and TR Switch at 900 MHz (ARL 03M900—FIGS. 31A-D).

The two-port S-parameters of the transmit stage of the embodiment of FIG. 27 were simulated with each of the two BPSK modulation states activated individually, and the results are depicted in FIG. 29. At 900 MHz, there was a gain of 14.6 dB for both modulation states, an output match of approximately −8.5 dB for both modulation states, and an input match of approximately −13.5 and −10.3 dB for state A versus state B. With the additional losses introduced by the BPSK modulator, attenuator, and TR switch, the PA provided a gain of about 20.6 dB, which exceeds the original design goals. After shrinking the footprint, the behavior of the transmit stage of the 3×3 mm RFIC is similar to the RFIC design with the 4×4 mm footprint at 900 MHz.

FIG. 29 illustrates the S-parameters for the PA in both states of the BPSK modulator at 900 MHz. The two-port S-parameters of the receive stage were simulated, and the results are depicted in FIG. 30; which illustrates the S-parameters for the broadband LNA with the TR switch set to receive mode at 900 MHz. At 900 MHz, there was a gain of 16.3 dB, an output match of −11.4 dB for, and an input match of approximately −7.5 dB. With the additional losses introduced by the TR switch, the LNA provided a gain of about 17.3 dB, which is a significant improvement over the previous ARL03M900 (FIGS. 31A-D) design. The output match is not nearly as good as the previous design, but is still less than −10 dB, and a small degradation was seen in the input match at 900 MHz. The broadband characteristics are better than those of ARL01M900 (FIGS. 21A-C) for gain and output match, especially at higher frequencies, but the broadband input match has suffered some degradation. FIG. 31 illustrates the NF for the broadband LNA with the TR switch set to receive mode at 900 MHz. FIG. 31 shows the NF of the receive stage to be 1.915. In light of the higher gain and lower NF, the receive stage of the 3×3 mm chip is improved over that of the 4×4 mm ARL03M900 chip (FIGS. 31A-D), but at the expense of higher current consumption for the LNA and overall RFIC.

Following an internal design review feedback was obtained as to how the designs could be changed to better fit the needs of the various intended applications. A change that was implemented in the following redesigns is that circuitry was added to ensure that all the DC biases for the BPSK modulator and TR switch were positive. For the BPSK modulator, the change to a positive control voltage was fairly simple in that the Dmode pseudomorphic high electron mobility transistor (PHEMT) switches were replaced with Emode PHEMT switches of the same size with minimal impact to the layout. There was a slight impact to the control input design to limit the input voltage to less than 1 V to prevent damage from high current to the Emode switches while maintaining control input levels of +2.5 to +5.0 V. A small diode and a simple resistor divider circuit is used to limit the input voltage with a small current penalty. The Dmode switches do not require this voltage/gate current protection circuit and require zero current at DC for the control inputs. The initial positive input circuit design consumes about 1 mA for each control input and modification of the resistor divider circuit to reduce this current is within the scope of the present invention.

For the PHEMT switches in the TR switch, the Emode devices could not handle the relatively high RF power levels of the PA, expected to be around 20 dBm (100 mW). Dmode PHEMT switches had to be used for the TR switch, but the normal negative gate control voltages can be made positive by providing a positive reference voltage to set the ON voltage and by adding capacitors to isolate DC paths to ground the TR switch. Four isolation capacitors were required to make a positive control voltage for the TR switch, and these capacitors can be quite large, particularly at 450 MHz. The penalty in converting the TR switch to positive control was the addition of an extra input pad to establish the ON reference voltage, and the additional area of the DC isolation capacitors. There may be some additional insertion loss to the positive voltage TR switch over the negative control voltage version, particularly if the capacitors are not sufficiently large.

Also, a current mirror was added to some of the preferred embodiment designs to enable current consumption in the PA and LNA to remain relatively constant for a range of supply voltages. For the amplifier bias, the initial designs used a simple resistor divider to provide the DC gate bias voltage. The resistor divider approach makes the amplifier bias very sensitive to supply voltage, particularly for the lower bias current of the LNA amplifier. A current mirror uses a small PHEMT to set the gate bias voltage based on the current in the amplifier and is much less sensitive to supply voltage. This yields a useable amplifier over a much larger voltage range, designed to operate from 2.0-5.0 V. This makes the RFIC booster chip more robust as battery voltages degrade in use and also makes it more suitable for a larger variety of supply voltages and different applications.

Next will be described a preferred embodiment referred to as the Cascaded BPSK Modulator and PA Redesign with Current Mirror at 450 MHz (ARL08M450), schematically illustrated in FIGS. 32A-D. The embodiment comprises a current mirror added to the design of the PA and new circuitry needed to add a DC reference voltage and turn the respective BPSK modulator states positive. The DC bias for the switch states of the BPSK modulator is now 2.0-5.0 V to enable and 0.0 V to disable. FIG. 33 illustrates the layout for the narrowband cascaded BPSK modulator and PA redesign with a robust current mirror at 450 MHz having a footprint of 3×3 mm.

The two-port S-parameters of the cascaded BPSK and PA were simulated (for the embodiment of FIGS. 32A-D) with each of the two BPSK modulation states activated individually, and the results are depicted in FIG. 34, which illustrates S-parameters for the cascaded PA in both states of the narrowband BPSK modulator with a robust current mirror at 450 MHz. At 450 MHz, there was a gain of 15.3 dB for both modulation states, an output match of approximately −8.0 and −7.5 dB for state A versus state B, and an input match of approximately −13.5 and −9.02 dB for state A versus state B. With the additional losses introduced by the BPSK modulator and attenuator, the PA is providing a gain of about 20.3 dB. Overall, the new elements added to the IC design did not affect the simulations.

Intended laboratory measurements of the fabricated circuit were substantially similar to the S-parameter and PAE measurements described for the embodiments of FIGS. 21A-C.

Next will be described a preferred embodiment referred to as the BPSK Modulator, PA, Narrowband LNA, and TR Switch Redesign with Current Mirror at 2.4 GHz (ARL09G24), as shown schematically in FIG. 35. This is a redesign of the preferred embodiment shown schematically in FIGS. 53A-D (ARL07G24), with the addition of the current mirror to the design of the PA and the new circuitry needed to make the DC reference voltage turn the respective BPSK modulator states positive. The DC bias for the switch states of the BPSK modulator is now 2.0-5.0 V to enable and 0.0 V to disable. The footprint of the circuit is still 3×3 mm and FIG. 36 shows the layout for preferred embodiment of FIG. 35.

The two-port S-parameters of the transmit stage of the FIG. 35 embodiment were simulated with each of the two BPSK modulation states activated individually, and the results are depicted in FIG. 37, which illustrates S-parameters for the cascaded PA in both states of the BPSK modulator with a robust current mirror at 2.4 GHz. At 2.4 GHz, we see a gain of 12.6 dB for both modulation states, an input match of approximately −18.3 and −16.0 dB for state A versus state B, and an output match of approximately −10.0 and −9.5 dB for state A versus state B. With the additional losses introduced by the BPSK modulator, attenuator, and TR switch, the PA was providing a gain of about 16.6 dB. Overall, the changes in design for this IC did not affect the simulated results as compared to chip ARL07G24 (shown in FIGS. 53A-D).

The two-port S-parameters of the receive stage for the embodiment of FIG. 35 were simulated, and the results are depicted in FIG. 38. At 2.4 GHz, there was a gain of 13.1 dB, an output match of −24.2 dB for the LNA, and an input match of approximately −7.0 dB. With the additional losses introduced by the TR switch, the LNA is providing a gain of about 14.1 dB. The input and output matches are the same as those for chip ARL07G24 (FIGS. 53A-D). FIG. 39 shows the NF of the receive stage to be 2.191 (for the embodiment of FIG. 35). Overall, the new elements added to the IC design had negligible affects on the simulated results as compared to chip ARL07G24, which is a 2400 MHz design comprising a BPSK modulator, a PA, a TRS, and a narrowband LNA. Both the LNA and PA have a robust current mirror bias.

Figure 41:
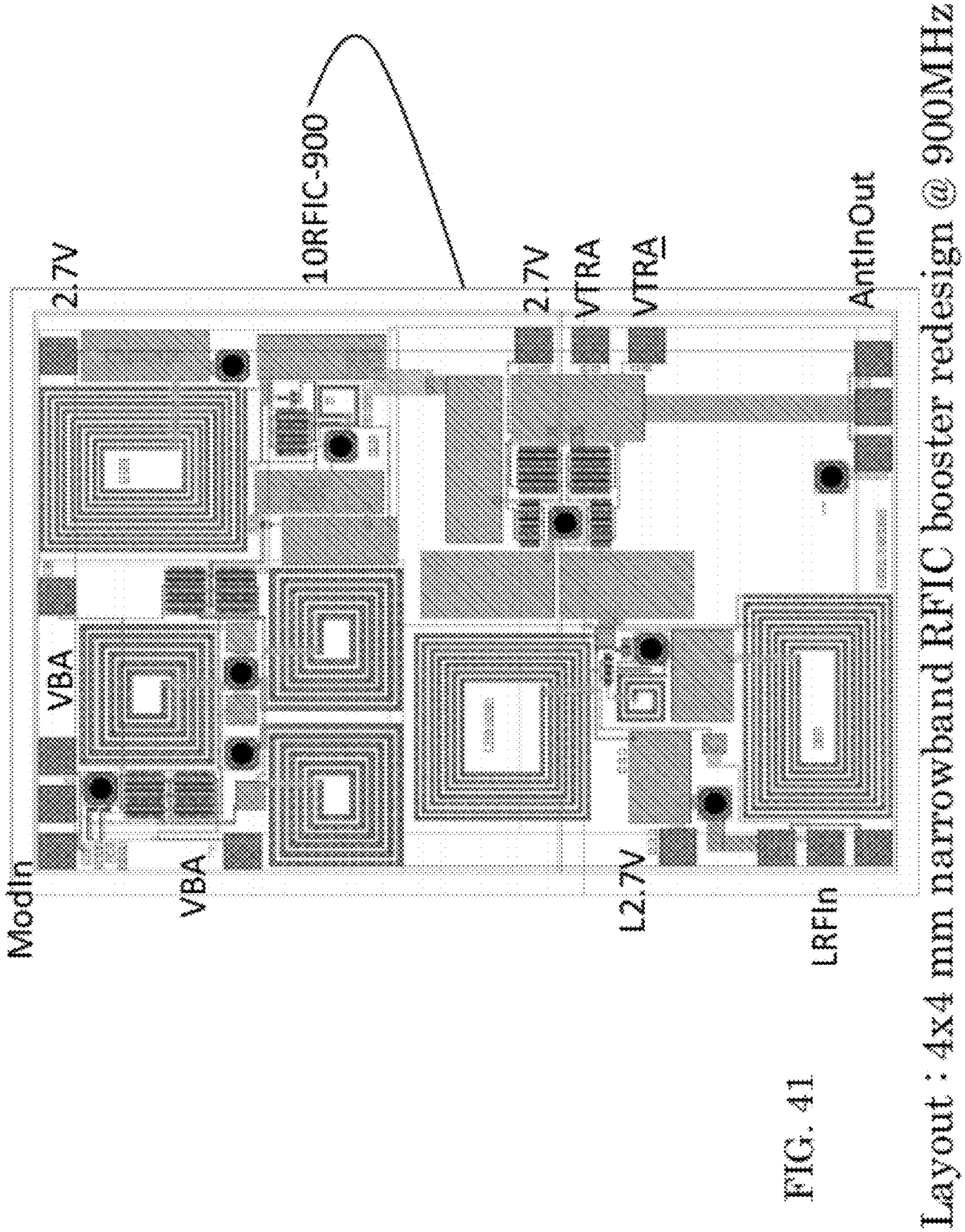
FIG. 41 illustrates the layout of the preferred embodiment of FIG. 40.

Next will be described a preferred embodiment referred to as the BPSK Modulator, PA, Narrowband LNA, and TR Switch Redesign at 900 MHz (ARL10M900), as schematically illustrated in FIG. 40. This is a redesign of the ARL03M900 described schematically in FIGS. 31A-D. The only changes are the addition of the current mirror to the design of the PA and the new circuitry needed to add a DC reference voltage and turn the respective BPSK modulator states positive. The DC bias for the switch states of the BPSK modulator is now 2-5.0 V to enable and 0.0 V to disable. The footprint of the circuit is still 4×4 mm and FIGS. 40 and 41 show the schematic and layout for 4×4 mm narrowband RFIC booster chip design at 900 MHz.

The two-port S-parameters of the transmit stage were simulated with each of the two BPSK modulation states activated individually, and the results are depicted in FIG. 42, which illustrates S-parameters for the cascaded PA redesign in both states of the BPSK modulator. At 900 MHz, there was a gain of 14.7 dB for both modulation states, an output match of approximately −9.0 dB for both modulation states, and an input match of approximately −14.0 and −10.4 dB for state A versus state B. With the additional losses introduced by the BPSK modulator, attenuator, and TR switch, the PA is providing a gain of about 20.6 dB. Overall, the new elements added to the IC design had negligible affects on the simulated results as compared to chip ARL03M900 (FIGS. 31A-D).

The two-port S-parameters of the receive stage (for the embodiment of FIG. 40) were simulated, and the results are depicted in FIG. 43, which illustrates S-parameters for the LNA redesign with the TR switch set to receive mode at 900

MHz. At 900 MHz, we see a gain of 12.8 dB, an output match of −31.6 dB for, and an input match of approximately −6.5 dB. With the additional losses introduced by the TR switch, the LNA is providing a gain of about 13.8 dB. FIG. 44 illustrates NF for the LNA redesign with the TR switch set to receive mode at 2.4 GHz. FIG. 44 shows the NF of the receive stage to be 2.189 (for the embodiment of FIG. 40). Overall, with the new elements added to the IC design, the simulated results are comparable to chip ARL03M900 (FIGS. 31A-D).

Next will be described a preferred embodiment referred to as "BPSK Modulator, PA, Narrowband LNA, TR Switch with Additional PA, and LNA Enable Input Redesign at 450 MHz" (ARL11M450), illustrated schematically in FIGS. 45A-D. The circuitry adds a DC reference voltage to turn the respective BPSK modulator states positive. The DC bias for the switch states of the BPSK modulator is now 2-5 V to enable and 0 V to disable. The BPSK Modulator is illustrated in FIG. 45A; the PA (with resistor divider bias) in FIG. 45B, Narrowband LNA in FIG. 45C (with gate enable circuit; resistor divider bias), and TR Switch in FIG. 45D. The footprint of the circuit is still 4×4 mm and FIG. 46 shows an example of a layout for the RFIC booster chip design at 450 MHz.

The two-port S-parameters of the transmit stage (of the embodiment of FIGS. 45A-D) were simulated with the gate enable activated and each of the two BPSK modulation states activated individually, and the results are depicted in FIGS. 47 and 48. FIG. 47 illustrates S-parameters for the PA redesign in both states of the BPSK modulator with enable ON at 450 MHz. FIG. 48 illustrates S-parameters for the PA redesign in both states of the BPSK modulator with enable OFF at 450 MHz. At 450 MHz, a gain of 14.5 dB was observed for both modulation states, an input match of approximately −12.5 and −8.9 dB for both state A versus state B, and an output match of approximately −9.5 and −10.5 dB for state A versus state B. With the additional losses introduced by the BPSK modulator, attenuator, and TR switch, the PA is providing a gain of about 20.5 dB. Overall, with the new elements added to the IC design, the simulated results are comparable to chip ARL06M450 (FIGS. 46A-D). When the gate enable is set to OFF, all the values for gain, input match, and output match change significantly.

The two-port S-parameters of the receive stage (of the embodiment of FIGS. 45A-D) were simulated with the gate enable activated, and the results are depicted in FIG. 49, which illustrates S-parameters for the LNA redesign with the TR switch in receive mode and enable ON at 450 MHz. At 450 MHz, there was a gain of 11.2 dB, an output match of −21.8 dB for, and an input match of approximately −7.5 dB. With the additional losses introduced by the TR switch, the LNA is providing a gain of about 12.2 dB. When the gate enable is set to OFF, as in FIG. 50, all the values for gain, input match, and output match change significantly. FIG. 50 illustrates S-parameters for the LNA redesign with the TR switch in receive mode and enable OFF at 450 MHz. FIG. 51 illustrates NF for the LNA redesign with the TR switch in receive mode at 450 MHz; and shows the NF of the receive stage to be 2.512.

Next, will be described a preferred embodiment referred to as BPSK Modulator, PA, and TR Switch Design at 450 MHz (ARL12M450), illustrated schematically in FIGS. 52A-C. This design is a narrowband cascaded BPSK modulator, PA, and TR switch designed at 450 MHz on a 3×3 mm tile, which did not permit the addition of the ground-signal-ground (GSG) pads needed to measure the receive path for the TR switch individually. The BPSK modulator has a positive DC reference of 2 to 5 V to turn ON state A and state B with a 0.0 V for the OFF state, while the PA has a +2.7 to +3.0 V supply voltage. The TR switch has a positive DC reference of 2.5 V on the control inputs corresponding to ON and 0 V corresponding to OFF to activate the transmit stage or the receive stage. This TR switch may have higher insertion loss than the other 450-MHz design, because the capacitors are smaller due to the limited area available in the die. FIG. 53 shows an example of a layout of the design (which was used for the simulations).

The two-port S-parameters of the PA (of the embodiment illustrated in FIGS. 52A-C) were simulated with each of the two BPSK modulation states activated individually, and the results are depicted in FIG. 54, which illustrates S-parameters for the PA in both states of the BPSK modulator at 450 MHz. At 450 MHz, we see a gain of 15.3 dB for both modulation states, an input match of approximately −14.5 and −9.5 dB for both state A versus state B, and an output match of approximately −12.0 and −12.5 dB for state A versus state B. With the additional losses introduced by the BPSK modulator, attenuator, and TR switch, the PA is providing a gain of about 20.3 dB. FIG. 55 shows the S-parameters of the PA when the TR switch is set to receive at 450 MHz. FIG. 56 shows the isolation when the receive paths is turned OFF, while FIG. 57 (which illustrates S-parameters for the TR switch at 450 MHz) shows the insertion loss and return loss when the TR switch is set to receive.

Summary of all Designs

Table 1 summarizes the 14 designs and highlights the differences between the design variations. Frequency is the first column followed by a check mark in the next four columns to indicate if the design has a BPSK modulator, PA, LNA, or TR Switch. All designs contain at least the BPSK modulator and PA. Next, the polarity of the control signals for the BPSK modulator and TR switch is indicated as a plus or minus. The next two columns contain "checks" if the designs have enables on the amplifiers or if they have the robust bias supply current mirror design. Lastly, the package column indicates if they are 68×65 mil designs or 95×65 mil designs for the 3×3 or 4×4 mm packages.

TABLE 1

Differences in design variation for all 14 IC designs.

| Design | Freq | BPSK | PA | LNA | TRS | Cont BPSK | Cont TRS | Enb | Robust DC | PKG | Notes |
|---|---|---|---|---|---|---|---|---|---|---|---|
| ARL01M900 (FIGS. 21A-C) | 900 | √ | √ | √ | | – | | | | 3×3 | Sep. BB LNA |
| ARL02M450 | 450 | √ | √ | | | – | | | | 3×3 | see#8 |
| ARL03M900 | 900 | √ | √ | √ | √ | – | + | | | 4×4 | |
| ARL04M900 | 900 | √ | √ | √ | √ | – | – | | | 3×3 | |
| ARL05M450 | 450 | √ | √ | √ | √ | – | + | | | 4×4 | |

TABLE 1-continued

Differences in design variation for all 14 IC designs.

| Design | Freq | BP SK | PA | LNA | TRS | Cont BPSK | Cont TRS | Enb | Robust DC | PKG | Notes |
|---|---|---|---|---|---|---|---|---|---|---|---|
| ARL06M450 | 450 | √ | √ | √ | √ | – | + | yes | | 4×4 | See #11 |
| ARL07G24 | 2.4 G | √ | √ | √ | √ | – | + | | | 3×3 | See #9 |
| ARL08M450 | 450 | √ | √ | | √ | + | + | | yes | 3×3 | |
| ARL09G24 | 2.4 G | √ | √ | √ | √ | + | + | | | 3×3 | |
| ARL10M900 | 900 | √ | √ | √ | √ | + | + | | yes | 4×4 | |
| ARL11M450 | 450 | √ | √ | √ | √ | + | + | yes | | 4×4 | |
| ARL12M450 | 450 | √ | √ | | √ | + | + | yes | | 3×3 | #8 w/ TRS |
| ARL13M450 | 450 | √ | √ | | | + | | | | 3×3 | #8 Test Chip |
| ARL14G24 | 2.4 G | √ | √ | √ | √ | + | + | | | 3×3 | #9 Test Chip |

The foregoing details the design and simulation of 14 different versions of a RFIC booster chip and its individual elements on GaAs. However, the present invention is not limited to the embodiments described herein. The designs incorporate a transmit stage made up of a BPSK modulator and PA, and may contain a receive stage made up of an LNA. The designs may include a TR switch to activate either the transmit or receive path. Designs were simulated at 450, 900, and 2400 MHz. The simulations show that the gains and input matches of both stages usually fall within desired ranges; however, the LNAs often have a poor input match in order to minimize the NF.

As used herein the terminology "shunt" means a portion of a circuit which allows electric current to pass around another point or another subcircuit in the circuit using a low resistance (or conductor) in parallel with the other subcircuit to provide a path for the current to be diverted.

The following are a list of symbols, abbreviations, and acronyms used herein and there corresponding meanings:

BPSK binary phase shift keying
GaAs gallium arsenide
GSG ground-signal-ground
LNA low-noise amplifier
NF noise figure
PA power amplifier
PAE power added efficiency
PHEMT pseudomorphic high electron mobility transistor
RF radio frequency

What is claimed is:

1. A radio frequency integrated circuit for enhancing wireless communication and/or sensing systems comprising:

a base comprising a gallium arsenide (GaAs) substrate; the base length and width being in the range of approximately 3-4 mm;

binary phase shift keying modulator fabricated on the base;

a power amplifier fabricated on the base and operatively associated with the binary phase shift keying modulator; the power amplifier having a first shunt operatively associated therewith; the first shunt comprising a gate-enabled circuit;

a transmit/receive switch fabricated on the base comprising high electron mobility transistor switches and a plurality of isolation capacitors, the transmit/receive switch being operatively associated with the power amplifier and being alternately connectable to an antenna port adapted to be connected to an antenna;

a low noise amplifier fabricated on the base; the low noise amplifier being alternately connectable to the antenna port, the low noise amplifier having a second shunt operatively associated therewith; the second shunt comprising a gate-enabled circuit for increased isolation; the low noise amplifier being operatively connected to a current mirror comprising a high electron mobility transistor to set the gate bias voltage based upon the current in the low noise amplifier, the current mirror providing stable current consumption even at low, declining voltages allowing the low noise amplifier to operate at a voltage as low as two volts;

the circuit operating in a transmit stage in which the power amplifier is connected to the antenna port and in a receive stage in which the low noise amplifier is connected to the antenna port;

whereby in the receive stage the power amplifier is bypassed by the first shunt to reduce current consumption and substantially isolate the receive stage from the transmit stage; and in the transmit stage the low noise amplifier is bypassed by the second shunt to reduce current consumption and to substantially isolate the transmit stage from the receive stage.

2. The circuit of claim 1 wherein the power amplifier and the low noise amplifier have DC inputs in the range of approximately 2.7 to 3,0 volts and at least approximately 100 mW of output power is produced and wherein each of the first and second shunts is a gate enable circuit for each of the power amplifier and low noise amplifier circuits to provide much greater isolation between the operation modes of the transmit/receive switch:, each of the gate enabled circuits comprising a pseudomorphic high electron mobility transistor PHEMT switch.

3. The circuit of claim 1 wherein the power amplifier further comprises a current mirror to create a stable DC bias over a wide range of supply voltage to the power amplifier so that the performance is consistent over a range of approximately 2 to 5 volts, whereby power consumption is limited by maintaining the substantially constant current to the power amplifier.

4. The circuit of claim 1 wherein the circuit is a monolithic microwave gallium arsenide integrated circuit and is packaged so as to be insertable into an RF front end to enhance the ranges of the transmit/receive functionality of the RF front end.

5. The circuit of claim 1 wherein the circuit is a monolithic microwave gallium arsenide integrated circuit and wherein the power amplifier is a broadband power amplifier comprising a current mirror bias.

6. The circuit of claim 1 wherein the circuit is a monolithic microwave gallium arsenide integrated circuit and wherein the circuit is embodied on a chip having a length and width of approximately 3 mm.

7. The circuit of claim 1 wherein the circuit is a monolithic microwave gallium arsenide integrated circuit having input and output contacts positioned along the periphery of the integrated circuit and wherein the circuit provides an interface between the transceiver and antenna of a preexisting communications device to increase range between nodes for low-power RF applications.

8. The circuit of claim 1 wherein the integrated circuit is mounted in a battery powered extended range REED device and wherein the power amplifier has a current mirror bias provided so that both the low noise amplifier and power amplifier are cable of operating over range of battery voltages keeping Q the outpower and power added effciency optimal over low input power ranges.

9. The circuit of claim 1 wherein the monolithic integrated circuit comprises a plurality of contact pads positioned along the periphery for ready connection in order to provide an interface between the transceiver and antenna of an existing communications device to increase range between nodes for low-power RF applications.

10. A monolithic integrated circuit for enhancing wireless communications and/or sensing systems embodied on a chip having a length and width in the range of approximately 3- 4 mm comprising:
- a base comprising a gallium arsenide (GaAs) substrate; the base length and width being in the range of approximately 3- 4 mm;
- a binary phase shift keying modulator fabricated on the base;
- a power amplifier fabricated on the base operatively associated with the binary phase shift keying modulator;
- a low noise amplifier fabricated on the base for enhancing receiving capability of radio frequency signals;
- a transmit/receive switch fabricated on the base for switching between transmit
- and receive stages operatively associated with the low noise amplifier and power amplifier; the transmit/receive switch comprising first psuedomorphic high electron mobility transistors; which provide approximately 35-40 dB of isolation;
- second psuedomorphic high electron mobility transistors operatively associated with both the power amplifier and low noise amplifier to alternately isolate the power amplifier or the low noise amplifier depending upon whether transmit/receive switch is in the transmit or receive mode, the second psuedomorphic high electron mobility transistors providing an additional approximately 60 dB of isolation between the transmit and receive modes.

11. The circuit of claim 10 wherein the second psuedoinorphic high electron mobility transistors have DC inputs that decrease power consumption and provide additional isolation between transmit and receive stages.

12. The circuit of claim 10 further comprising control inputs positioned along the periphery of the monolithic integrated circuit for ease of connection and to enable operation with a preexisting RF device.

13. The circuit of claim 12 wherein the BPSK modulator has a negative DC OFF state of approximately 3.0 volts and an ON state of approximately zero volts; the transmit/receive switch has a positive DC reference of approximately 2.5 V on the control inputs corresponding to ON and 0.0V corresponding to OFF, which activate the transmit stage or the receive stage, respectively; and wherein the power amplifier and low noise amplifier both have a supply voltage within the range of approximately +2.7 to +3.0 volts.

14. The circuit of claim 10 wherein the low noise amplifier has a substantially low noise figure of approximately 2.1 at 2.4 GHz.

15. The circuit. of claim 10 wherein the low noise amplifier comprises a current mirror bias.

16. The circuit of claim 15 wherein the power amplifier is a broadband power amplifier comprising a current mirror bias.

17. A method of making a monolithic integrated circuit having length and width dimensions in the range of approximately 3 to 4 mm for wireless communications and/or sensing systems comprising:
- providing a base comprising a gallium arsenide (GaAs) substrate;
- fabricating a binary phase shift keying modulator on the base;
- fabricating a power amplifier on the base, the power amplifier being operatively associated with the binary phase shift keying modulator; the power amplifier having a first shunt operatively associated therewith;
- fabricating a transmit/receive switch on the base, the transmit/receive switch being operatively associated with the power amplifier and being alternately connectable to an antenna port adapted to be connected to an antenna;
- fabricating a low noise amplifier on the base; the low noise amplifier being alternately connectable to the antenna port. the low noise amplifier having a second shunt operatively associated therewith; the first and second shunts comprising psuedomorphic high electron mobility transistors which provide approximately 60 dB of isolation between the transmit and receive stages;
- the integrated circuit having a transmit stage in which the power amplifier is connected to the antenna port and a receive stage in which the low noise amplifier is connected to the antenna port; the connections to the antenna port being made using as switch comprising Dmode psuedomorphic high electron mobility transistors which provide approximately 35-40 dB of isolation;
- whereby in the receive stage the power amplifier is bypassed by the first shunt to reduce current consumption and substantially isolate the receive stage from the transmit stage; and in the transmit stage the low noise amplifier is bypassed by the second shunt to reduce current consumption and to substantially isolate the transmit stage from the receive stage.

* * * * *